US012701388B2

(12) United States Patent
Park et al.

(10) Patent No.: US 12,701,388 B2
(45) Date of Patent: Aug. 4, 2026

(54) ELECTRONIC DEVICE FOR PROVIDING DIGITAL CONTENT BASED ON SHORT RANGE WIRELESS COMMUNICATION AND OPERATION METHOD OF THE SAME

(71) Applicant: VIBEZONE INC., Seoul (KR)

(72) Inventors: Sang Bum Park, Hwaseong-si (KR);
Geun Yong Kim, Hwaseong-si (KR);
Jung Ki Min, Yongin-si (KR)

(73) Assignee: VIBEZONE INC., Seoul (KR)

( * ) Notice: Subject to any disclaimer, the term of this patent is extended or adjusted under 35 U.S.C. 154(b) by 355 days.

(21) Appl. No.: 18/518,203

(22) Filed: Nov. 22, 2023

(65) Prior Publication Data

US 2024/0098461 A1 Mar. 21, 2024

Related U.S. Application Data

(63) Continuation of application No. PCT/KR2022/013506, filed on Sep. 8, 2022.

(30) Foreign Application Priority Data

Sep. 16, 2021 (KR) ........................ 10-2021-0124099
Sep. 16, 2021 (KR) ........................ 10-2021-0124100

(Continued)

(51) Int. Cl.
*H04W 4/21* (2018.01)
*H04N 23/66* (2023.01)
*H04W 4/18* (2009.01)

(52) U.S. Cl.
CPC .............. *H04W 4/21* (2018.02); *H04N 23/66* (2023.01); *H04W 4/18* (2013.01)

(58) Field of Classification Search
CPC ........... H04W 4/08; H04W 4/18; H04W 4/20; H04W 4/21; H04W 4/80; H04N 21/422;

(Continued)

(56) References Cited

U.S. PATENT DOCUMENTS

| | | | | | |
|---|---|---|---|---|---|
| 8,577,988 | B2 * | 11/2013 | Choi | .................. | H04N 21/4223 |
| | | | | | 725/89 |
| 9,955,288 | B2 * | 4/2018 | Kim | ......................... | H04W 4/80 |
| 10,432,739 | B2 * | 10/2019 | Werner | .................. | H04W 4/02 |

FOREIGN PATENT DOCUMENTS

| | | | |
|---|---|---|---|
| KR | 10-2009-0109271 A | 10/2009 |
| KR | 1020100042509 A | 4/2010 |

(Continued)

OTHER PUBLICATIONS

International Search Report of PCT/KR2022/013506 Mailed on Mar. 23, 2023.

(Continued)

*Primary Examiner* — Quochien B Vuong
(74) *Attorney, Agent, or Firm* — WTA IP Law P.C.

(57) ABSTRACT

According to various embodiments, a method of operating an electronic device includes: executing an application implemented to provide a function for searching at least one content associated with at least one artist; When contacting an external device, acquiring a data set associated with a short-range communication circuit included in the external device; and controlling the state of the first album object corresponding to the identification information to an activated state among at least one album object corresponding to at least one album of a specific artist provided on the first execution screen of the application, and the remaining second album object. An operation method may be provided, including an operation of controlling the state of the album object to a deactivated state.

9 Claims, 56 Drawing Sheets

(30)          Foreign Application Priority Data

Sep. 16, 2021    (KR) ........................ 10-2021-0124101
Sep. 16, 2021    (KR) ........................ 10-2021-0124102
Sep. 6, 2022    (KR) ........................ 10-2022-0112705

(58) Field of Classification Search
     CPC ........... H04N 21/4223; H04N 21/4394; H04N
                  21/44008; H04N 21/47; H04N 21/472;
                  H04N 21/47202; H04N 21/4722; H04N
                  21/4725; H04N 21/475; H04N 23/60;
                                        H04N 23/66
     See application file for complete search history.

(56)          References Cited

FOREIGN PATENT DOCUMENTS

| KR | 1020100080584 | A | 7/2010 |
| KR | 1020120087348 | A | 8/2012 |
| KR | 1020130127733 | A | 11/2013 |
| KR | 1020140050989 | A | 4/2014 |
| KR | 101524523 | B1 | 6/2015 |
| KR | 1020150131803 | A | 11/2015 |
| KR | 1020160088558 | A | 7/2016 |
| KR | 1020160128145 | A | 11/2016 |
| KR | 101685411 | B1 | 12/2016 |
| KR | 1020170124954 | A | 11/2017 |
| KR | 1020190021106 | A | 3/2019 |
| KR | 1020190111485 | A | 10/2019 |
| KR | 1020190128586 | A | 11/2019 |
| KR | 1020200029136 | A | 3/2020 |
| KR | 1020200133316 | A | 11/2020 |
| KR | 1020210025251 | A | 3/2021 |
| KR | 1020210035104 | A | 3/2021 |
| KR | 10-2264309 | B1 | 6/2021 |
| KR | 102275468 | B1 | 7/2021 |
| KR | 102396639 | B1 | 5/2022 |

OTHER PUBLICATIONS

Written Opinion of International Searching Authority PCT/KR2022/013506 Mailed on Mar. 23, 2023.
ZOYI Tech, 'Digging into Bluetooth Low Energy(BLE)'_Sep. 9, 2016.
Office Action of KR Patent Application No. 10-2021-0124102_Nov. 17, 2022.
Office Action of KR Patent Application No. 10-2021-0124101_Dec. 17, 2022.
Office Action of KR Patent Application No. 10-2021-0124100_Dec. 18, 2022.
Office Action of KR Patent Application No. 10-2022-0112705_Mar. 31, 2023.
Decision to Grant KR Patent Application No. 10-2022-0112705_May 26, 2023.
Office Action of the corresponding KR Application No. 10-2021-0124099 mailed on Mar. 12, 2024.

* cited by examiner

<u>1</u>

FIG. 4
(a)
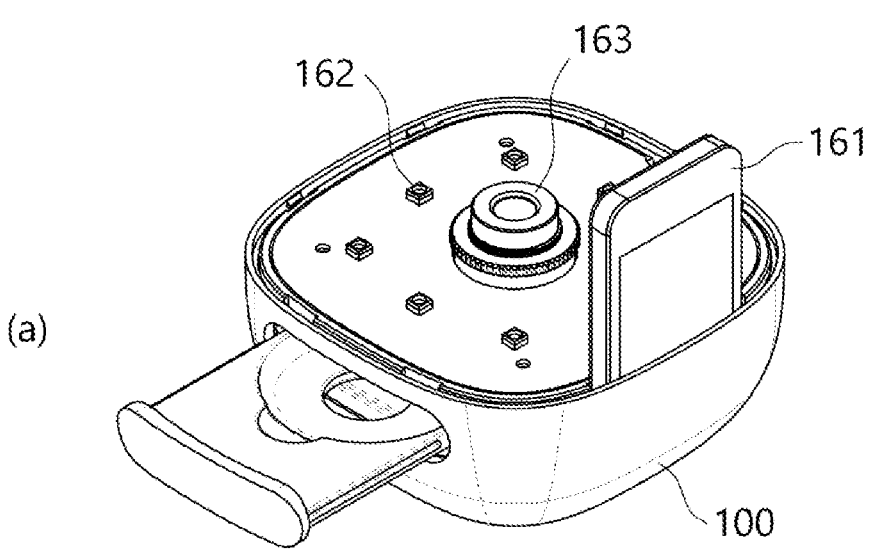
(b)
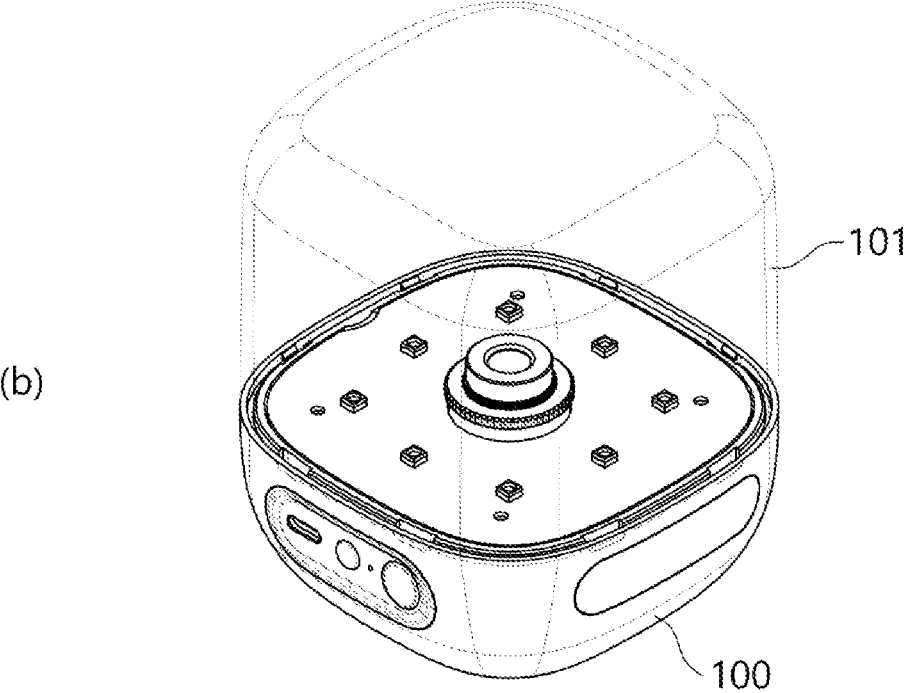

FIG. 5
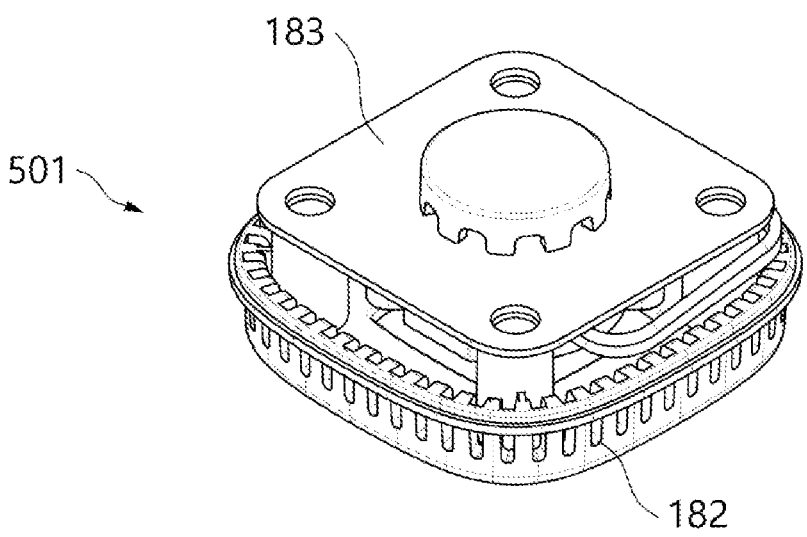
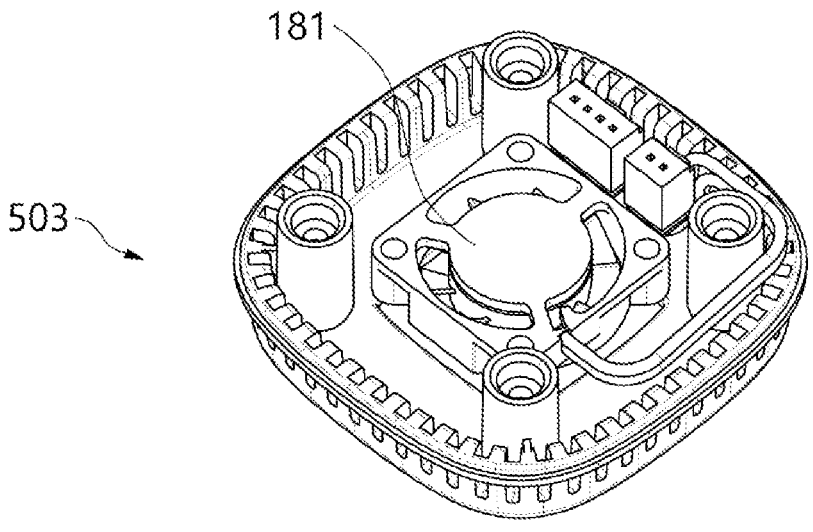

FIG. 6
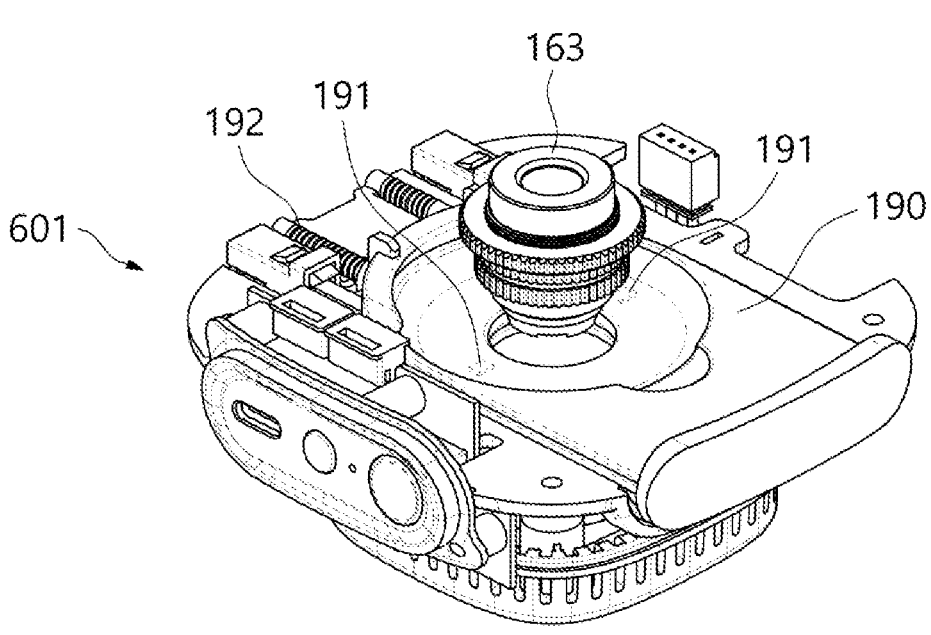
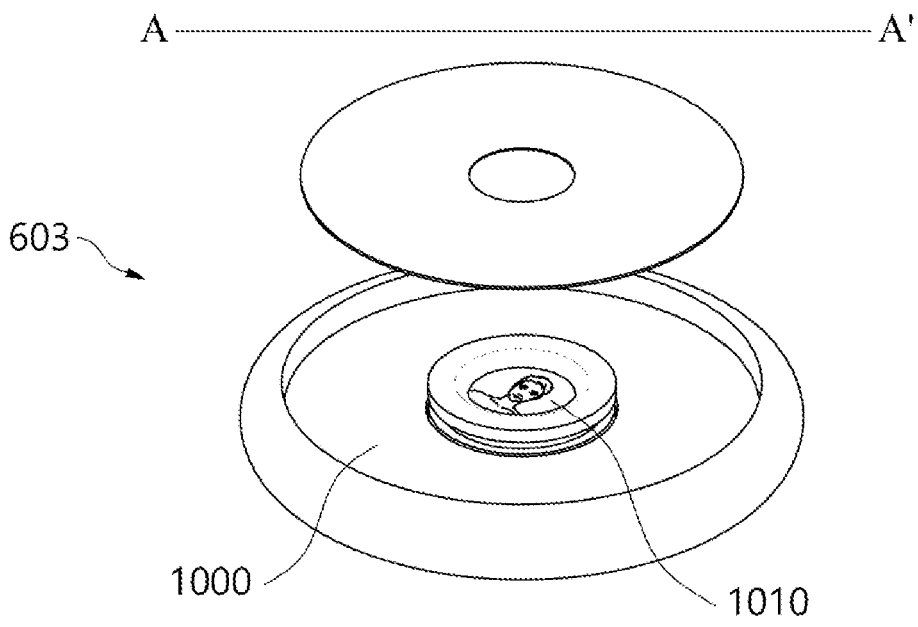

FIG. 7
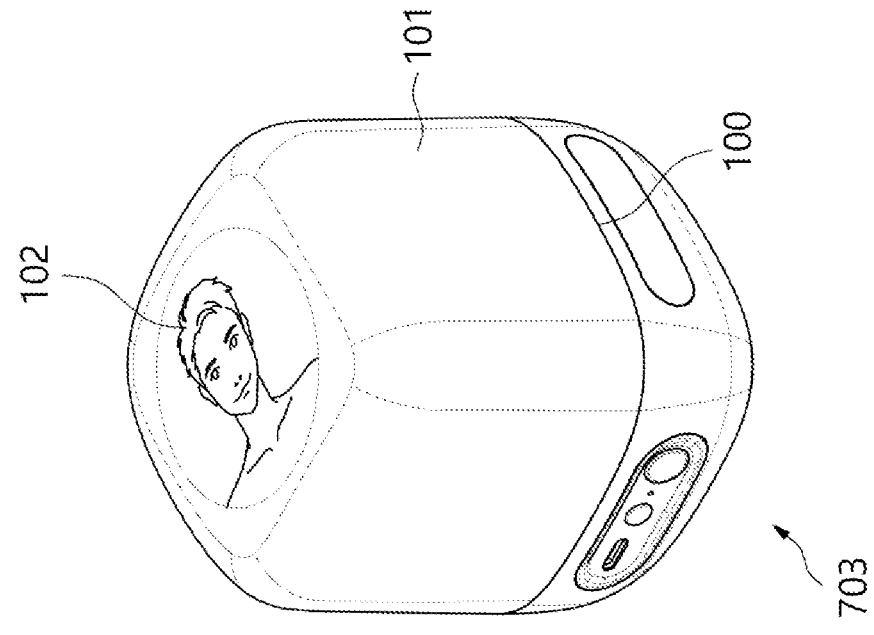
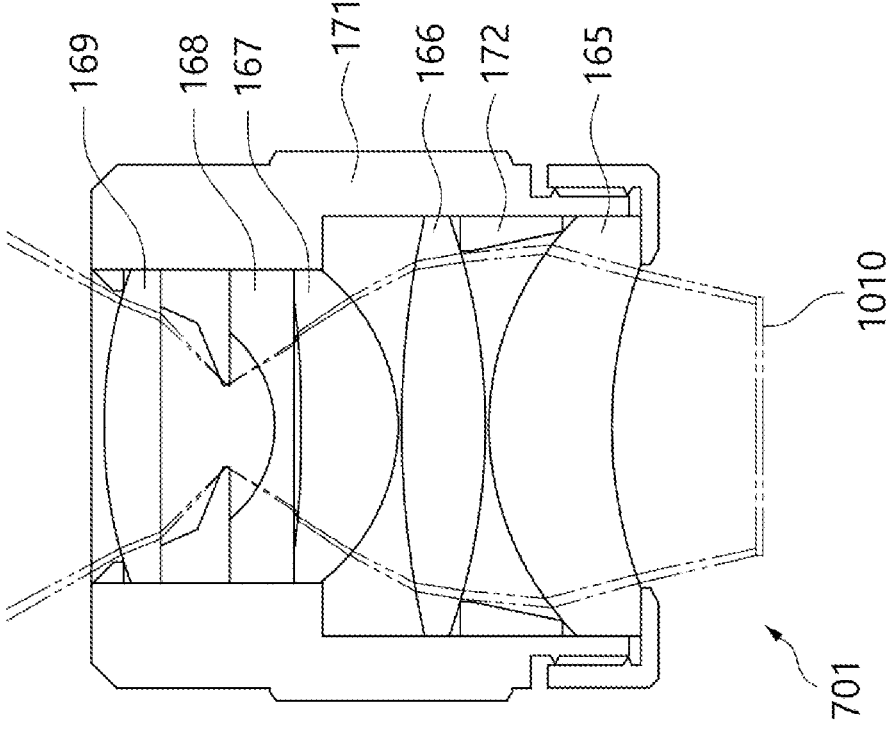

1000

FIG. 20
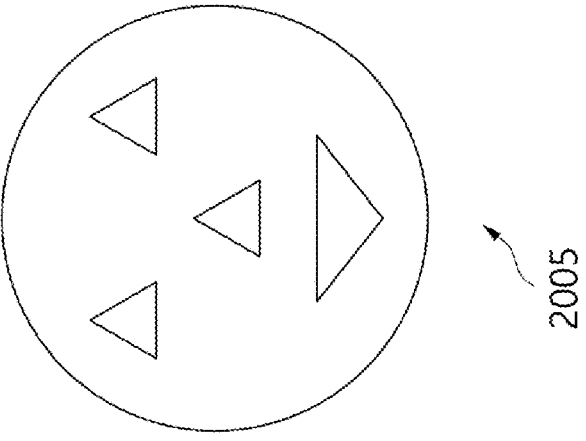
2005
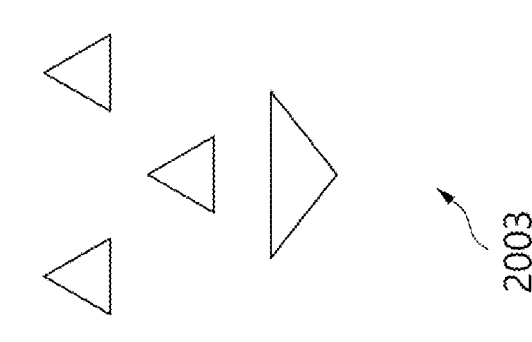
2003
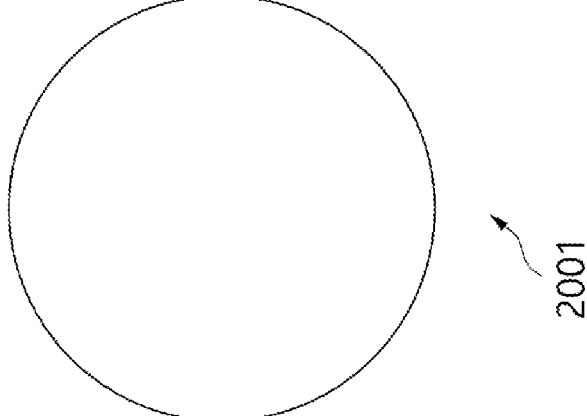
2001

FIG. 24

LIST OF SNS POSTS

SPECIFIC POST

SECRET MESSAGE

VIDEO CONTENT

SECRET MESSAGE

Figure 26:
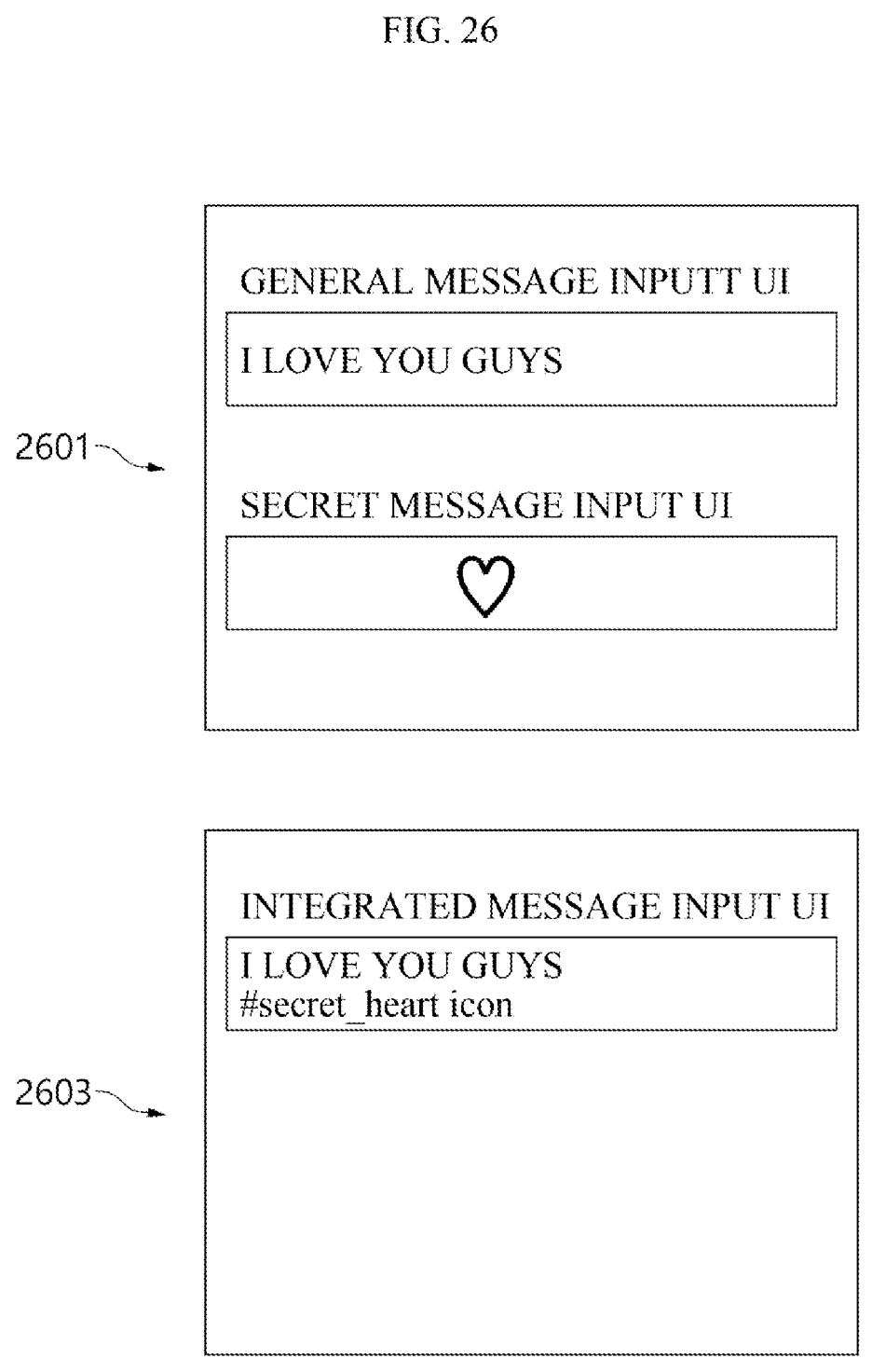

GENERAL MESSAGE INPUTT UI

I LOVE YOU GUYS

SECRET MESSAGE INPUT UI

♡

2601

INTEGRATED MESSAGE INPUT UI

I LOVE YOU GUYS
secret_heart icon

SECRET RULE INFORMATION - Video

| HAND HEART | WINK | CLAP | HANDSHAKE | ARM CROSSED |
|---|---|---|---|---|

SECRET MESSAGE - Video

| BTS | ♥ | ★ | Amy | Nice |
|---|---|---|---|---|

2703

SECRET RULE INFORMATION - Sound

| I LOVE YOU | ARMY | BTS | TIRED | IT'S HARD |
|---|---|---|---|---|

SECRET MESSAGE - Video

| ♥ | Amy | BTS | Tired | ★ |
|---|---|---|---|---|

2705

SECRET RULE INFORMATION - Time

| X | EVERY 10 MINUTES | EVERY 20 MINUTES | EVERY 30 MINUTES | EVERY 40 MINUTES |
|---|---|---|---|---|

SECRET MESSAGE - Signal

| ★ | BTS | ♥ | Amy | Nice |
|---|---|---|---|---|

<u>3</u>

FIG. 31
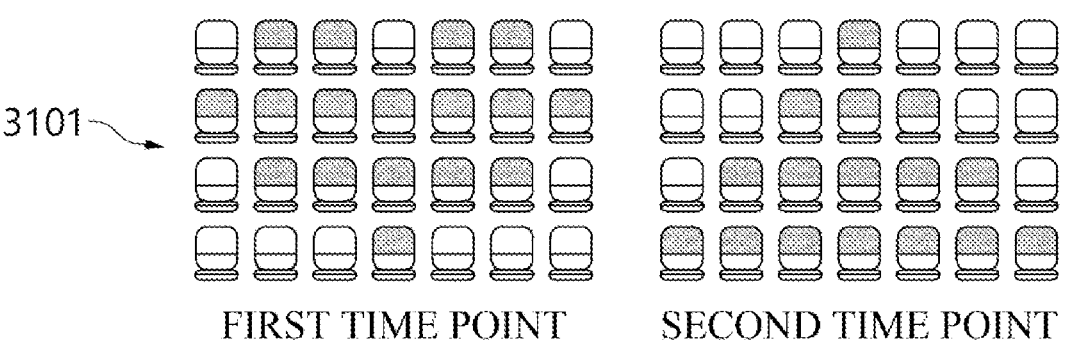
3101
FIRST TIME POINT          SECOND TIME POINT
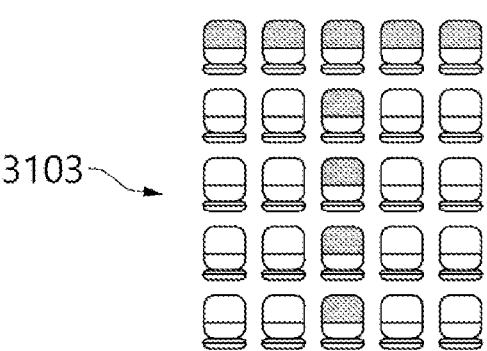
3103
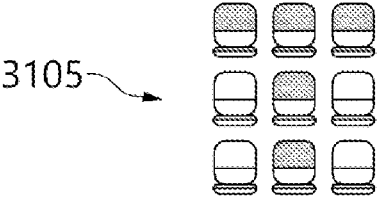
3105

FIG. 37
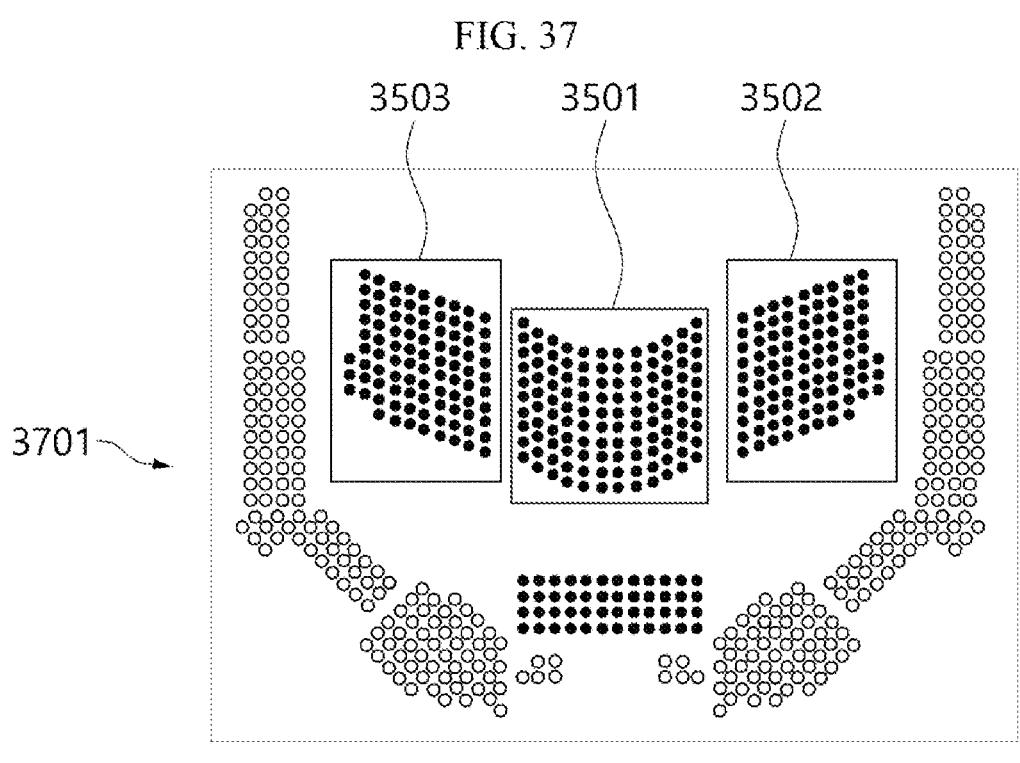
3503      3501      3502
3701
PERFORMNACE VENUE ZONE
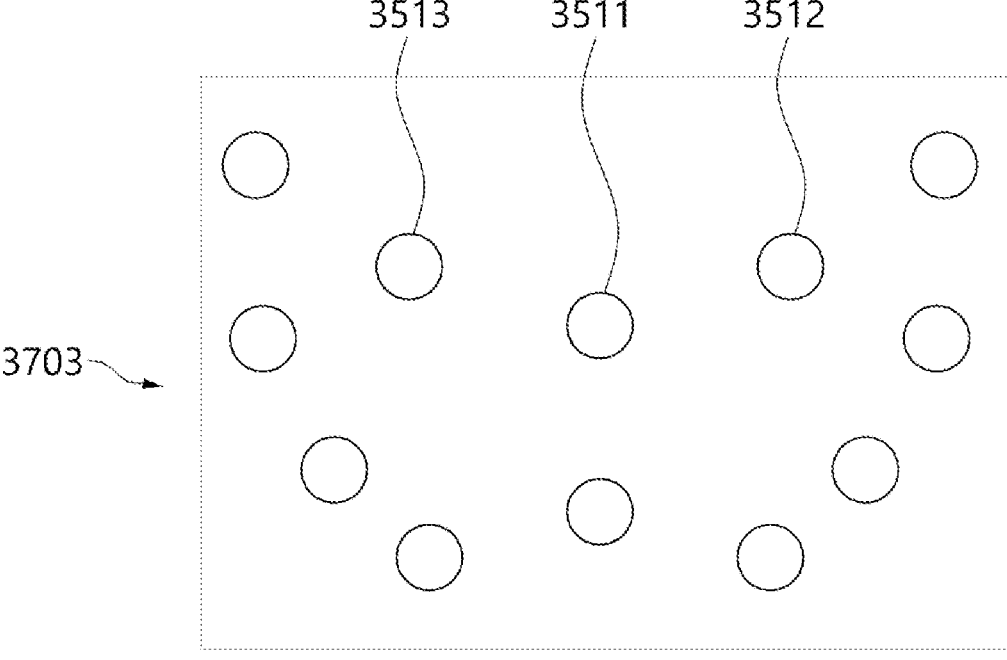
3513      3511      3512
3703
CHEERING GROUP FIG. 38
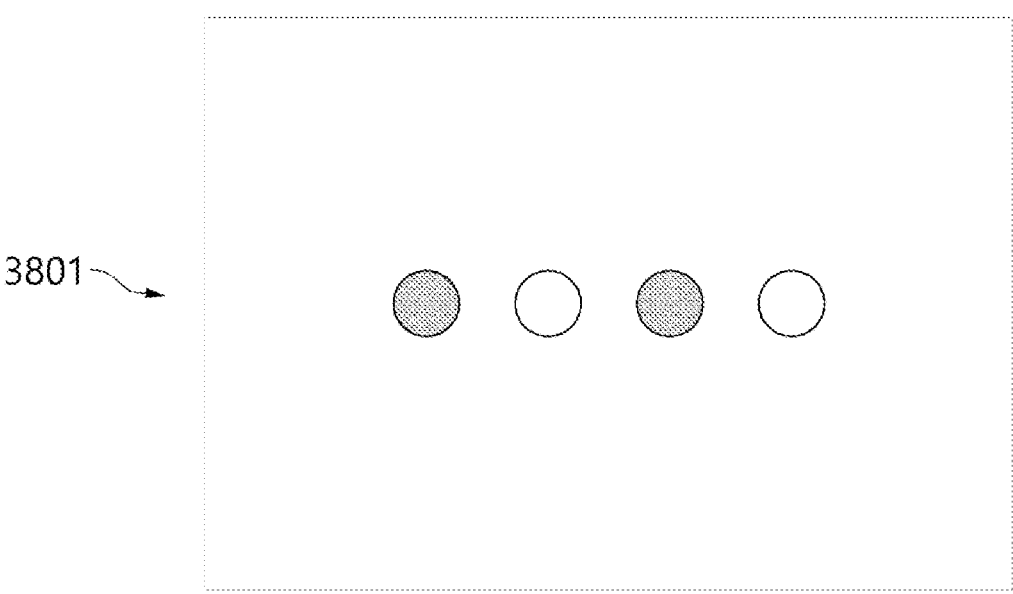
3801
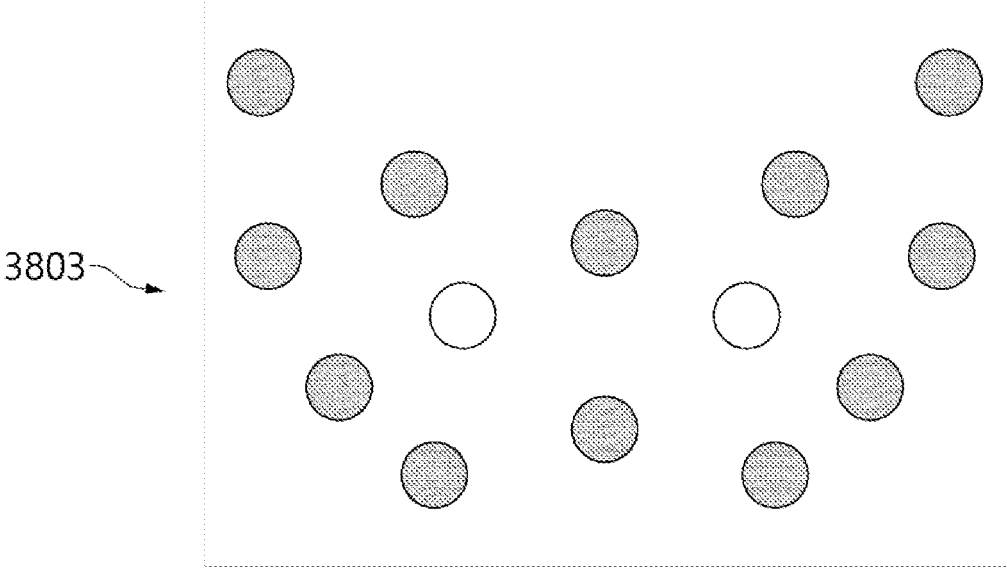
3803

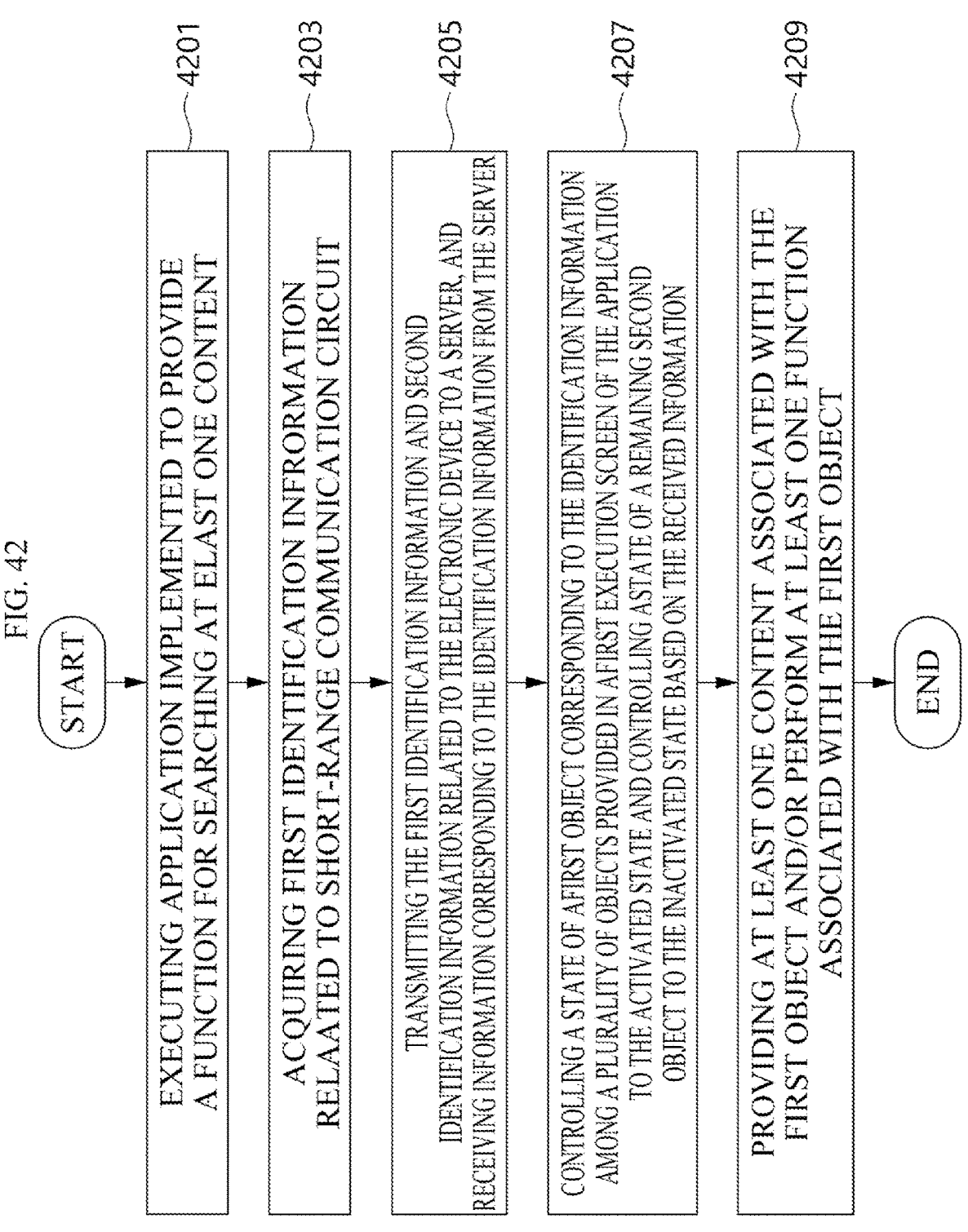

START

EXECUTING APPLICATION IMPLEMENTED TO PROVIDE A FUNCTION FOR SEARCHING AT ELAST ONE CONTENT ~4201

ACQUIRING FIRST IDENTIFICATION INFROMATION RELAATED TO SHORT-RANGE COMMUNICATION CIRCUIT ~4203

TRANSMITTING THE FIRST IDENTIFICATION INFORMATION AND SECOND IDENTIFICATION INFORMATION RELATED TO THE ELECTRONIC DEVICE TO A SERVER, AND RECEIVING INFORMATION CORRESPONDING TO THE IDENTIFICATION INFORMATION FROM THE SERVER ~4205

CONTROLLING A STATE OF A FIRST OBJECT CORRESPONDING TO THE IDENTIFICATION INFORMATION AMONG A PLURALITY OF OBJECTS PROVIDED IN A FIRST EXECUTION SCREEN OF THE APPLICATION TO THE ACTIVATED STATE AND CONTROLLING AS TATE OF A REMAINING SECOND OBJECT TO THE INACTIVATED STATE BASED ON THE RECEIVED INFORMATION ~4207

PROVIDING AT LEAST ONE CONTENT ASSOCIATED WITH THE FIRST OBJECT AND/OR PERFORM AT LEAST ONE FUNCTION ASSOCIATED WITH THE FIRST OBJECT ~4209

END

FIG. 45A

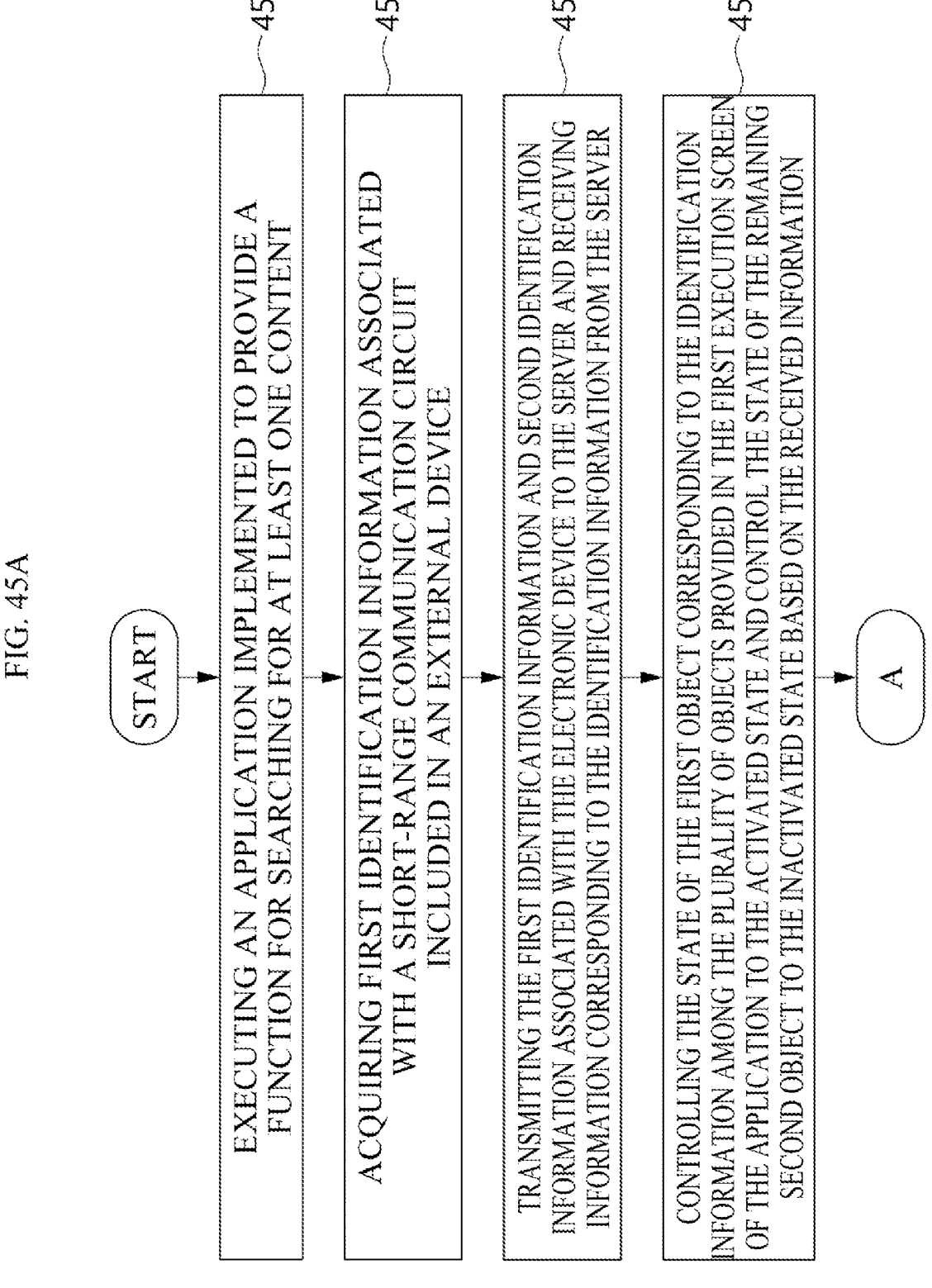

START

4501
EXECUTING AN APPLICATION IMPLEMENTED TO PROVIDE A FUNCTION FOR SEARCHING FOR AT LEAST ONE CONTENT

4503
ACQUIRING FIRST IDENTIFICATION INFORMATION ASSOCIATED WITH A SHORT-RANGE COMMUNICATION CIRCUIT INCLUDED IN AN EXTERNAL DEVICE

4505
TRANSMITTING THE FIRST IDENTIFICATION INFORMATION AND SECOND IDENTIFICATION INFORMATION ASSOCIATED WITH THE ELECTRONIC DEVICE TO THE SERVER AND RECEIVING INFORMATION CORRESPONDING TO THE IDENTIFICATION INFORMATION FROM THE SERVER

4507
CONTROLLING THE STATE OF THE FIRST OBJECT CORRESPONDING TO THE IDENTIFICATION INFORMATION AMONG THE PLURALITY OF OBJECTS PROVIDED IN THE FIRST EXECUTION SCREEN OF THE APPLICATION TO THE ACTIVATED STATE AND CONTROL THE STATE OF THE REMAINING SECOND OBJECT TO THE INACTIVATED STATE BASED ON THE RECEIVED INFORMATION

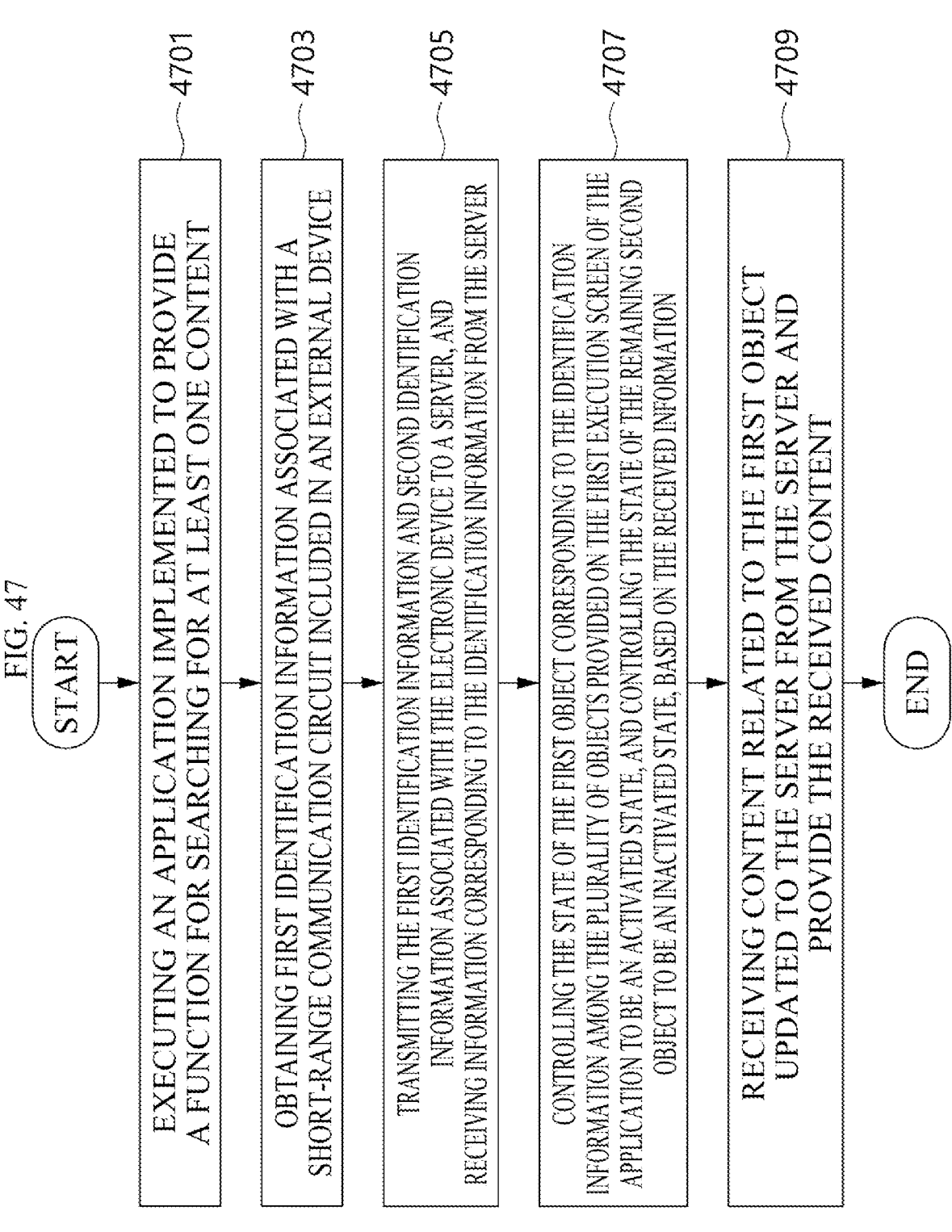

START

4701 — EXECUTING AN APPLICATION IMPLEMENTED TO PROVIDE A FUNCTION FOR SEARCHING FOR AT LEAST ONE CONTENT

4703 — OBTAINING FIRST IDENTIFICATION INFORMATION ASSOCIATED WITH A SHORT-RANGE COMMUNICATION CIRCUIT INCLUDED IN AN EXTERNAL DEVICE

4705 — TRANSMITTING THE FIRST IDENTIFICATION INFORMATION AND SECOND IDENTIFICATION INFORMATION ASSOCIATED WITH THE ELECTRONIC DEVICE TO A SERVER, AND RECEIVING INFORMATION CORRESPONDING TO THE IDENTIFICATION INFORMATION FROM THE SERVER

4707 — CONTROLLING THE STATE OF THE FIRST OBJECT CORRESPONDING TO THE IDENTIFICATION INFORMATION AMONG THE PLURALITY OF OBJECTS PROVIDED ON THE FIRST EXECUTION SCREEN OF THE APPLICATION TO BE AN ACTIVATED STATE, AND CONTROLLING THE STATE OF THE REMAINING SECOND OBJECT TO BE AN INACTIVATED STATE, BASED ON THE RECEIVED INFORMATION

4709 — RECEIVING CONTENT RELATED TO THE FIRST OBJECT UPDATED TO THE SERVER FROM THE SERVER AND PROVIDE THE RECEIVED CONTENT

END

FIG. 49

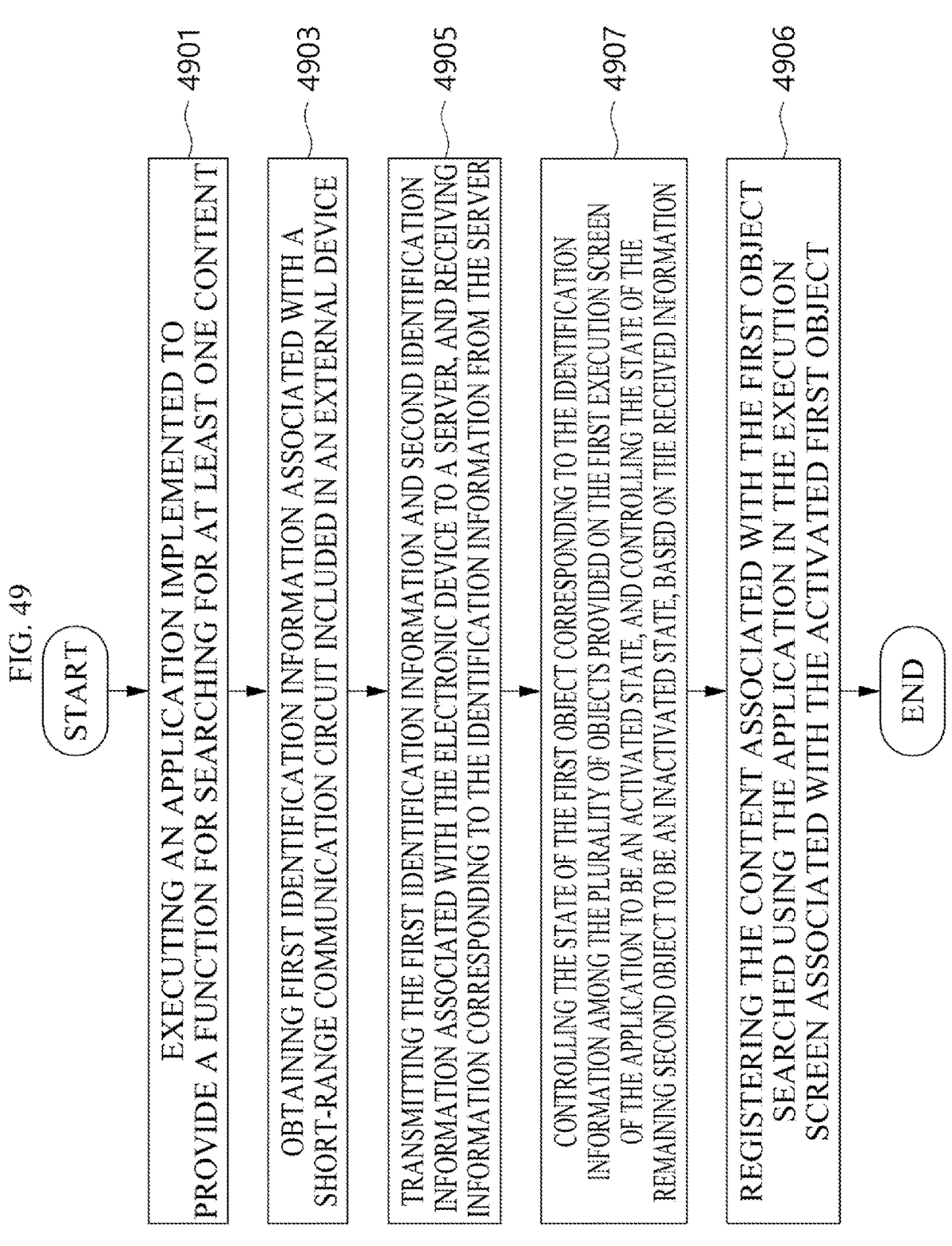

START

4901
EXECUTING AN APPLICATION IMPLEMENTED TO PROVIDE A FUNCTION FOR SEARCHING FOR AT LEAST ONE CONTENT

4903
OBTAINING FIRST IDENTIFICATION INFORMATION ASSOCIATED WITH A SHORT-RANGE COMMUNICATION CIRCUIT INCLUDED IN AN EXTERNAL DEVICE

4905
TRANSMITTING THE FIRST IDENTIFICATION INFORMATION AND SECOND IDENTIFICATION INFORMATION ASSOCIATED WITH THE ELECTRONIC DEVICE TO A SERVER, AND RECEIVING INFORMATION CORRESPONDING TO THE IDENTIFICATION INFORMATION FROM THE SERVER

4907
CONTROLLING THE STATE OF THE FIRST OBJECT CORRESPONDING TO THE IDENTIFICATION INFORMATION AMONG THE PLURALITY OF OBJECTS PROVIDED ON THE FIRST EXECUTION SCREEN OF THE APPLICATION TO BE AN ACTIVATED STATE, AND CONTROLLING THE STATE OF THE REMAINING SECOND OBJECT TO BE AN INACTIVATED STATE, BASED ON THE RECEIVED INFORMATION

4906
REGISTERING THE CONTENT ASSOCIATED WITH THE FIRST OBJECT SEARCHED USING THE APPLICATION IN THE EXECUTION SCREEN ASSOCIATED WITH THE ACTIVATED FIRST OBJECT

END

FIG. 50

ELECTRONIC DEVICE FOR PROVIDING DIGITAL CONTENT BASED ON SHORT RANGE WIRELESS COMMUNICATION AND OPERATION METHOD OF THE SAME

CROSS-REFERENCE TO RELATED APPLICATIONS

This application is a bypass continuation of International PCT Application No. PCT/KR2022/013506, filed on Sep. 8, 2022, which claims priority to Republic of Korea Patent Application No. 10-2021-0124099, filed on Sep. 16, 2021, Republic of Korea Patent Application No. 10-2021-0124100, filed on Sep. 16, 2021, Republic of Korea Patent Application No. 10-2021-0124101, filed on Sep. 16, 2021, Republic of Korea Patent Application No. 10-2021-0124102, filed on Sep. 16, 2021 and Republic of Korea Patent Application No. 10-2022-0112705, filed on Sep. 6, 2022, which are incorporated by reference herein in their entirety.

BACKGROUND

Field

The present disclosure relates to electronic device for providing digital content based on short range communication and operation method of the same.

Related Art

As communication technology has developed, research and development and demand for Internet of Things technology that can perform communication connections between things and transmit information has increased by embedding sensors and communication modules in various devices (e.g., home appliances, mobile equipment, and embedded systems including various sensors) provided in the house.

In the case of conventional IoT technology, a method of transmitting various information measured through various devices to a user terminal or a method of implementing a smart home that controls devices connected by the user terminal through the Internet is used. However, in the case of existing technology, there has been limitations in that signals or messages cannot be exchanged in real time.

One problem to be solved is to provide a kit that performs various functions without causing communication failure even when the kit is recognized by the electronic device and an electronic device in which the kit is inserted. Another problem to be solved is to provide a communication method that can more efficiently transmit and receive messages using the electronic device.

Another problem to be solved is to provide a communication method that can allow a user to transmit and receive secret messages through a social media server.

Another problem to be solved is to provide a method of providing a response message to more effectively perform a response to the performance content using the electronic device.

Another problem to be solved is to provide a customized search function by the electronic device through short-range wireless communication technology.

The problem to be solved in the present application are not limited to the above tasks, and the tasks that are not mentioned will be clearly understood by those skilled in the art from the present specification and the accompanying drawings.

SUMMARY

According to an embodiment, a kit including a photo film projected by light includes, a support member composed of a light shielding material, and a central region representing a region within a predetermined distance from the center of the kit is formed as an empty space; a photo film including the photo layer composed of a material having a higher light transmittance than the support member, and supported by the support member; a fixing member pressing at least a part of the photo film member to fix the photo film member to the support member, and contacting the support member; a cover member contacting the fixing member and the support member, and exposing one surface to the outside of the kit; a communication module disposed under the cover member; and an alignment member disposed under the communication module, wherein the alignment member includes a magnet, wherein the photo film may include a first region of the photo film disposed at the center so that at least a part of the light is transmitted through the photo film when light is irradiated through the central region, and a second region of the photo film may be contacted to the support member so that the photo film is supported by the support member.

Solutions of the technical problem of the present application are not limited to the above-described solutions, and solutions that are not mentioned may be clearly understood by those skilled in the art from the specification and the accompanying drawings.

According to various embodiments, even when the kit is recognized by the electronic device, it is possible to perform various functions without causing a communication failure.

According to various embodiments, the message may be transmitted and received more efficiently using the electronic device.

According to various embodiments, the user may transmit and receive a confidential message through the social media server.

According to various embodiments, the performance content may be more effectively supported by the electronic device.

According to various embodiments, the method of operating the electronic device may provide digital content corresponding to the external device.

The effects of the present application are not limited to the above-described effects, and the effects that are not mentioned may be clearly understood by those skilled in the art from the present specification and the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a diagram for describing a display of an electronic device according to an embodiment.

FIG. 5 is a diagram for describing a heat dissipation part of an electronic device according to an embodiment.

FIG. 6 is a diagram for describing a kit insertion structure of an electronic device according to an embodiment.

FIG. 7 is a diagram for describing a projection part according to an embodiment.

FIG. 20 is a diagram for describing an example of a common message according to an embodiment.

FIG. 24 is a diagram for describing an example of a secret message according to an embodiment.

FIG. 26 is a diagram for describing an example of secret message generation according to an embodiment.

FIG. 27 is a diagram for describing an example of secret rule information generation according to an embodiment.

FIG. 31 is a diagram for explaining an output of an emergency message in the electronic device, according to an embodiment.

FIG. 37 is a diagram for explaining various types of emergency messages, according to an embodiment.

FIG. 38 is a diagram for explaining various types of emergency messages, according to another embodiment.

FIG. 41 is a block diagram of an electronic device and a block diagram of a server, according to various embodiments.

FIG. 42 is a flowchart for explaining a method for providing digital content based on short-range wireless communication by an electronic device, according to various embodiments.

FIGS. 45A and 45B are flowcharts for explaining a method for providing digital content based on short-range wireless communication by an electronic device, according to various embodiments.

FIG. 47 is a flowchart for explaining a method for providing digital content based on short-range wireless communication by an electronic device, according to various embodiments.

FIG. 49 is a flowchart for explaining a method for providing digital content based on short-range wireless communication by an electronic device, according to various embodiments.

FIG. 50 is a diagram for explaining a function of registering digital content by an electronic device, according to various embodiments.

DETAILED DESCRIPTION

Figure 1:
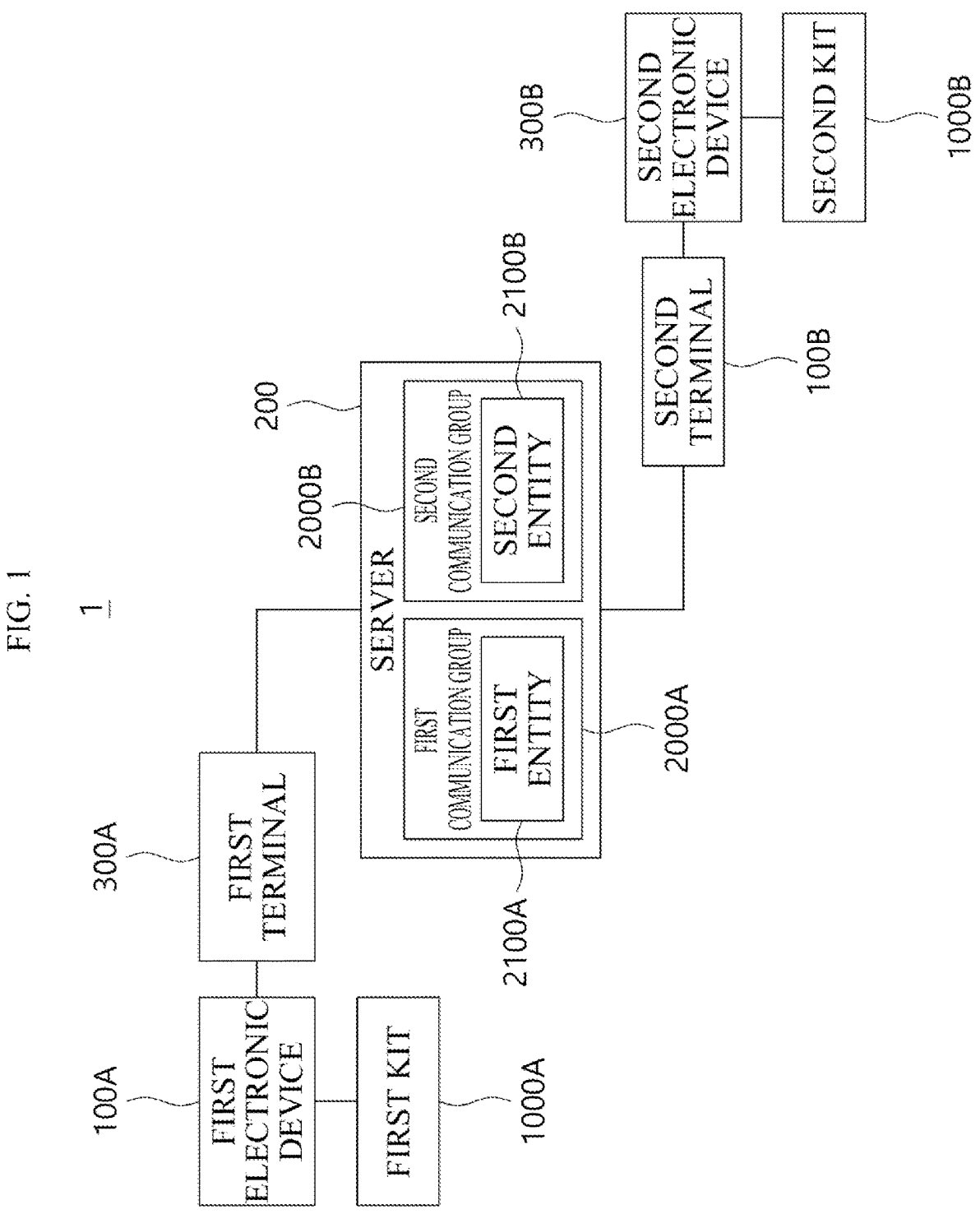
FIG. 1 is a diagram for describing a communication system according to an embodiment.

The embodiments described herein are for clearly illustrating the spirit of the present invention to those skilled in the art to which the present invention pertains, so the present invention is not limited to the embodiments described herein, and the scope of the present invention should be interpreted as including modifications or variations that do not depart from the spirit of the present invention.

The terms used in this specification have selected general terms that are currently widely used as possible in consideration of the functions in the present invention, but this may vary depending on the intention, precedent, or the appearance of new technologies by those with ordinary knowledge in the technical field to which the present invention pertains. However, in contrast, when a specific term is defined and used in arbitrary meanings, the meaning of the term will be separately described. Therefore, the terminology used herein should be interpreted based on the actual meaning of the terminology and the contents throughout this specification rather than the simple name of the terminology.

The drawings attached to the present specification are for easily explaining the present invention, and the shape illustrated in the drawings may be exaggerated and displayed as necessary to help understanding the present invention, so the present invention is not limited by the drawings.

In the present specification, when it is judged that a detailed description of a known configuration or function related to the present invention may obscure the gist of the present invention, detailed descriptions thereof will be omitted as necessary.

According to an embodiment, a kit including a photo film projected by light may include a support member configured of a light-shielding material, and a central region representing a region within a predetermined distance from the center of the kit is formed as an empty space; a photo film including the photo layer configured of a material having a higher light transmittance than the support member, and supported by the support member; a fixing member that presses at least a portion of the photo film member and contacts the support member to fix the photo film member to the support member; a cover member that contacts the fixing member and the support member, and exposes one surface to the outside of the kit; a communication module disposed under the cover member; and an alignment member disposed under the communication module, the alignment member including a magnet, wherein the photo film may include a first region of the photo film disposed at the center so that at least a portion of the light passes through the photo film when the light is irradiated through the central region, and a second region of the photo film may contact the support member so that the photo film is supported by the support member.

The photo film may include a first protective layer disposed under the photo layer; and a second protective layer disposed above the photo layer, and the thickness of the first protective layer may be thicker than the thickness of the second protective layer.

The kit may further include a weight member located on the alignment member and including a metal; and a shielding member disposed between the communication module and the weight member.

The shielding member may be configured such that the size of the shielding member is larger than the size of the communication module, and the shielding member may block the contact between the communication module and the weight member so that the communication interference in the communication module by the weight member is reduced.

The kit may further include a shielding member disposed between the communication module and the alignment member, and the surface of the alignment member may be coated by a metal.

The shielding member may be configured such that a size of the shielding member is larger than a size of the communication module, and the chaff member may block contact between the communication module and the alignment member, such that communication interference in the communication module by the surface of the alignment member is reduced.

The first surface of the fixing member may be in contact with the second protective layer, and the second surface of the fixing member may be in contact with the first protective layer, the photo layer, and the second protective layer.

In the fixing member, the central region may be formed as an empty space.

When the kit is inserted into the electronic device, the kit may be aligned to the predetermined position of the electronic device by a magnetic force formed between the magnet disposed at the predetermined position of the electronic device and the alignment member.

The electronic device according to another embodiment may accommodate the kit therein.

The electronic device may include a communication unit and a control unit that controls the electronic device, and the control unit may acquire an identifier of the kit from a communication module of the kit through the communication unit, and may perform communication with a terminal corresponding to the electronic device using the acquired identifier of the kit.

The electronic device may further include a projection unit, and the projection unit may project the photo layer by outputting a light source to the photo layer.

The electronic device may further include a kit accommodating part, and a magnet may be disposed at a predetermined position of the kit accommodating part, and the kit may be aligned using a magnetic force formed between the disposed magnet and the alignment member of the kit.

According to another embodiment, a communication method of a terminal using an electronic device may include: obtaining first advertising data including identification information of the electronic device and identification information of a kit recognized by the electronic device, wherein the first advertising data is broadcasted by the electronic device; generating entity activation information based on the identification information of the electronic device and the identification information of the kit included in the first advertising data; providing the entity activation information to the server such that the entity corresponding to the kit is activated by the server; and when the entity corresponding to the kit is activated by the server, accessing the entity to obtain a message.

The entity may be included in a communication group corresponding to the kit.

The entity has any one of a transmission authority capable of transmitting a message, a reception authority capable of receiving a message, or a transmission and reception authority capable of transmitting and receiving the message, and the communication authority of the entity may be determined by the identification information of the commercial key kit or the communication authority information included in the kit.

Second advertising data including time information and state information of the electronic device may be acquired from the electronic device, and the time information and the state information may be provided to the server such that the state of the electronic device is updated by the server.

The state information of the electronic device may include at least one of power driving information of the electronic device, information on whether the kit is recognized in the electronic device, information on driving time of the electronic device, or user behavior information of the electronic device.

When the state information of the electronic device includes information that the kit is not recognized in the electronic device, the server may provide the state information of the electronic device to the server such that the entity is deactivated in response to the state information of the electronic device.

When the state information of the electronic device includes information indicating that the power of the electronic device is not driven, the activation of the entity may be maintained in the server.

The communication method may further include transmitting response data to the second advertising data to the electronic device such that the state information is updated in the electronic device.

The message may include at least one of a text message, a video message, an image message, a voice message, or a drawing message.

The communication method may further include providing the message to the electronic device.

If the message is not interpreted in the electronic device, the message may be processed so that the message is interpreted in the electronic device, and the processed message may be provided to the electronic device.

The providing of the message to the electronic device may include acquiring the size of the message, determining the communication mode of the terminal as the advertising mode when the size of the message is less than or equal to the reference size, and determining the communication mode of the terminal as the connection mode when the size of the message is greater than the reference size.

When the communication mode of the terminal is the advertising mode, the terminal may provide the message to the electronic device using at least one advertising data.

When the communication mode of the terminal is a cocking mode, the message may be provided to the electronic device after performing a scanning operation in response to the acquisition of the first advertising data and establishing a communication connection between the terminal and the electronic device according to the scanning operation.

According to another embodiment, a communication method of a terminal using a secret signal may include: acquiring content from a social media server; checking whether the terminal qualifies to acquire the secret signal corresponding to the content; acquiring the secret signal when the terminal qualifies to acquire the secret signal; and providing the acquired secret signal to an electronic device that performs communication with the terminal.

The secret signal may include a secret message and secret rule information for extracting the secret message from the content.

The step of checking whether the terminal is eligible to acquire the secret signal corresponding to the content may include checking a content provider that provided the content to the social media server, and if it is confirmed that the kit corresponding to the content provider is recognized by the electronic device, determining that the terminal is eligible to acquire the secret signal.

The step of checking whether the terminal qualifies to acquire the secret signal corresponding to the content may include checking a content provider provided with the content to the social media server, and if a kit is recognized in the electronic device, the entity corresponding to the kit is activated in the server that performs communication with the terminal, the entity is included in a communication group that can acquire a message from the content provider, and the entity is activated in the server, the terminal may determine to have the qualification to acquire the secret signal.

The obtaining of the secret signal may include obtaining the secret signal from the social media server.

The social media server may provide information that the terminal is eligible to acquire the secret signal, and in response to the provision of the information, the social media server may acquire the secret signal.

The obtaining of the secret signal may include accessing the entity and obtaining the secret signal from the server.

The secret rule information may include a specific condition and a secret message corresponding to the specific condition.

When the content is video content and a scene corresponding to the specific condition is reproduced in the video content, a secret message corresponding to the specific condition may be acquired.

The specific condition may include at least one of the presence of a specific object in the video content, the size of the specific object, the location of the specific object, and the movement of the specific object.

According to another embodiment, a method of communication of a social media server using a secret signal includes: acquiring content from a content provider; checking whether a secret signal corresponding to the content is qualified to be acquired by a terminal; and providing the secret signal to the terminal when the secret signal is qualified to be acquired by the terminal, wherein when a kit is recognized in an electronic device communicating with the terminal, the checking of whether an entity corresponding to the kit is activated in a server communicating with the terminal and whether the secret signal corresponding to the content is qualified to be acquired by the terminal may include: acquiring information on whether the entity is included in a communication group capable of acquiring a message from the content provider; and whether the entity is activated in the server from the server or the terminal; and determining whether the secret signal corresponding to the content is qualified to be acquired by the terminal based on the information.

According to another embodiment, a method of providing an emergency message of a terminal using an electronic device may include: acquiring a performance content from a performance content providing server; identifying a location of at least one electronic device; setting an emergency group based on the location of the at least one electronic device; and providing an emergency message corresponding to the performance content to an electronic device included in the emergency group.

The identifying of the location of the at least one electronic device may include: checking a performer of the performance content; checking whether a kit recognized in the at least one electronic device corresponds to a performer in the performance content; and identifying the location of the at least one electronic device when the kit recognized in the at least one electronic device corresponds to a performer in the performance content.

The identifying of the location of the at least one electronic device may include: checking the location of the at least one electronic device based on a received signal received from the at least one electronic device.

The identifying of the location of the at least one electronic device may include: acquiring location information of the at least one electronic device from the at least one electronic device.

The identifying of the location of the at least one electronic device may include: identifying the at least one electronic device; and setting the location of the at least one electronic device using map information indicating a configuration form in which the identified at least one electronic device can be disposed.

The identifying of the location of the at least one electronic device may include: setting the location of the at least one electronic device by matching at least one object of the map information and the at least object of the at least one electronic device.

The setting of the emergency group based on the location of the at least one electronic device may include: setting the at least one electronic device based on a distance between the plurality of the at least electronic devices.

The providing of the emergency message corresponding to the performance content to an electronic device included in the emergency group may include: acquiring agency data used to control a plurality of agency devices in a venue; and generating the emergency message based on the agency data.

The attention message may include operation information that should be performed in the electronic device included in the attention group and time information corresponding to the operation information, and the time information may include at least one of start time information, maintenance time information, or end time information of the operation.

The attention message may be obtained from the performance content providing server.

The terminal may analyze the performance content and generate the attention message based on the analysis result.

According to various embodiments, there may be provided an operating method of an electronic device, the method including: executing an application implemented to provide a function for searching for at least one content associated with at least one artist; and acquiring a data set associated with a short-range communication circuit included in the external device when the external device is in contact with the external device, wherein the data set includes identification information associated with the external device, and controlling a state of a first album object corresponding to the identification information to an activated state among at least one album object corresponding to at least one album of a particular artist provided in a first execution screen of the application and controlling a state of the remaining second album object to an inactivated state; when the first album object is selected: providing a second execution screen of the application including at least one first content associated with the first album object; and registering a particular photo card based on photographing a photo card associated with the external device and providing a third execution screen of the application including at least one second content associated with the particular photo card.

According to various embodiments, the operation of registering the particular photo card and providing a third execution screen of the application including at least one second content associated with the particular photo card may include: photographing an image of the photo card through a camera; and receiving information about at least one second content associated with the particular photo card based on transmitting the photographed image to a server.

According to various embodiments, there may be provided an operating method in which the at least one album object in the inactivated state is set to provide a function of guiding contact of the external device to the electronic device when the electronic device is selected.

According to various embodiments, there may be provided an operating method in which the first album object controlled to the activated state is set to provide a function of providing the second execution screen and the third execution screen, and the remaining second album object is set to maintain to provide a function of guiding contact of the external device to the electronic device when the electronic device is selected.

According to various embodiments, there may be provided an operating method in which the second execution screen of the application including at least one first content associated with the first album object includes: updating at least one first content associated with the first album object and updating the second execution screen to include the updated at least one first content.

According to various embodiments, there may be provided an operating method further including: adding at least one content searched through the application implemented to provide a function of searching at least one content associated with the at least one artist to the second execution screen.

According to various embodiments, there may be provided an operating method of an electronic device, the method including: executing an application implemented to provide a function for searching for at least one content; acquiring a data set associated with a short-range communication circuit included in the external device when the external device is in contact with the external device; wherein the data set includes identification information associated with the external device, controlling a state of a first content group corresponding to the identification information of a specific content group to an activated state, and controlling a state of a second content group remaining to an inactivated state among a plurality of content groups provided on a first execution screen of the application; and providing at least one digital content associated with the first content group.

According to various embodiments, there may be provided an operating method further including: capturing an image corresponding to the specific content group; and providing at least one digital content corresponding to the captured image.

According to various embodiments, there may be provided an operating method of providing at least one digital content associated with the first content group including: including at least one content searched through the application implemented to provide a function for searching for the at least one content in at least one digital content associated with the first content group.

According to various embodiments, there may be provided an operating method of providing at least one digital content associated with the first content group including: updating at least one digital content associated with the first content group; and providing the updated at least one digital content.

Hereinafter, a communication system according to an embodiment of the present invention will be described.

1. Overview of a Communication System

Hereinafter, an electronic device and a communication system for communication of an electronic device, that may be identified as a device of a communication group based on various information included in an external device (hereinafter, a kit) identifiable by the electronic device and may transmit or receive various signals through at least one communication group managed by a server, will be described.

FIG. 1 is a diagram for describing a communication system according to an embodiment.

The communication system 1 according to an embodiment may include electronic devices 100A and 200B and a server 200.

In addition, according to an embodiment, the communication system 1 may further include terminals 300A and 300B, and the terminals 300A and 300B may communicate between the electronic devices 100A and 200B and the server 200. Here, the terminals 300A and 300B are devices that a user may carry or use, and for example, the terminals 300A and 300B may be in the form of a mobile, a smartphone, a tablet, or the like. In addition, the terminals 300A and 300B may be configured in various forms that, tv set-top box, a home theater, and the like a user may use.

Of course, in some cases, the server 200 may communicate with the electronic devices 100A and 200B without the terminals 300A and 300B.

In one embodiment, the server 200 may manage a plurality of communication groups 2000A and 2000B, and the plurality of communication groups 2000 may include at least one entity 2100A and 2100B, respectively.

Here, the communication groups 2000A and 2000B may mean a group having a communication connection relationship formed so that signals or messages can be transmitted or received (or acquire) between the electronic devices 100A and 200B or the terminals 300B of a and 300B of a specific group.

In addition, entities 2100A and 2100B of communication groups 2000A and 2000B may mean entities in communication groups 2000A and 2000B to which electronic devices 100A and 200B or terminals 300A and 300B can access. That is, entities 2100A and 2100*b* may mean a logical unit for logically distinguishing electronic devices 100A and 200B or terminals 300A and 300B from the communication system 1 other than physically. For example, when a message is received in communication groups 2000A and 2000B, electronic devices 100A and 200B or terminals 300A and 300B may access entities 2100A and 2100*b* of communication groups 2000A and 2000B, and thus entities 2100A and 2100*b* may be activated in communication groups 2000A and 2000B. Here, the entity activated may mean that the entity has become a state in which the message may be transmitted or received in the communication group.

As the entities 2100A and 2100*b* are activated, electronic devices 100A and 200B or terminals 300A and 300B may receive the message from communication groups 2000A and 2000B. If electronic devices 100A and 200B or terminals 300A and 300B are not accessed entities 2100A and 2100*b*, entities 2100A and 2100*b* may be deactivated in communication groups 2000A and 2000B, and thus electronic devices 100A and 200B or terminals 300A and 300B may not receive the message from communication groups 2000A and 2000B.

For example, in the communication system 1, the account of each user in the sns service may be entities 2100A and 2100*b*, and electronic devices 100A and 200B or terminals

300A and 300B may access the account and receive messages from the server 200 or transmit messages through the server 200.

The entities 2100A and 2100*b* included in different communication groups may transmit or receive various signals or messages in real time or non-real time through the server 200. In addition, according to embodiments, entities 2100A and 2100*b* included in different communication groups may not have authority to communicate with each other, and in this case, entities 2100A and 2100*b* included in different communication groups may not transmit and receive various signals or messages with each other.

In addition, the communication authority of entities 2100A and 2100*b* belonging to communication groups 2000A and 2000B may be set according to communication groups 2000A and 2000B. For example, the entities 2100A included in the first communication group 2000A may have transmission authority to transmit signals or messages to the entities 2100*b* included in the second communication group 2000B, and the entities 2100*b* included in the second communication group 2000B may have reception authority to receive signals or messages from the entities 2100A included in the first communication group 2000A. Of course, the aforementioned communication authority may include transmission and reception authority to transmit and receive both.

In addition, according to embodiments, different communication authorities may be set for entities 2100A and 2100*b* within a single communication group. For example, when the first entity 2100A and the third entity (not shown) are included in the first communication group 2000A, the first entity 2100A may have transmission and reception authority and the third entity (not shown) may have reception authority.

As such, the communication system 1 may be utilized in various ways. For example, the communication system may be used for communication between stars (or entertainments, celebrities, etc.) and fans. In general, the number of fans in a specific star (or a specific group including a plurality of celebrities) may be larger than the number of specific stars. As such, since the number of stars and fans is asymmetric, it may be efficient for the star to transmit a message and for the fan to receive a message according to difficulties in checking all messages of the entire fan. Therefore, in the communication system, when the first communication group 2000A has a transmission authority, the second communication group 2000B has a reception authority, the first communication group 2000A includes the star's entity 2100A, and the second communication group 2000B includes the fan's entity 2100B, communication between the star and the fan may be efficiently performed through the communication system 1. Of course, in some cases, the first communication group 2000A may have a reception authority, and the second communication group 2000B may have a transmission authority.

As another example, the communication system 1 may be used for communication between general users rather than the star. For example, both the first communication group 2000A and the second communication group 2000B may have transmission and reception authority, the first user's entity 2100A may be included in the first communication group 2000A, and the second user's entity 2100B may be included in the second communication group 2000B, so that the first user and the second user may perform communication.

Such communication groups 2000A and 2000B and entities 2100A and 2100B may be identified by the kits 1000A and 1000B. For example, the first electronic device 100A may acquire identification information of the first kit 1000A to access the first entity 2100A, and the second electronic device 100 *b* may acquire identification information of the second kit 1000B to access the second entity 2100B.

Hereinafter, the electronic devices 100A and 100 *b* and the kits 1000A and 1000B will be described in detail. However, for convenience of description, the electronic devices 100A and 100 *b* will be expressed by the electronic device 100, and the kits 1000A and 1000B will be expressed by the kits 1000. In addition, the terminals 300A and 300B will be expressed by the terminal 300, and the entities 2100A and 2100B will be expressed by the entities 2100.

2. Electronic Device and Kit 2.1. Electronic Device

Figure 2:
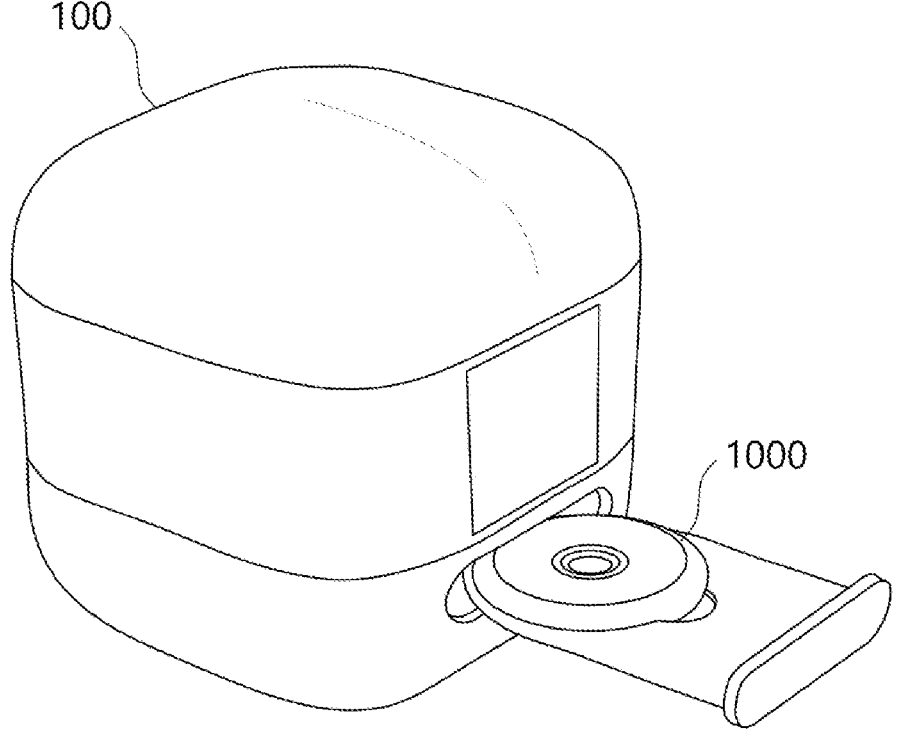
FIG. 2 is a diagram for describing an operation of an electronic device according to an embodiment.

FIG. 2 is a diagram for describing an operation of an electronic device according to an embodiment.

Referring to FIG. 2, the form of the electronic device 100 illustrated in FIG. 2 is implemented in the form of a speaker or a mood lamp, but this is merely an embodiment and may be implemented in various forms. For example, the electronic device 100 may be implemented in various forms, such as a wrist type, a whole body type, a variety of wearable devices, a key holder, and the like.

In an embodiment, the electronic device 100 may acquire at least one of identification information of the kit 1000, communication group information, and communication authority information from the kit 1000. Specifically, the electronic device 100 may acquire at least one of identification information of the kit 1000, communication group information, or communication authority information stored in the tag.

In addition, as described below, the identification information of the kit 1000, communication group information, and communication authority information may be used to activate the entity belonging to the communication group. Therefore, the identification information of the kit 1000, communication group information, and communication authority information may be expressed as entity activation information.

FIG. 2 illustrates an embodiment in which the kit 1000 is inserted into the electronic device 100 And the electronic device 100 is tagged with a radio frequency identification (RFID) tag or a near field communication (NFC) tag included in the kit 1000 inserted therein but is not limited thereto. As another example, the kit 1000 may not be inserted into the electronic device 100 but may be attached to a member including a reader (e.g., an RFID reader or an NFC reader) existing in various areas on the electronic device 100, such as a side area and an upper area.

Meanwhile, in the entity activation information, the identification information of the kit 1000 may mean unique information that can identify the kit 1000, and for example, may include a hardware key of the kit 1000, and a unique key allocated to the kit 1000 in the manufacturing stage of the external device 10.

In addition, the information on the communication group may include information that can identify the communication group corresponding to the kit 1000 among the plurality of communication groups. For example, when the kit 1000 is a device corresponding to the first communication group among the plurality of communication groups, the information on the communication group may include a unique identifier of the first communication group that can identify the first communication group among the plurality of communication groups.

In addition, the communication authority information may include information on what authority the electronic device 100 tagged with the tag (e.g., the RFID tag or the NFC tag) of the kit 1000 has on the communication group. For example, the communication authority information may include information on what communication authority the electronic device 100 has among the transmission authority, the reception authority, and the transmission and reception authority of the communication group.

In addition, in an embodiment, the identification information of the kit 1000, the information on the communication group, and the communication authority information may be selectively included in the entity activation information. For example, when a specific communication authority is assigned to the communication group and the entities included in the communication group have the same communication authority, the identification information of the kit 1000 and the communication authority information may be included in the entity activation information. As another example, when the server can identify the communication authority of the communication group and the entity based on the identification information of the kit 1000, the identification information of the kit 1000 may be included without the information on the communication group and the communication authority information.

In addition, the electronic device 100 may transmit at least one of the identification information of the kit 1000, the information on the communication group, and the communication authority information obtained from the kit 1000 to the server. The electronic device 100 may transmit the information obtained from the kit 1000 to the server directly as well as the terminal communicating with the electronic device 100. Specifically, the electronic device 100 may perform communication connection with the terminal through various wireless communication modules (e.g., a Bluetooth module, a low energy Bluetooth module). In addition, the electronic device 100 may transmit various information obtained from the kit 1000 to the terminal 300 communicating with the terminal 300 using a wireless communication module. In addition, the terminal may transmit various information received from the electronic device 100 to the server.

Meanwhile, according to an embodiment, the electronic device 100 may include only a short-range communication module (e.g., a Bluetooth module) that can perform communication connection with the terminal located within a threshold distance and may not include a long-range communication module that can perform directly with the server. In this case, the electronic device 100 may transmit various signals to the server using the terminal.

Figure 3:
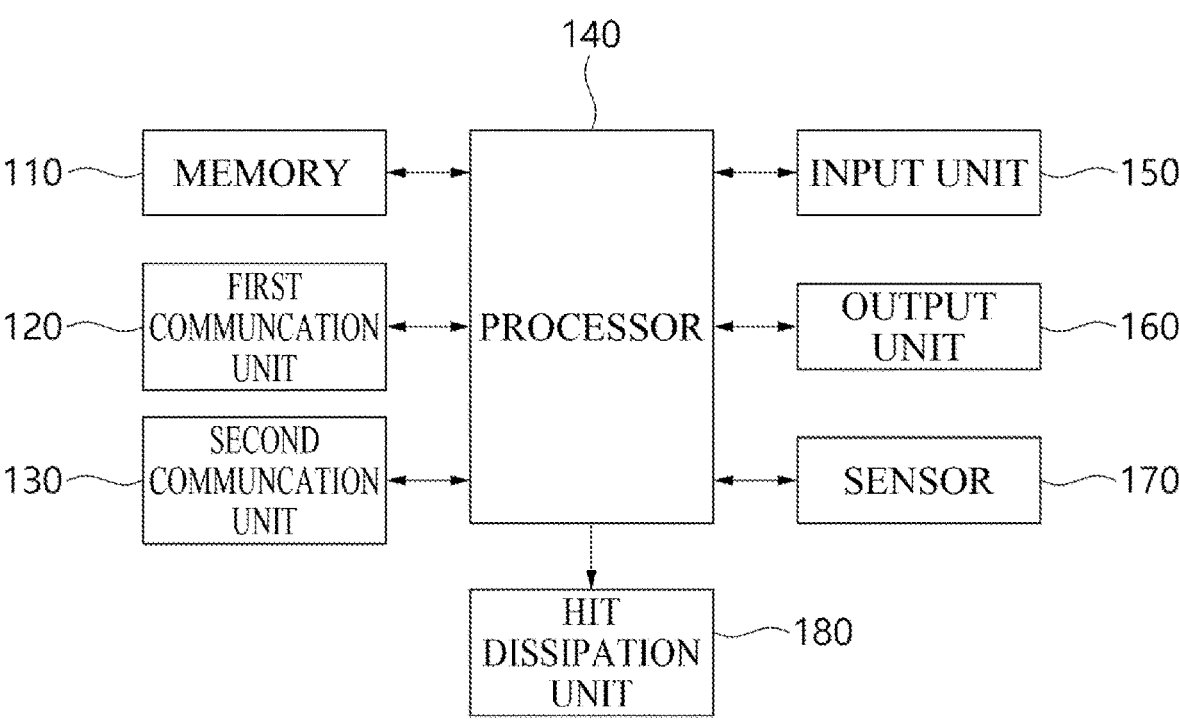
FIG. 3 is a block diagram of an electronic device according to an embodiment.

FIG. 3 is a block diagram of an electronic device according to an embodiment.

Referring to FIG. 3, the electronic device 100 may include a memory 110, a first communication unit 120, a second communication unit 130, a processor 140, an input unit 150, an output unit 160, a sensor 170, and a heat dissipation unit 180. However, the configuration shown in FIG. 3 is an exemplary diagram for implementing the embodiments, and appropriate hardware and software configurations at a level that will be apparent to those of ordinary skill in the art may be additionally included in the electronic device 100 or excluded from the electronic device 100.

The memory 110 may store instructions or data related to at least one other component of the electronic device 100. In addition, the memory 110 may be accessed by the processor 140 and may be read/write/modify/deleted/updated of data by the processor 140. Particularly, the memory 130 may be implemented as a non-volatile memory, a volatile memory, a flash memory, a hard disk drive (HDD), or a solid state drive (SSD). In the present disclosure, the term memory may include the memory 110, a ROM (not shown) in the processor 140, a RAM (not shown), or a memory card (not shown) (e.g., micro SD card, memory stick) mounted in the electronic device 100. In addition, the memory 110 may store programs and data for configuring various screens to be displayed in the display area of the display.

Particularly, the memory 110 may store an instruction set corresponding to at least one program that the processor 140 can execute. The instruction means one action statement that the processor 140 can directly execute in the programming writing language, and is a minimum unit for execution or operation of the program.

The first communicator 120 may include a communication module (e.g., RFID module or NFC module) that can acquire and identify information included in various tags (e.g., RFID tag or NFC tag). For example, each of the RFID module and the NFC module may include a RFID reader (or reader) and an NFC reader. When tagged to the RFID tag or the NFC tag included in an external device (e.g., the above-described kit), the first communicator 120 of the electronic device 100 may acquire at least one of identification information of the external device included in the RFID tag or the NFC tag, information on a communication group, or communication authority information.

The second communicator 130 may be configured to communicate with various devices such as a server or a terminal. The second communicator 130 may include various communication modules to communicate with various devices such as a terminal or a server. For example, the communicator 130 may include a wireless communication module, and may include a cellular communication module that uses at least one of LTE, LTE-A (LTE Advance), CDMA (code division multiple access), WCDMA (wideband CDMA), UMTS (universal mobile telecommunications system), WiBro (wireless broadband), 5G (5th generation), or GSM (global system for mobile communications). As another example, the wireless communication module may include at least one of WiFi (wireless fidelity), Bluetooth, Bluetooth, BLE, and Bluetooth low power (BLE).

According to an embodiment, the second communicator 130 may transmit/receive various information or signals to/from the terminal. For example, the second communicator 130 may be implemented with a Bluetooth module or Bluetooth low power (BLE), and may transmit/receive various information or signals to/from the terminal. As another example, the second communication unit 130 may transmit/receive information or signals to/from a server using a cellular communication module such as LTE-A (LTE Advance), 5G (5th generation), etc.

The processor 140 may be electrically connected to the memory 110 to control overall operations of the electronic device 100. Specifically, the processor 140 may acquire at least one of identification information of the kit, information on a communication group, or communication authority information through the first communicator 110. For example, the processor 140 may acquire various information by tagging a tag included in an external device using a module including an RFID reader or an NFC reader.

In addition, the processor 140 may control the second communicator 140 to transmit the identification information of the kit obtained from the kit, information on the communication group, or the communication authority information to the server. Meanwhile, the processor 140 may control the second communicator 140 to directly transmit various kinds of information to the server, but this is merely an example, and may control the second communicator 140 to transmit to the server by using the terminal. Specifically, the processor 140 may control the second communicator 140 to transmit various kinds of information to the terminal. In addition, the terminal may transmit information received from the electronic device 100 to the server.

In addition, when the electronic device 100 may access the entity of the communication group directly or through the terminal, the processor 140 may receive a signal provided by the entity of another communication group from the server through the second communication unit 130.

In an embodiment, the processor 140 may acquire data provided by entities of other communication groups and/or type information of the data through a server. In addition, the processor 140 may output a message corresponding to the acquired data. For example, when the processor 140 acquires the illumination color index data, the processor 140 may control the output unit 160 to output the illumination of the color corresponding to the acquired illumination color index data.

In an embodiment, when the electronic device or the terminal accesses the entities of the different communication group and the entities are activated in the different communication group, the processor 140 may receive, from the server, a signal indicating that the entities are activated in the different communication group through the second communication unit 140. In addition, the processor 140 may control the output unit 160 to output a message corresponding to the signal that the other entity is activated. For example, the processor 140 may output the lighting of the color corresponding to the other communication group or the entity. As another example, the processor 140 may control the speaker of the output unit 160 to output a message corresponding to the signal that the other entity is activated in a voice form. As another example, the processor 140 may control the display of the output unit 160 to display UI including a message corresponding to the signal that the other entity is activated.

In addition, the processor 140 may determine an entity to transmit data from among entities included in other communication groups. For example, the processor 140 may receive identification information of an entity of another communication group (or identification information of an electronic device or terminal accessible to the entity) through the second communication unit 140 through the server. The processor 140 may determine an entity to transmit data by using the received identification information of the entities of the other communication group. In addition, the processor 140 may control the second communication unit 140 to transmit a command to transmit a signal to the server only to the determined entity.

In addition, when data is input from the user through the input unit 150, the processor 140 may acquire input data and/or type information of the data. For example, when the processor 140 acquires drawing data from a user, the drawing data may include coordinate information on a region drawn on the touch panel of the input unit 150. In addition, the processor 140 may control the second communication unit 140 to transmit the drawing data to the server.

In addition, the processor 140 may change or add information on data included in the signal transmitted to the server according to the user's command. The processor 140 may receive user commands through the input unit 150 or may receive user commands through a terminal connected to the electronic device 100.

For example, when a user's voice including a specific call word is input from the terminal through the second communication unit 140, the processor 140 may acquire a user command (e.g., a light generating command of a specific color, a specific message output command, a specific voice output command, a command to transmit specific information to another device (e.g., a server, a terminal, another electronic device, etc.)). In addition, the processor 140 may add information on data to be transmitted to the server based on the user command. As a specific example, when a user's voice including a specific call word is input through the micro-implemented input unit 150, the processor 140 may control the second communication unit to transmit a signal including a color index number corresponding to the communication group and information to emit lighting of a color corresponding to the communication group to the server. When the electronic device corresponding to the entity of the other communication group receives the signal through the server, the electronic device corresponding to the entity of the other communication group may output a message corresponding to the received signal. For example, the electronic device corresponding to the entity of the different communication group may emit light emitting a color corresponding to the color index number included in the signal.

Meanwhile, the processor 140 may include one or more of a central processing unit (CPU), a micro controller unit (MCU), a micro processing unit (MPU), a controller, an application processor (AP), a communication processor (CP), or an ARM processor that processes digital signals, or may be defined as a corresponding term. In addition, the processor 140 may be implemented as a system on chip (SoC) or large scale integration (LSI), in which processing algorithms are embedded, or may be implemented in a field programmable gate array (FPGA) format. The processor 140 may perform various functions by executing computer executable instructions stored in the memory 110. In addition, the processor 140 may include at least one of a graphics-processing unit (GPU), a neural processing unit (NPU), and a visual processing unit (VPU), which are separate AI dedicated processors to perform artificial intelligence functions.

The input unit 150 includes a circuit and may receive a user input for controlling the electronic device 100. In particular, the input unit 150 may include a touch panel using a user's hand or a stylus pen, and a button for receiving a user's manipulation. For example, the input unit 150 implemented as a touch panel may receive drawing data from a user through a user's hand or various pointing devices. In addition, the input unit 150 may be implemented with other input devices (e.g., a keyboard, a mouse, a motion input unit, etc.).

In addition, the input unit 150 may include a microphone that may receive user voice. The microphone may be provided inside the electronic device 100, but may be provided outside and electrically connected to the electronic device 100. In addition, the microphone may receive a user's voice including a specific call word.

The output unit 160 includes a circuit and may output various signals and messages of the electronic device 100. The output unit 160 may include a display capable of outputting a screen including various messages. In addition, the output unit 160 may include a light emitting unit that outputs light of various colors. In addition, the output unit 160 may include a projection unit for projecting the photo film included in the kit.

The display, the light emitting unit, and the projection unit will be described with reference to the drawing shown in FIG. 4.

FIG. 4 is a diagram for describing a display of an electronic device according to an embodiment.

Referring to FIG. 4, the electronic device 100 may have the same shape as (a) of FIG. 4 and may be coupled with the cover 101 as (b) of FIG. 4. In addition, the display 161 may be disposed on at least one surface of the electronic device 100. For example, the display 161 may be disposed on one surface of the electronic device 100. In addition, the display 161 may be implemented as a touch screen together with a touch panel. In addition, the panel of the display can be implemented with various display technologies such as LCD (Liquid Crystal Display), OLED (Organic Light Emitting Diodes), AM-OLED (Active-Matrix Organic Light-Emitting Diode), LcoS (Liquid Crystal on Silicon), QLED (Quantum dot Light-Emitting Diode), and DLP (Digital Light Processing).

The output unit 160 implemented as the display 161 may display various information under the control of the processor 140. In particular, the display 161 may display drawing data received from entities of other communication groups under the control of the processor 140. In addition, the display 161 may display UI including a message corresponding to a signal that an entity is activated in another communication group.

In addition, the light-emitting unit 162 may include at least one light-emitting element. For example, when a plurality of light-emitting elements are included in the light-emitting unit 162, each of the plurality of light-emitting elements may output light having a unique color. In addition, when one light-emitting element is included in the light-emitting unit 1620, light having one color may be output from the light-emitting element or light of a plurality of colors may be switched and output.

The light output from the light emitter 162 may be blocked from the outside by the cover 101.

In addition, the projection unit 163 may project a photo film disposed in the kit. To this end, the projection unit 163 may be disposed to correspond to a position where the kit is inserted into the electronic device 100. For example, when the kit is located in the center of the electronic device 100, the projection unit 163 may be disposed in the center of the electronic device 100. The projection unit 163 will be described in more detail in the following description of FIG. 7.

Referring again to FIG. 3, the output unit 160 may be implemented as a speaker capable of outputting voices corresponding to various signals and messages. Specifically, the speaker may be a component that outputs various notification sounds or voice messages as well as various audio data that has been processed by audio processing units (not shown), such as decoding, amplification, and noise filtering. In particular, the speaker may output a message in the form of a voice that an entity of another communication group has been activated. In addition, the speaker may output the user's voice input to the electronic device 100. Meanwhile, a configuration for outputting audio may be implemented by a speaker, but this is merely an example, and may be implemented by an output terminal capable of outputting audio data.

The sensor 170 may sense various state information of the electronic device 100. For example, the sensor 170 may include a touch sensor that can detect a touch of a user or a touch of a pointing device input to the electronic device 100. Meanwhile, the touch sensor may detect that it is an appropriately input touch only for a touch detected by exceeding a preset time. In addition, the touch sensor may sense drawing data input from the user. In addition, the sensor 170 may include a motion sensor (e.g., a gyro sensor, an acceleration sensor, or the like) that can detect motion information of the electronic device 100, and a sensor (e.g., a Global Positioning System (GPS) sensor) that can detect position information. In addition, the sensor 170 may include a sensor (e.g., a camera, a uwb sensor, an it sensor, a proximity sensor, or a light sensor) that can detect the presence of the user. In addition, the sensor 170 may further include an image sensor for photographing the outside of the electronic device 100.

In addition, the heat dissipation unit 180 may discharge heat generated inside the electronic device 100 to the outside. As described above, the electronic device 100 may include various modules such as the processor 140, the input unit 150, and the output unit 160, and heat may be generated as such modules operate. In addition, when the electronic device 100 is not released from the inside of the electronic device 100 due to the generated heat, the electronic device 100 may be degraded due to the heat. To solve this problem, the electronic device 180 may include a heat dissipation unit 180.

The heat dissipation unit 180 will be described with reference to the drawing shown in FIG. 5.

FIG. 5 is a diagram for explaining a heat dissipation unit of an electronic device according to an embodiment.

Referring to FIG. 5, 501 of FIG. 5 is a diagram for describing the inside of an electronic device, and 502 of FIG. 5 is a diagram for describing the electronic device from which the substrate 183 is removed from 501 of FIG. 5.

In an embodiment, the heat dissipation part 180 (see FIG. 3) may include a fan 181 and an opening 182. For example, the fan 181 and the opening 182 may be disposed under the electronic device 100. In addition, the fan 181 may be disposed at the center of the lower part of the electronic device 100, and the fan 181 may be controlled by the processor 140 (see FIG. 3). As the fan 181 is driven, heat generated in the electronic device 100 may be released to the outside through the opening 182. As an example, in FIG. 5, the fan 181 may be disposed under the substrate 183. As an example, in FIG. 5, the fan 181 may be disposed under the substrate 183.

In addition, in an embodiment, the processor 140 may continuously drive the fan 181 when the electronic device 100 is driven, or may periodically or non-periodically drive the fan 181. For example, the processor 140 may periodically drive the fan 181 at a predetermined period of time. In addition, when the sensor 170 includes a temperature sensor, the processor 140 may measure the internal temperature of the electronic device 100 using the temperature sensor, and may drive the fan 181 when the measured internal temperature is equal to or higher than a predetermined temperature value. In addition, the heat dissipation unit 180 may further include a heat sink. As an example, the heat sink may be disposed under the substrate 183. Heat generated from a portion of the substrate 183 (e.g., the center of the substrate 183) may be dispersed around the heat sink.

FIG. 6 is a diagram for explaining a kit insertion structure of an electronic device according to an embodiment.

Referring to FIG. 6, 601 of FIG. 6 is a diagram for explaining the kit insertion unit 190 of the electronic device 100, and 603 of FIG. 6 is a diagram for explaining the kit.

The electronic device 100 may include a kit insertion unit 190. In an embodiment, the shape of the kit insertion unit 190 may correspond to the shape of the kit 1000. For example, when the kit 1000 is in a disk shape, the portion of the kit insertion unit 190 to which the kit 1000 is accommodated may be provided in a concave shape to facilitate acceptance of the kit 1000.

In addition, according to the embodiment, the photofilm 1010 may be disposed at the center of the kit 1000, and the photofilm may be projected by the projection unit 163 of the electronic device 100. For example, the kit insertion unit 190 may be disposed between the projection portion 163, and an opening may be in the center of the portion in which the kit 1000 is accommodated in the kit insertion unit 190. Accordingly, the photo film 1010 of the kit 1000 may be disposed on the opening, and light output from the projection unit 163 may project the photo film 1010 through the opening.

In addition, when the kit 1000 includes a magnet, the kit insertion unit 190 may include a magnet 191. The magnet of the kit insertion unit 190 may be magnetically connected to the magnet of the kit 1000, and accordingly, the kit 1000 may be aligned at a predetermined position in the kit insertion unit 190 and prevent the kit 1000 from being separated from the kit insertion unit 190.

In addition, the kit insertion unit 190 may include the detachable unit 192, and the kit insertion unit 190 may be inserted or removed from the electronic device 100 by the detachable unit 192. For example, the detachable unit 192 may include a spring, and the kit insertion unit 190 may be easily inserted or removed from the electronic device 100 by the elastic force of the spring.

FIG. 7 is a diagram for explaining a projection unit according to an embodiment.

Referring to FIG. 7, 701 of FIG. 7 shows an optical module of projection unit 163, and 703 of FIG. 7 shows the electronic device 100 in the case where the image 102 is formed by projection unit 163. As in 701 of FIG. 7, the optical module according to an embodiment may include the first lens 165 to the fifth lens 169. Although not shown in 701 of FIG. 7, the light emitting unit may be disposed on the bottom surface of the photo film 1010 to output light for projection.

The first lens 165 to the fifth lens 169 may be supported by the lens housing 171 and the plurality of lens brackets 172 of the optical module. The light output from the light emitter may pass through the photo film 1010, be condensed by the first lens 165 to the fourth lens 168, and diffuse through the fifth lens 169. Accordingly, as shown in 703 of FIG. 7, the first lens 165 to the fifth lens 169 may adjust the focus of light passing through the photo film 1010 according to a predetermined focal length so that the image 102 of the photo film 1010 is clearly displayed on the upper surface of the cover 101.

Of course, the example of 701 of FIG. 7 is merely one embodiment and may be configured in various forms of the optical module. For example, the type of lens, the number of lenses, and the arrangement relationship between lenses of the optical module may be configured in various ways.

In addition, in an embodiment, the light emitting unit may include a color change prevention member (not shown). Specifically, when light output from the light emitting unit passes through the photofilm for a predetermined time or more, the photofilm 1010 may be discolored due to thermal or optical elements of the light passing through the photofilm 1010. To solve this problem, the light emitting unit may include a discoloration prevention member (not shown), and light passing through the discoloration prevention member (not shown) may be transmitted through the photo film 1010. As light output from the light emitting unit passes through the color change prevention member (not shown), heat generated by light passing through the color change preven- tion member (not shown) may be reduced, or the color change prevention member (not shown) may block optical elements that change the photo film 1010. Accordingly, the color change of the photofilm 1010 may be prevented. As an example, a discoloration prevention member (not shown) may be composed of polycarbonate.

In another embodiment, the projection unit 163 may adjust the position at which the image 102 is formed. Specifically, when the cover 101 is coupled to the electronic device 100, the image 102 may be formed on the upper surface of the cover 101. However, when the cover 101 is removed from the electronic device 100, the image 102 may be formed outside (e.g., a ceiling or a wall) rather than the cover 101. In this case, the projection unit 163 may adjust the focal length of light passing through the photo film 1010 in consideration of the position at which the image 102 is formed.

The processor 140 (see FIG. 3) may check whether the cover 101 is mounted or removed from the electronic device 100. For example, the sensor 170 (see FIG. 3) may include a cover sensing sensor that senses whether the cover 101 is mounted, and the processor 140 may check whether the cover 101 is mounted using the cover sensing sensor.

In addition, the processor 140 may change the focal length of light passing through the photo film 1010 according to whether the cover 101 is mounted. For example, when the cover 101 is mounted on the electronic device 100, the processor 140 may set the focal length as a first focal length, and when the cover 101 is removed from the electronic device 100, the processor 140 may set the focal length as a second focal length different from the first focal length. In addition, according to an embodiment, the processor 140 may receive a focal length through the input unit 150 (see FIG. 3), and set the received focal length as the focal length of light passing through the photo film 1010.

In addition, the focal length of light passing through the photo film 1010 may be changed in various ways. For example, at least one of the first lens 165 to the fifth lens 169 may include a focus adjusting lens (e.g., a meta lens, a liquid lens, a liquid crystal lens, or the like), and the processor 140 may control the focus adjusting lens to change the shape or thickness of the focus adjusting lens to adjust the focal length of light passing through the photo film 1010.

As another example, the position of the first lens 165 to the fifth lens 169 may be changed. For example, any one of the first lens 165 to the fifth lens 169 may be directly or indirectly connected to a motor, and the processor 140 may control the motor to change any one of the intervals between the first lens 165 to the fifth lens 169. Accordingly, the focal length of light passing through the photo film 1010 may be adjusted.

As another example, a plurality of the above-described optical modules may be included in the projection unit 163. In this case, the focal length of the plurality of optical modules may be set differently. The plurality of optical modules may have a structure that is switched on the photo film 1010. The processor 140 may arrange an optical module having an appropriate focal length among a plurality of optical modules on the photo film 1010 according to whether the cover 101 is mounted or not. In addition, any one of the plurality of optical modules may be switched by external force and disposed on the photo film 1010.

2.2. Kit

Figure 8:
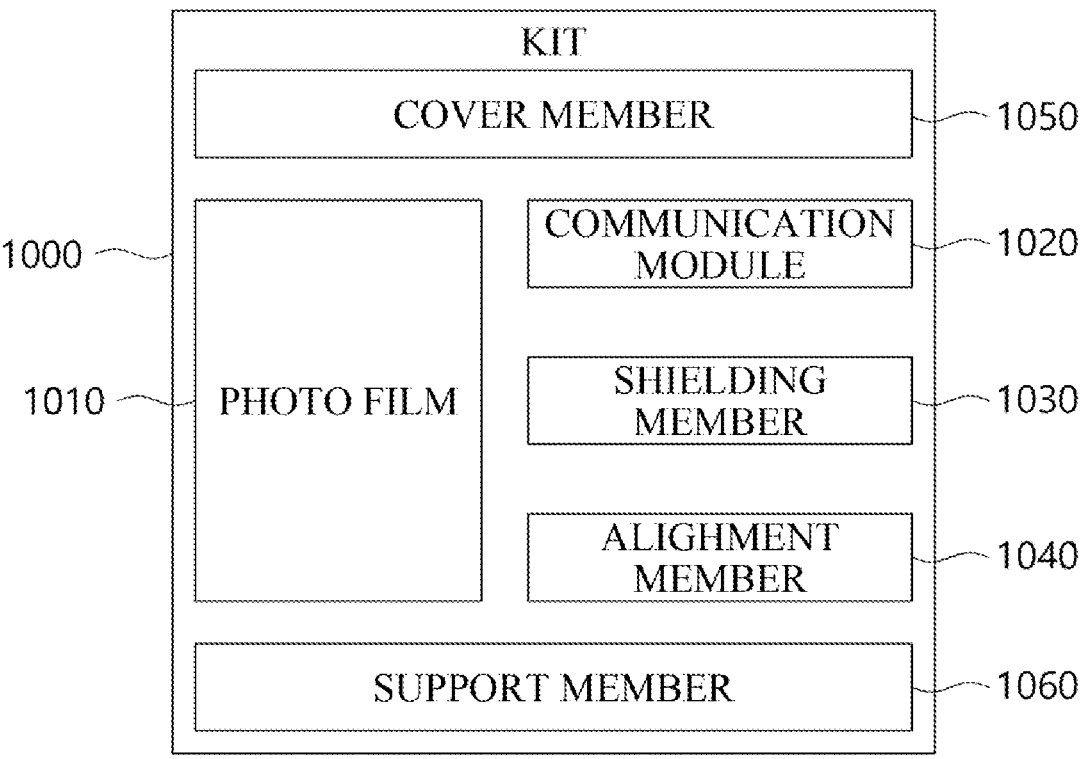
FIG. 8 is a block diagram of a kit according to an embodiment.

FIG. 8 is a block diagram of a kit according to an embodiment.

The kit 1000 may include a photofilm 1010, a communication module 1020, a shielding member 1030, an alignment member 1040, a cover member 1050, and a support member 1060.

The cover member 1050 and the support member 1060 may be located on the upper and lower surfaces of the kit 1000, and may serve as the housing of the remaining members. For example, the cover member 1050 and the support member 1060 may be formed of various materials such as a metal material or a plastic material.

Photofilm 1010 may include various photo layers (e.g., photos of a specific star). When the kit 1000 is inserted into the electronic device 100, the photo layer may be presented by the projection unit 190. For example, the photofilm 1010 may be disposed at the center of the kit 1000.

The communication module 1020 is for communicating with the electronic device 100, and as a specific example, the communication module 1020 may communicate with the first communication unit 120 of the electronic device 100. For example, the communication module 1020 may include a short-range wireless communication module such as an RFID tag or an NFC tag.

In addition, when the kit 1000 is inserted into the kit insertion unit 190 of the electronic device 100, the alignment member 1040 may prevent the kit 1000 from being removed from the kit insertion unit 190, while the kit 1000 is disposed at a predetermined position of the kit insertion unit 190. For example, the alignment member 1040 may include a magnet, and the magnet of the alignment member 1040 may be magnetically connected to the magnet of the kit insertion unit 190.

In addition, the shielding member 1030 may serve to block a communication failure factor from the communication module 1020, which may affect the operation of the communication module 1020 inside the kit 1000. For example, the shielding member 1030 may block magnetic elements generated from the magnets of the alignment member 1040 and electromagnetic waves generated inside or outside the kit 1000. In addition, when metal is included in the kit 1000, a signal transmitted and received from the communication module 1020 may be reflected by the metal, and thus interference may occur in the communication of the communication module 1020. In this case, the shielding member 1030 may shield the communication module 1020 from metal to reduce interference caused by metal in communication of the communication module 1020.

Figure 9:
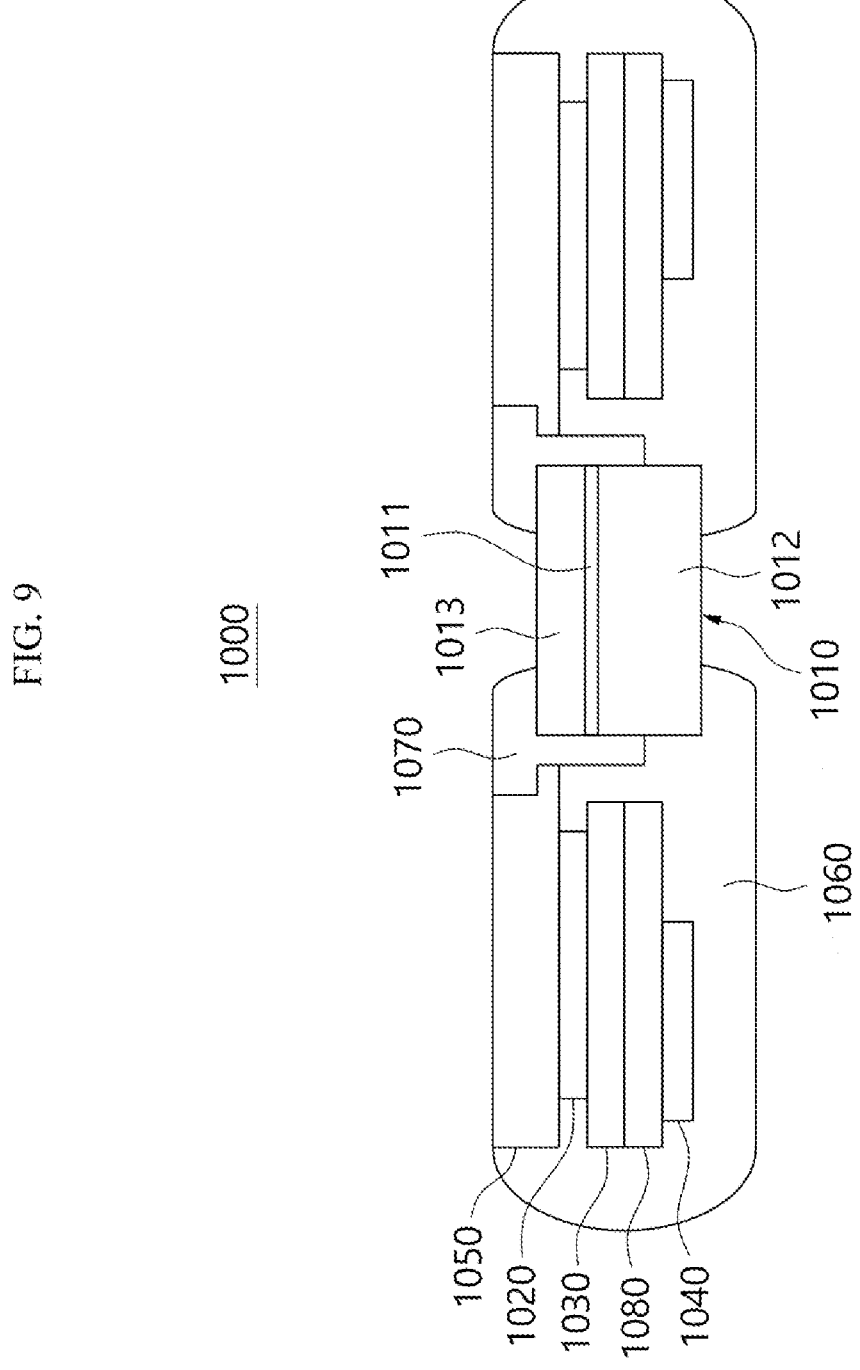
FIG. 9 may show a cross-sectional view of the case where the kit of FIG. 6 is cut in the a-a' direction according to an embodiment.

FIG. 9 is a diagram for explaining a kit according to an embodiment.

Specifically, FIG. 9 may represent a cross-sectional view of the case where the kit 1000 of FIG. 6 is cut in the A-A' direction according to an embodiment.

Referring to FIG. 9, in an embodiment, the kit 1000 may be configured in a disk shape. Accordingly, the central region of the support member 1060 may be formed as an empty space representing a region within a predetermined distance from the center of the kit 1000. In addition, the support member 1060 may be formed of a light-shielding material. Accordingly, even if light for projecting a photo film is output from the projection unit 190 of the electronic device 100, light reaching the support member 1060 among the output light may be blocked by the support member 1060. Of course, light reaching the photo film 1010 among the outputted light may be projected through the photo film 1010.

In addition, the photo film 1010 may be disposed in a region including the central region. That is, the center portion of the photo film 1010 may be disposed in the central region, and the peripheral portion outside the center portion of the photo film 1010 may be supported inside the kit 1000 by the support member 1060 and/or other members, by contacting the support member 1060 and/or other members.

In an embodiment, the photo film 1010 may include a first protective layer 1012 under the photo layer 1011 and a second protective layer 1013 above the photo layer 1011 together with the photo layer 1011. The first protective layer 1012 and the second protective layer 1013 may protect the photo layer 1011 from external forces. For example, the thickness of the first protective layer 1012 and the second protective layer 1013 may be thicker than the photo layer 1011.

In addition, as described above, photofilm 1010, particularly photo layer 1011, may be easily discolored due to thermal or optical elements of light transmitted through photofilm 1010. The first protective layer 1012 and the second protective layer 1013 may protect the photo layer 1011 from the thermal or optical elements of the light. For example, the first protective layer 1012 and the second protective layer 1013 may be formed of an acrylic material. Since the acrylic material is relatively strong to heat and its thermal conductivity is low, the first protective layer 1012 and the second protective layer 1013 can protect the photo layer 1011 from thermal elements of light. In addition, the first protective layer 1012 may be thicker than the second protective layer 1013. As the first protective layer 1012 is disposed under the photo layer 1011 and light is output from the bottom of the photo film 1010, it is possible to more effectively protect the photo layer 1011 from the thermal elements of light.

In the embodiment of FIG. 8, at least a portion of the first protective layer 1012 is in contact with the support member 1060, and at least a portion of the photo layer 1011 and the second protective layer 1013 is in contact with the fixing member 1070, so that the photo film 1010 may be supported by the support member 1060 and the fixing member 1070.

The fixing member 1070 may serve to fix the photo film 1010 to the kit 1000. As an example, the fixing member 1010 may be formed as an empty space in a central region representing a region within a predetermined distance from the center of the kit 1000, similar to the support member 1060. In addition, at least a part of the fixing member 1070 may be in contact with the support member 1060, and at least a part of the top surface and the side surface of the photo film 1010 may be pressed. For example, the inner side of the fixing member 1070 may be in contact with at least a portion of the top and side surfaces of the photo film 1010, and the outer side of the fixing member 1070 may be in contact with the support member 1060 and/or other members. In addition, the fixing member 1070 may be coupled to the kit 1000 in a fitting form between the support member 1060, the cover member 1050, and the photo film 1010. In addition, the central region of the fixing member 1070 may be formed as an empty space according to the shape of the kit 1000.

In addition, the cover member 1050 may be disposed on the upper surface of the kit 1000 so that the upper surface of the cover member 1050 may be exposed to the outside. The cover member 1050 may be disposed between the support member 1060 and the fixing member 1070 by contacting the support member 1060 and the fixing member 1070. For example, the cover member 1050 may be coupled to the kit 1000 in a fitting form between the support member 1060 and the fixing member 1070.

In an embodiment, an image may be included on the top surface of the cover member 1050 exposed to the outside.

For example, an image (for example, a photo, a letter, a figure, a logo, a star, etc) for identifying the kit 1000 may be printed on the top surface of the cover member 1050. In an embodiment, the cover member 1050 may be formed of an acrylic material. The color change of the image disposed on the top surface of the cover member 1050 may be prevented.

In addition, the communication module 1020 may be disposed inside the support member 1060 and below the cover member 1050. Accordingly, the communication module 1020 may be protected by the support member 1060 and the cover member 1050 from external force. In addition, the communication module 1020 may also be formed as an empty space in the middle region according to the shape of the kit 1000.

In addition, as described above, the communication module 1020 may include a short-range wireless communication module such as an RFID tag or an NFC tag.

The shielding member 1030 may be disposed inside the support member 1060 and below the communication module 1020. The shielding member 1030 may be formed of an insulating material, and may block magnetic elements developed by the alignment member 1040, electromagnetic waves generated inside or outside the kit 1000, and the like. In addition, when the weight member 1080 is a metal, communication interference may occur caused by the weight member 1080. To this end, the shielding member 1030 may block communication interference caused by the weight member 1080. For example, the shielding member 1030 may block communication interference caused by the weight member 1080 by blocking contact between the communication module 1020 and the weight member 1080. To this end, the shielding member 1030 may be disposed between the communication module 1020 and the weight member 1080, and the size of the shielding member 1030 may be greater than the communication module 1020 and equal to or greater than the weight member 1080.

In addition, the weight member 1080 may serve to increase the weight of the kit 1000. Specifically, the image of the specific star may be included in the photo layer 1011 of the photo film 1010, and when the kit 1000 is inserted into the electronic device 100 And the photo film 1010 is projected as described above, the fan may view the image of the specific star. Accordingly, the kit 1000 may be a single farm or product for the star. However, the components included in the kit 1000 may be relatively light in weight due to the material characteristics thereof, and when the kit 1000 is too light, the risk of loss may be increased, and the value as a product may be lowered. To this end, the weight member 1080 may be included in the kit 1000.

The weight member 1080 may be formed of at least one material capable of increasing the weight of the kit 1000. For example, the weight member 1080 may include a metal (e.g., brass, lead, iron, nickel, chromium, and the like), stone powder, and the like. However, as described above, when the weight member 1080 includes a metal, communication interference may occur caused by the weight member 1080 of the communication module 1020. In this case, as the weight member 1080 is disposed inside the support member 1060 and below the shielding member 1030, the communication interference may be blocked by the shielding member 1030 described above. In addition, the weight member 1080 may also be formed as an empty space according to the shape of the kit 1000.

In addition, the alignment member 1040 may prevent the kit 1000 from being aligned to a position determined by the kit insertion unit 190 and from being separated from the kit insertion unit 190. For example, the alignment member 1040 may include a magnet. In addition, when the kit 1000 is inserted into the kit insertion unit 190 of the electronic device 100, the alignment member 1040 may be disposed at a position corresponding to the position of the magnet in the kit insertion unit 190 and/or may be disposed in a shape corresponding to the shape of the magnet in the kit insertion unit 190. For example, the alignment member 1040 may be formed as an empty space in the center region according to the shape of the kit 1000, and the magnet in the kit insertion unit 190 may also be formed as an empty space in the center region. This may be to improve the alignment and separation prevention effects of the alignment member 1040.

Figure 10:
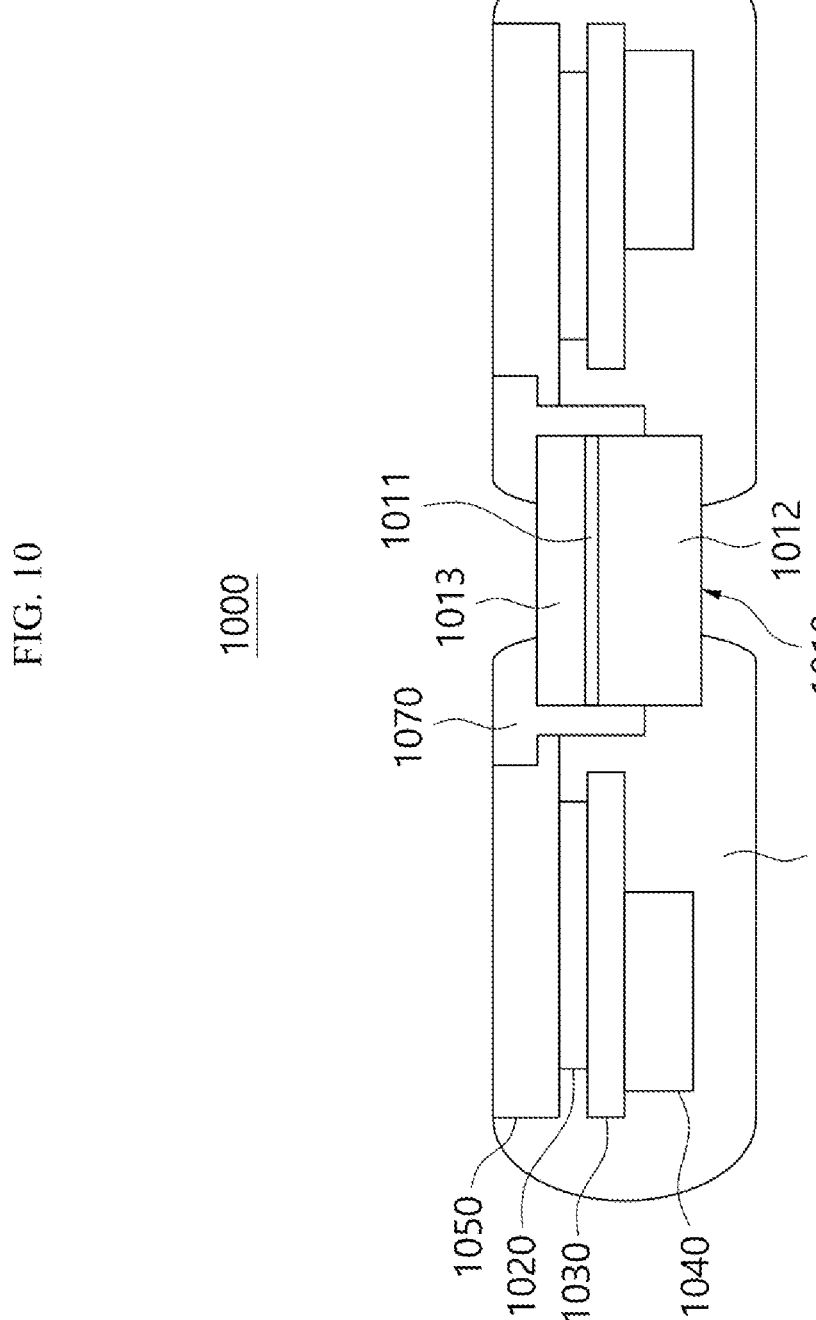
FIG. 10 may show a cross-sectional view of the case where the kit of FIG. 6 is cut in the a-a' direction according to another embodiment.

FIG. 10 may represent a cross-sectional view of the kit 1000 when cut in the A-A' direction according to another embodiment.

Referring to FIG. 10, in the embodiment of FIG. 10, the weight member 1080 (see FIG. 9) may not be included in the kit 1000 compared to the embodiment of FIG. 9. However, in the embodiment of FIG. 10, the size and volume of the alignment member 1040 may be increased compared to the embodiment of FIG. 9. This may be to replace the role of weight increase of the weight member 1080 by the alignment member 1040.

However, even in the embodiment of FIG. 10, the shielding member 1030 may be included in the kit 1000. Although the description is omitted in the embodiment of FIG. 9, in some cases, the alignment member 1040 may be plated with metal (e.g., nickel). In this case, like the weight member 1080, the signal transmitted and received from the communication module 1020 may be reflected by the alignment member 1040, and thus interference may occur in the communication of the communication module 1020.

To this end, the shielding member 1030 may block the communication interference caused by the weight member 1080. For example, the shielding member 1030 may block the contact between the communication module 1020 and the alignment member 1040 to block the communication interference caused by the alignment member 1040. To this end, the shielding member 1030 may be disposed between the communication module 1020 and the alignment member 1040, and the size of the shielding member 1030 may be larger than the communication module 1020 and equal to or larger than the alignment member 1040. In this case, the shielding member 1030 may shield the communication module 1020 from metal to reduce the interference caused by the metal in the communication of the communication module 1020.

However, according to the embodiment, the shielding member 1030 may not be included in the kit 1000. For example, when the communication interference in the alignment member 1040 is relatively weak, the shielding member 1030 may not be included in the kit 1000. In this case, the alignment member 1040 may be disposed under the communication module 1020. In addition, the support member 1060 may be disposed between the communication module 1020 and the alignment member 1040 and may be spaced apart from the communication module 1020. In addition, in some cases, the alignment member 1040 may be in contact with the communication module 1020.

The description of FIG. 9 may be applied to the photofilms 1010 to 1013, the support member 1060, the fixing member 1070, the communication module 1020, and the cover member 1050 of the kit 1000 According to the embodiment of FIG. 10, and thus detailed descriptions thereof will be omitted.

3. Communication Method Using a Communication Group 3.1 Overview

Figure 11:
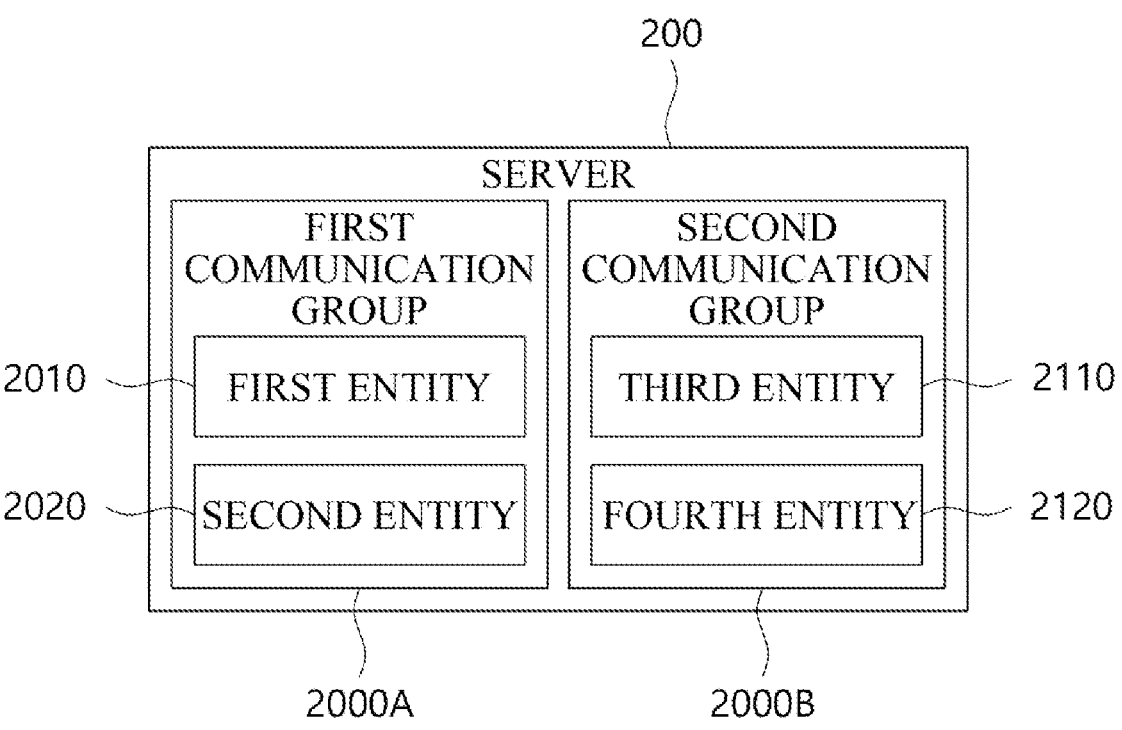
FIG. 11 is a diagram for describing a communication method using a communication group according to an embodiment.

FIG. 11 is a diagram for describing a communication method using a communication group according to an embodiment.

Referring to FIG. 11, the server 200 may manage a plurality of communication groups 2000A and 2000B. In addition, each communication group 2000A and 2000B may include a plurality of entities 2010, 2020, and 2110, and 2120.

As described above, when the electronic device or the terminal accesses the corresponding entity, the corresponding entity may be activated within the communication group. In addition, when the message is received in the communication group, the electronic device or the terminal may acquire the message through the corresponding entity.

In one embodiment, each of the entities 2010, 2020, and 2110, and 2120 may transmit and receive the message using the message storage of the server. For example, the first terminal corresponding entity 2010 may access the first entity 2010 and the activated first entity 2010 may provide the message to the server. For example, entities 2010 and 2020 included in the first communication group 2000A may have transmission rights to provide messages, and entities 2110 and 2120 included in the second communication group 2000B may have reception rights to acquire messages. In this case, the first entity 2010 may provide the message to the server in a push manner. The server 2000 may store the message provided from the first entity 2010 in the message storage accessible to the entities 2110 and 2120 of the second communication group 2000B. In addition, the first entity 2110 may directly access the message storage and store the message.

Hereinafter, for convenience of explanation, the message stored in the message storage accessible to the entity of the specific communication group can be expressed as the message obtained in the specific communication group.

When the third entity 2110 belonging to the second communication group 2000B is activated, the third entity 2110 may access the message storage to acquire the message. For example, the third entity 2110 may acquire a message in a pulling manner. The third terminal corresponding to the third entity 2110 may obtain a message from the third entity 2110. Also, if the fourth entity 2120 is activated later, the fourth entity 2120 may access the message storage to acquire the message. According to an embodiment, when the server transmits and receives a message as described above using Apache Kafka, the method of providing the message may be expressed as publish, and the method of acquiring the message may be expressed as subscription. In addition, entities 2010 and 2020 included in the first communication group 2000A having transmission authority may be expressed as Producer, and entities 2110 and 2120 included in the second communication group 2000B having reception authority may be expressed as Consumer.

In addition, the entities 2010, 2020, 2110, and 2120 may transmit and receive messages using a general messaging transmission and reception method, without being limited thereto.

Hereinafter, message transmission and reception in terms of electronic devices and terminals will be described in detail.

Figure 12:
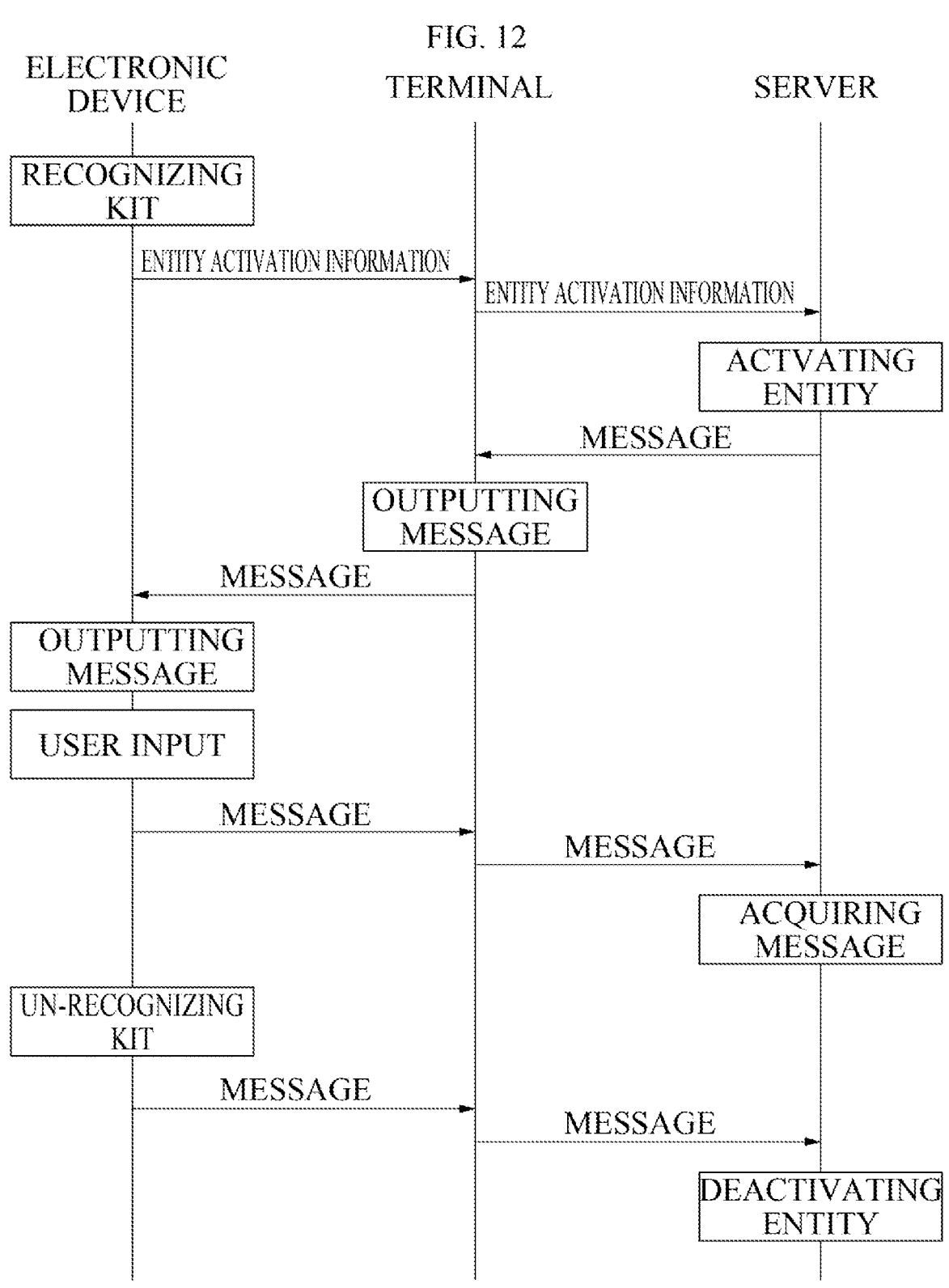
FIG. 12 is a diagram for describing message transmission and reception according to an embodiment.

FIG. 12 is a diagram for describing message transmission and reception according to an embodiment.

Referring to FIG. 12, when the electronic device is capable of communicating with the kit, that is, when the electronic device recognizes the kit, the electronic device may acquire entity activation information from the kit. Here, the entity activation information may include at least one of identification information of the kit, information on a communication group, or communication authority information. The electronic device may transmit entity activation information to the terminal, and the terminal may transmit the acquired entity activation information to the server. Of course, according to embodiments, the terminal and the kit may be capable of communication, and the terminal may acquire entity activation information from the kit. In this case, the terminal may provide entity activation information obtained from the kit to the server.

The server may determine whether the entity is activated using the entity activation information. The server may identify whether the kit obtained by the electronic device from the entity activation information is the kit registered in the server through the identification information of the kit (e.g., a hardware key unique to the kit) among the entity activation information received from the electronic device. For example, the server may store a plurality of kits of hardware keys on a hardware key database. Thus, the server can identify whether the hardware key of the received kit is a hardware key included in the database. When the hardware key of the kit is identified as a hardware key included in the database, the server may identify the electronic device that transmitted the identification information of the kit as the device of the specific communication group. Further, when the hardware key of the kit is identified as not included in the database, the server may not identify the electronic device that transmitted the identification information of the kit as the device of the communication group. That is, the server may identify whether the kit is a device legally manufactured by the manufacturer through the identification information of the kit. In addition, when the communication system is used for communication between the star and the fan, the identification information of the kit may include the identification information of the star corresponding to the corresponding kit. For example, when there are 200th kit (1st kit to 200th kit), when the 1st kit to 100th kit correspond to the first star and the 101th kit to 200th kit correspond to the second star, the identification information of the kit in the 1st kit to 100th kit may include the identification information of the first star and the identification information of the kit in the 101th kit to 200th kit may include the identification information of the second star.

In addition, the server may identify the communication group corresponding to the kit through the information of the communication group included in the entity activation information. For example, the server may store the unique keys of the plurality of communication groups. When the information of the communication group obtained through the kit includes the unique keys of the first communication group pre-stored, the server may identify the communication group corresponding to the kit as the first communication group. In addition, the server may identify that the entity corresponding to the electronic device or the terminal that transmitted the information of the communication group included in the kit is included in the first communication group.

When the communication system is used for communication between the star and the fan, each communication group may be distinguished based on the star. For example, the information of the communication group may include the identification information of the star corresponding to the corresponding kit described above, and accordingly, when the identification information of the first star is included in the first kit, the communication group corresponding to the first kit may be identified as the first communication group, and when the identification information of the second star is included in the second kit, the communication group corresponding to the second kit may be identified as the second communication group.

In addition, the server may identify the communication authority of the specific communication group by the electronic device based on the communication authority information included in the entity activation information. Specifically, the server may identify the communication authority of the electronic device as one of the transmission authority, the reception authority, and the transmission and reception authority of the specific communication group identified through the information of the communication group based on the communication authority information. For example, when the communication authority information includes information that the electronic device has the reception authority, and the communication group corresponding to the kit is identified as the first communication group through the information of the communication group, the server may identify that the entity corresponding to the electronic device or the terminal has the reception authority in the first communication group.

When the communication system is used for communication between the star and the fan, the communication authority may be distinguished by whether the electronic device is the star or the fan. For example, the communication authority information may include identification information on whether the corresponding kit is a star dedicated kit or a fan dedicated kit, and accordingly, when the first kit includes identification information indicating that the kit is a star dedicated kit, the server may identify that the entity corresponding to the electronic device or the terminal has the transmission and reception authority in the communication group, and when the second kit includes identification information indicating that the kit is a fan dedicated kit, the server may identify that the entity corresponding to the electronic device or the terminal has the reception authority in the communication group.

Of course, as described above, if the communication group is given a specific communication authority and the entities included in the communication group have the same communication authority, the communication authority information may be omitted from the entity activation information. In addition, if the server can identify the communication group and the communication authority of the entity based on the identification information of the kit, the information on the communication group and the communication authority information of the kit can be omitted from the entity activation information.

When the server identifies the communication group to which the entity corresponding to the electronic device or the terminal belongs and the communication authority of the entity, the server may activate the entity in the communication group.

In addition, the entity may correspond to a kit recognized by the electronic device. For example, when the electronic device acquires the first entity activation information of the first kit, the electronic device or the terminal may access the first entity to activate the first entity, and when the electronic device acquires the second entity activation information of the second kit, the electronic device or the terminal may access the second entity to activate the first entity. Accordingly, the entity can be identified by a kit recognized by the electronic device. Therefore, the entity can be expressed as corresponding to the kit.

When a message is acquired from a communication group, the activated entity can acquire the message, and the terminal accessing the entity can also acquire the message.

The terminal may transmit the acquired message to the electronic device. In this case, the terminal may transmit the acquired message to the electronic device without processing the message, or may transmit the acquired message to the electronic device by processing the message. For example, if the electronic device does not interpret the message acquired by the terminal from the server, the terminal may process the message acquired from the server into a message interpretable by the electronic device and transmit it to the electronic device.

In addition, the message transmitted by the terminal to the electronic device may include a control command for controlling the electronic device. For example, the control command may include a command to output the message from the electronic device.

As such, the terminal may transmit messages to the electronic device in various forms, but for convenience of explanation, the following will be explained by the expression that the terminal transmits messages to the electronic device.

In addition, the terminal may output the message obtained from the server in various ways. For example, the terminal may display the message acquired from the server on the display of the terminal, output the message acoustically through the speaker of the terminal, or output the message in a vibration form using the vibration module of the terminal.

In addition, the electronic device may output the message obtained from the terminal in various ways. For example, the electronic device may display the message acquired from the terminal on the display of the electronic device, display the message through the light emitting unit of the electronic device, or output the message acoustically through the speaker of the electronic device. In addition, when the electronic device includes the vibration module, the electronic device may output the message acquired from the terminal in the form of vibration using the vibration module.

In addition, the electronic device may transmit a message to the terminal. For example, when the electronic device acquires user input information (for example, touch information, drawing information, voice information, activation information of the electronic device (for example, power driving information of the electronic device), the electronic device may transmit a message corresponding to the command to the terminal. In addition, the electronic device may acquire information on whether the electronic device recognizes the kit, and transmit a message corresponding to the acquired information to the terminal.

In addition, the terminal may provide the message received from the electronic device to the server.

Similar to the above matter, the terminal may transmit the acquired message to the server without processing, or may process the acquired message and transmit the message to the server. As such, the terminal may transmit the message to the server in various forms, but for convenience of explanation, the following description will be given by the expression that the terminal transmits the message to the server.

In addition, the server may acquire the message from the terminal and perform processing according to the acquired message. For example, the server may manage the entity or communication group corresponding to the electronic device or the terminal based on the message acquired from the terminal.

In addition, when the entity or communication group corresponding to the electronic device or the terminal has the transmission authority, the server may control the entity of another communication group, not the communication group corresponding to the electronic device or the terminal, to acquire. For example, when the first entity corresponding to the electronic device or the terminal belongs to the first communication group, the server may store the message acquired from the first entity in the message storage accessible by the second entity so that the message acquired from the first entity (i.e., the message acquired from the terminal) is acquired by the second entity belonging to the second communication group. When the second entity is activated in the second communication group, the second entity may access the message storage and acquire the message.

In addition, when the kit is not recognized in the electronic device (for example, when the kit inserted into the electronic device is removed), the electronic device may transmit a message including information that the kit is not recognized to the terminal, and the terminal may transmit the message to the server. When the kit is not recognized in the electronic device, the electronic device or the terminal may be configured not to access the entity corresponding to the kit. That is, the electronic device or the terminal may access the entity corresponding to the kit only when the kit is recognized in the electronic device. Accordingly, the server may deactivate the corresponding entity in the communication group.

Hereinafter, a method of communication between the electronic device and the terminal will be described in detail.

3.2. Communication Method Using BLE Communication

Figure 13:
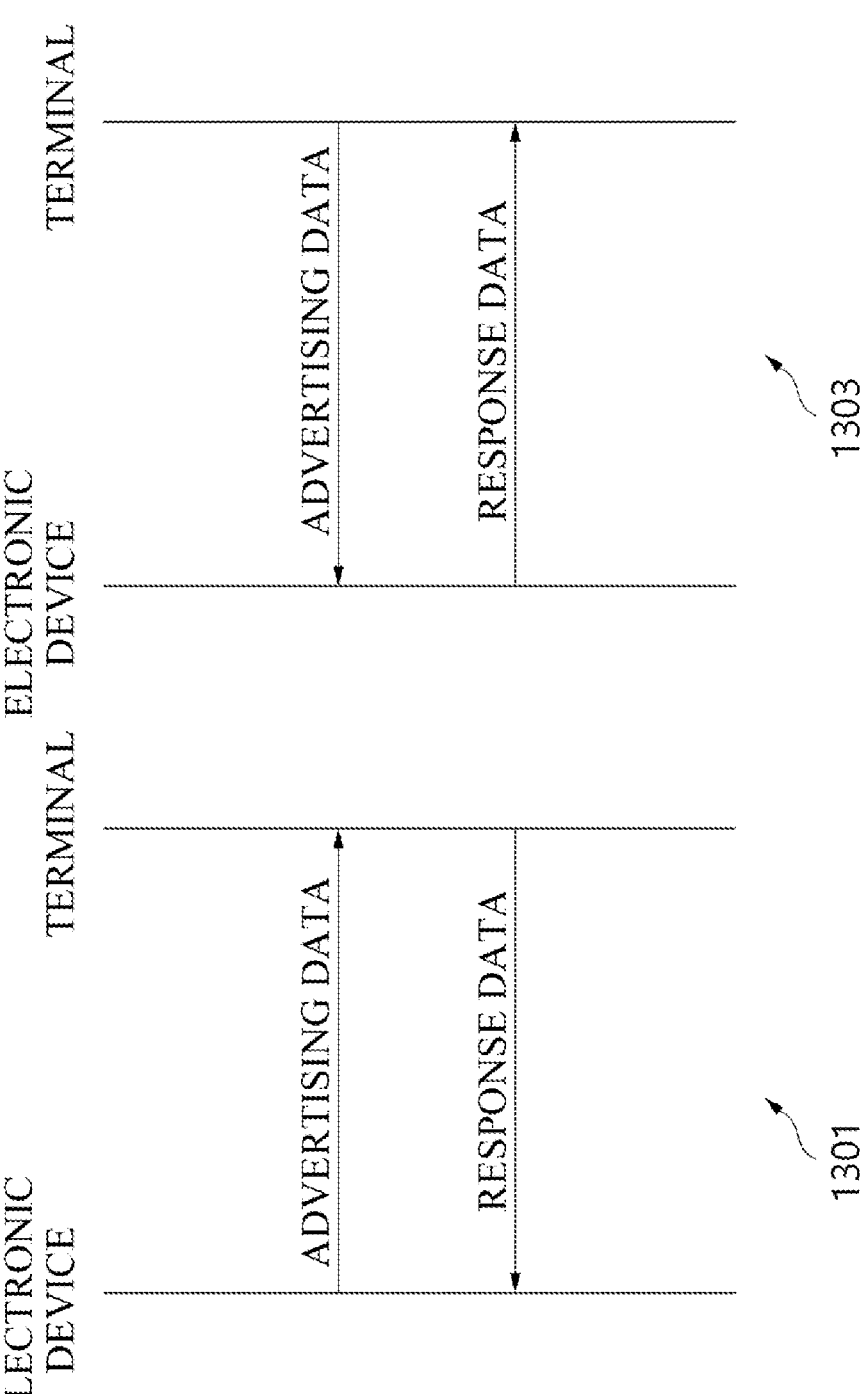
FIG. 13 is a diagram for describing a communication method using BLE communication according to an embodiment.

FIG. 13 is a diagram for describing a communication method using BLE communication according to an embodiment.

Referring to FIG. 13, as described above, the electronic device and the terminal may perform communication in various ways, such as WiFi, Bluetooth, bluetooth low energy (BLE). Hereinafter, a communication method in which the electronic device and the terminal communicate in BLE communication will be described below will be described.

In general, when the devices communicate in BLE communication with the BLE method, the devices operate in advertise that the first device may broadcast advertising data, and the second device may acquire the advertising data by performing a scanning operation and transmit response data to the first device. Thereafter, the devices operate in a connection mode may perform bidirectional communication through the communication connection establishment procedure.

However, in this case, it may take a lot of time until the devices operate in the connection mode, and the cost of communication may be large until they operate in the connection mode and after they operate in the connection mode. For example, even if the first device should transmit a message to the second device in real time, a lot of communication connection establishment procedures should be established before operating in the connection mode, so it may take a lot of time to transmit the message. To this end, in an embodiment, the electronic device and the terminal may transmit and receive messages in the advertising mode without entering the connection mode.

More specifically, as in 1301 of FIG. 13, the electronic device may broadcast the advertising data, and the terminal may acquire the advertising data by performing a scanning operation. The terminal may provide the response data to the electronic device.

The advertising data may include various information about the electronic device and the kit that the electronic device can recognize.

For example, the advertising data may include at least one of device identifier information, user information, kit identification information, information about a communication group, communication authority information, time information, state information, cumulative state information, and message information.

The device identifier information may indicate a hardware key unique to the electronic device. When the device identifier information is obtained by the terminal or the server, the terminal or the server may check whether the electronic device is a legally manufactured device by the manufacturer based on the device identifier information.

The user identification information is information for identifying a user, for example, when a platform service is operated in a communication system, the user identification information may include an account of the user in the corresponding platform service. In addition, the user identification information may include information on the country or region where the user is located. The terminal or server may check whether the user is a user subscribed in the corresponding platform service using the user identification information and information on the country or region where the user is located.

The entity activation information, such as kit identification information, communication group information, and communication authority information, may be applied to the above-described matters, and thus detailed descriptions will be omitted.

The time information may indicate information on the time at which the advertising data is generated or the time at which the advertising data is transmitted. For example, the electronic device may broadcast the advertising data at a predetermined period, and the broadcasted advertising data may be changed. For example, first advertising data may be broadcast at a first time point and second advertising data may be broadcast at a second time point. As another example, the electronic device may broadcast the same advertising data until the terminal acquires the response data, and generate and broadcast other advertising data after the terminal acquires the response data.

The terminal or server may check whether the acquired advertising data is generated or transmitted at a time based on the information.

The state information may indicate current state information of the electronic device. For example, the state information may include information on whether the electronic device starts its driving, whether the electronic device ends its driving, its driving time, whether the electronic device recognizes a kit (e.g., whether the kit is inserted into the electronic device), and user's behavior information on the electronic device. For example, the user's behavior information about the electronic device may include information about whether an external touch is sensed on the electronic device (whether an external touch is sensed by a touch sensor disposed in one area of the electronic device or whether an external touch is sensed by a plurality of touch sensors disposed in each of a plurality of areas of the electronic device), and whether the configuration of the electronic device (light emitting unit, projection unit, speaker, and the like) is driven.

In addition, according to an embodiment, the state information may include time information (e.g., start time information at which a specific state starts, end time information at which a specific state ends, and the like) for each state. Page time information indicating the time at which a specific state is maintained, and the like.

In addition, according to an embodiment, the state information may include information about the changed state. For example, when the kit is not recognized in the electronic device at the first time point, the state information included in the advertising data transmitted after the first time point may include information that the kit is not recognized.

The cumulative state information may indicate the state information of the electronic device in the past. For example, when the advertising data is changed according to time by broadcasting the advertising data at a predetermined period by the electronic device, when the terminal does not acquire the advertising data at the previous time point and only acquires the advertising data at the current time point, the terminal or the server may not check the state of the electronic device at the previous time point by using the state information described above. However, the cumulative state information may include the state information of the electronic device at the advantage time point, and accordingly, the terminal or the server may check the state of the electronic device at the previous time point based on the cumulative state information.

In an embodiment, the number of state information included in the cumulative state information may be preset. For example, the cumulative state information may include all state information after the electronic device is driven or after the kit is recognized in the electronic device, and may include a predetermined number of recent state information. For example, when it is assumed that the number of state information included in the cumulative state information is two and the current time point is the third time point, the cumulative state information may include the state information included in the advertising data broadcast at the first time point and the second time point before the third time point.

In addition, in some cases, when the electronic device acquires the response data for the previously broadcasted advertising data, the advertising data broadcast at the current time point may not include the cumulative state information. Of course, even if the electronic device acquires the response data for the previously broadcasted advertising data, the advertising data broadcast at the current time point may also include the cumulative state information. The terminal or the server may check the past state of the electronic device based on the cumulative state information.

The message information may indicate information for delivery to entities belonging to other communication groups or entities belonging to the same communication group. For example, the message information may include information about user input information (touch information, drawing information, voice information, and the like). When the terminal provides the message information to the server, the message information may be provided to entities belonging to other communication groups or entities belonging to the same communication group.

Of course, is not limited to this, and the advertising data may include various information that can be provided to the terminal.

In an embodiment, when the server acquires the above information, statistical information about users owning the electronic device and the kit may be acquired based on the above information.

For example, when the communication system is used for communication between the star and the fan, the identification information of the kit may include identification information about the star corresponding to the corresponding kit. For example, the server may acquire information about when and for a period of time a fan owning the kit corresponding to the first star inserts the kit into the electronic device and how many fans owning the kit corresponding to the first star utilize the first kit and the electronic device based on the above information, and the acquired information may be used for marketing the star in the future.

In addition, in an embodiment, the size of the advertising data may be limited. For example, the advertising data may have a size of 31 byte to 255 byte. As the size of the advertising data is limited, the advertising data may not include all the above information.

Accordingly, the server may divide the above information into a plurality of advertising data. For example, the message information may include information about drawing, and the information about drawing may not be included in one advertising data by the size of the information about drawing. In this case, the electronic device may include information about a plurality of different or partially different drawing inputs in the plurality of advertising data. For example, the electronic device may divide the information about drawing into two detailed message information, include the first detailed message information in the first advertising data, and include the second detailed message information in the second advertising data.

In addition, as another example, the electronic device may include other information in the advertising data according to the current situation.

For example, when the entity is not activated in the communication group of the server, the electronic device may include the entity activation information used to activate the entity in the advertising data. Thereafter, when the entity is activated in the communication group of the server, the electronic device may include the remaining information in the advertising data.

In addition, according to an embodiment, as in 1303 of FIG. 13, the terminal may broadcast the advertising data, and the electronic device may acquire the advertising data by performing a scanning operation. Then, the electronic device may provide the response data to the terminal.

At this time, the advertising data may include at least one of terminal identifier information, user information, kit identification information, information about the communication group, communication authority information, time information, and message information.

The terminal identifier information may indicate a hardware key unique to the terminal. When the terminal identifier information is acquired by the electronic device, the electronic device may identify whether the corresponding terminal is the same as the previously performed communication terminal based on the terminal identifier information. For example, the response data previously received by the electronic device may include terminal identifier information, and whether the corresponding terminal is the same as the previously performed communication terminal based on whether the terminal identifier information included in the response data.

Since the above-described items may be applied to the user information, the kit identification information, the information on the communication group, the communication authority information, and the time information, detailed descriptions thereof will be omitted.

In addition, the message information may obtain a message provided by another entity from the server. For example, the message provided by the other entity may include a message corresponding to user input information (for example, touch information, drawing information, voice information, power driving information of the user, activation information (for example, power driving information of the electronic device)) obtained in the electronic device corresponding to the other entity. In addition, the message provided by the other entity may include a message corresponding to information on whether the kit in the electronic device corresponding to the other entity is recognized. In addition, the obtained message may include a message corresponding to a user input (for example, drawing input, voice input, text input, etc., input or generated by the terminal) input or generated by the terminal corresponding to the other entity.

In addition, the message provided by the other entity may include state information or cumulative state information of the electronic device corresponding to the other entity.

In addition, the message information may include a control command for controlling the control device. For example, the control command may include a command to output a specific message from the message obtained by the electronic device from the terminal.

Of course, the advertising data may include various information that the terminal can provide to the electronic device.

3.3. Communication Method Change According to Message Type

Figure 14:
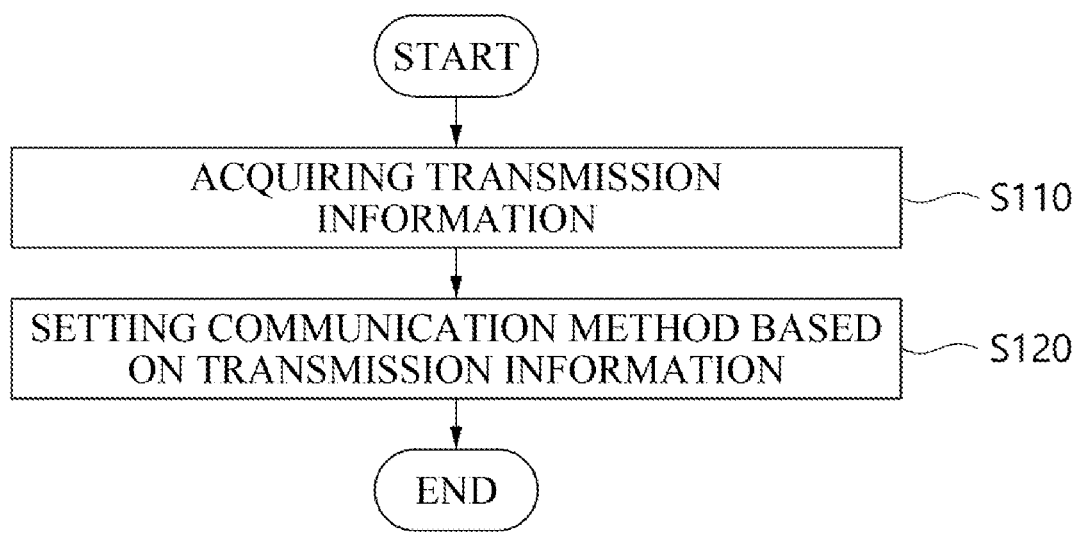
FIG. 14 is a diagram for describing a method of changing a communication scheme of an electronic device or a terminal according to an embodiment.

FIG. 14 is a diagram illustrating a method of changing a communication method of an electronic device or a terminal according to an embodiment.

Referring to FIG. 14, the communication method change method may include obtaining transmission information (s110) and setting a communication method based on the transmission information (s120).

As described above with reference to FIG. 13, when the electronic device and the terminal perform communication in the BLE manner, the electronic device and the terminal may perform communication in the advertising mode or the connection mode. If communication is performed in the advertising mode, the communication time may be reduced by transmitting and receiving data without a large number of communication connection establishment procedures. However, when the size of the data is large, as the size of the advertising data is limited, if the information is transmitted in the advertising data, the communication time may be taken more. Accordingly, the electronic device or the terminal may set any one of the advertising mode or the connection mode based on the type of the message to be transmitted.

Specifically, in step S110, the electronic device or the terminal may obtain transmission information. For example, the electronic device may obtain at least one of device identifier information, user information, kit identification information, information on the communication group, communication authority information, time information, cumulative state information, and message information as transmission information. In addition, the terminal may obtain at least one of the aforementioned terminal identifier information, user information, the kit identification information, information on the communication group, communication authority information, time information, and message information as transmission information.

In addition, in step S120, the electronic device may determine the communication method as any one of the first communication method or the second communication method based on the size of the transmission information. For example, the electronic device or the terminal may check the number of advertising data that may include transmission information and determine the communication scheme as any one of the first communication scheme or the second communication scheme based on the checked number of advertising data. When the communication scheme is determined as the first communication scheme, the electronic device or the terminal operates in the advertising mode, include the transmission information in the advertising data, and broadcast the advertising data, but may not perform a separate communication connection establishment procedure for operating in the connection mode. On the other hand, when the communication scheme is determined as the second communication scheme, the electronic device or the terminal may not include the transmission information in the advertising data or may include only a part of the transmission information. Thereafter, the electronic device or the terminal may enter the connection mode by broadcasting the advertising data, performing a separate communication connection establishment procedure for operating in the connection mode, and may transmit and receive transmission information in the connection mode.

For example, when only device identifier information, user information, kit identification information, information on a communication group, and communication authority information are included in the transmission information of the electronic device, the transmission information may be included in one advertising data. In this case, since operating in the advertising mode may be advantageous in terms of communication speed, the electronic device may include the transmission information in the advertising data, and may transmit the transmission information to the terminal by broadcasting the advertising data. As another example, when drawing information is included in the transmission information of the terminal, the transmission information may be included in 10 advertising data. In this case, it may be advantageous in terms of communication speed to transmit the message information in the connection mode than to transmit the message information in the advertising data, so the terminal may enter the connection mode by broadcasting the advertising data that does not include the transmission information, performing a separate communication connection establishment procedure for operating in the connection mode, and may transmit the message information in the connection mode.

3.4. Communication Methods in Situations in which the Kit is not Recognized or Communication Between the Electronic Device or the Terminal is Disconnected FIG. 15 is a diagram for describing a communication method in a situation in which the kit is not recognized according to an embodiment.

Figure 15:
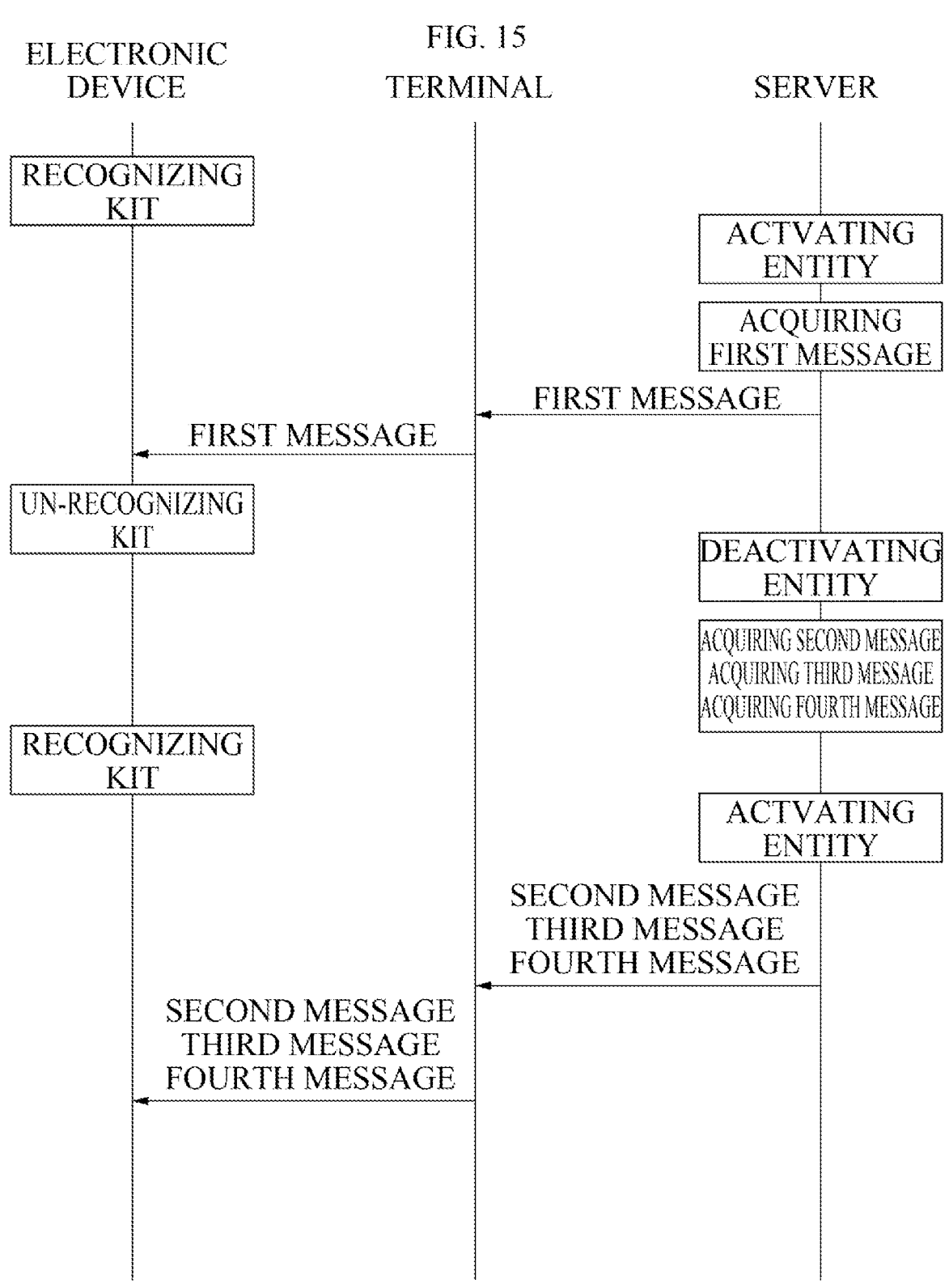
FIG. 15 is a diagram for describing a communication method in an unrecognized situation of a kit according to an embodiment.

Referring to FIG. 15, as the kit is recognized in the electronic device, the entity may be activated in the communication group of the server as described above. In addition, the first message may be acquired in the communication group of the server, and the terminal may access the entity to acquire the first message. In addition, the terminal may provide the acquired first message to the electronic device.

Thereafter, when the kit is not recognized in the electronic device, the entity may be deactivated in the communication group of the server. In this case, even if the second message to the fourth message are acquired in the communication group of the server, the terminal may not acquire the second message to the fourth message from the server as the entity is deactivated. For example, the second message to the fourth message are stored in the message storage where the entity is accessible, but the entity may not acquire the second message to the fourth message from the message storage.

Thereafter, when the kit is recognized again in the electronic device, the entity may be activated in the communication group of the server. Accordingly, the terminal may access the entity to acquire the second message to the fourth message and provide the acquired second message to the fourth message to the electronic device.

Of course, it is not limited thereto, and according to embodiments, even if the kit is not recognized in the electronic device, the activation of the entity may be maintained, and accordingly, the message may be acquired by accessing the entity and the acquired message may be provided to the electronic device.

Figure 16:
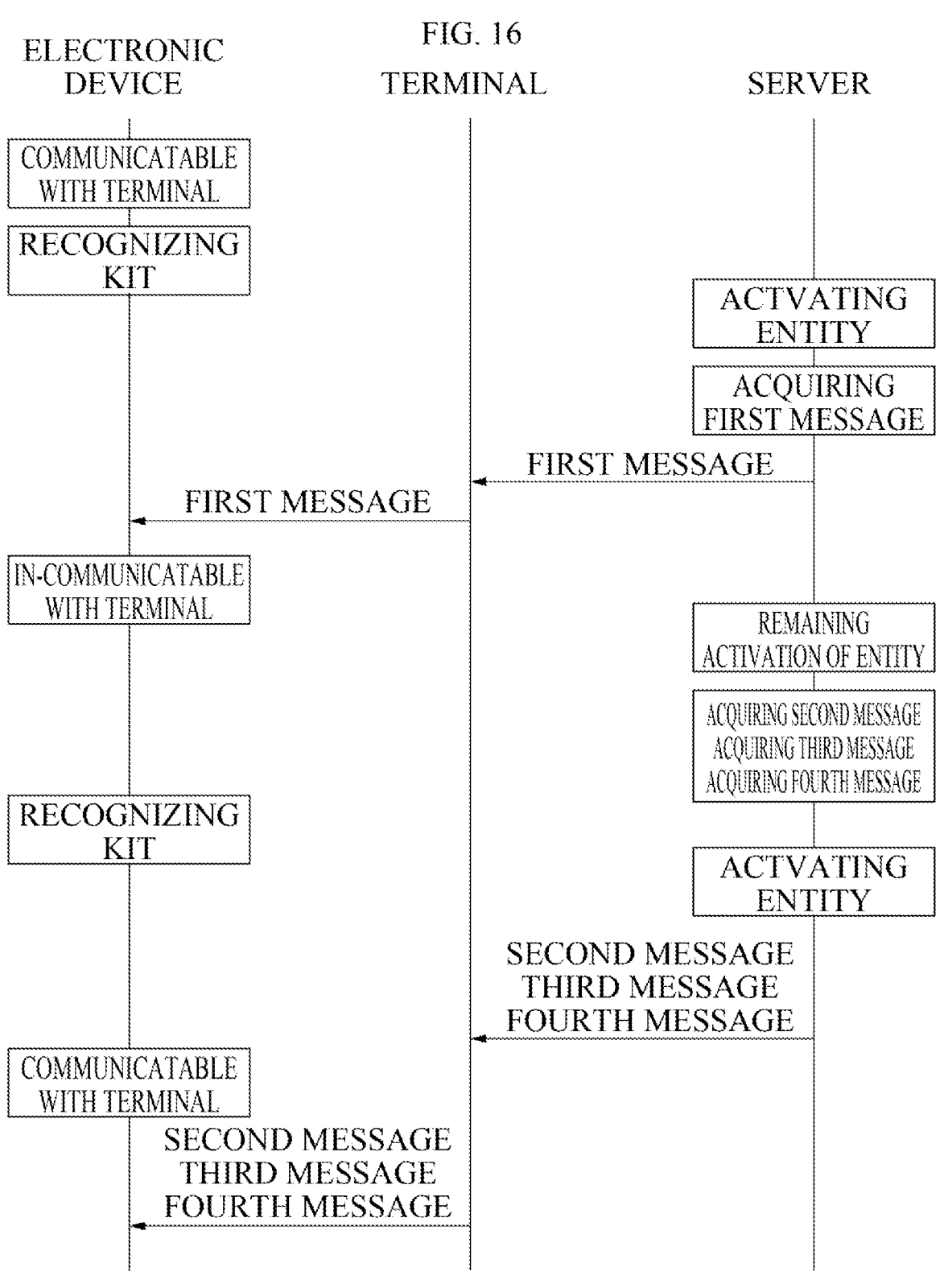
FIG. 16 is a diagram for describing a communication method in a situation where communication between an electronic device and a terminal is impossible according to an embodiment.

FIG. 16 is a diagram for describing a communication method in a situation where communication between an electronic device and a terminal is impossible, according to an embodiment.

Referring to FIG. 16, when a kit is recognized by an electronic device in a state where the electronic device and the terminal are capable of communication, an entity may be activated in a communication group of a server. Also, a first message can be acquired from a communication group of the server, and the terminal can access the entity to acquire the first message. In addition, the terminal may provide the acquired first message to the electronic device.

Thereafter, communication between the electronic device and the terminal may be disconnected. In this case, the activation of the entity in the communication group of the server can be maintained.

Specifically, if the electronic device does not recognize the kit, it may be recognized that the user does not receive a message obtainable from the entity corresponding to the kit from the server. However, if the electronic device and the terminal are not able to communicate, the user may have the intention of receiving a message obtainable by the entity corresponding to the kit from the server. For example, even if the electronic device and the terminal are not able to communicate, the terminal may acquire a message obtainable from the entity corresponding to the kit from the server, and the user may confirm the message from the terminal. Accordingly, in the communication system, even when communication between the electronic device and the terminal is disconnected, the entity in the communication group of the server can be maintained in activation.

In a situation where the activation of the entity is maintained, if the second to fourth messages are acquired in the communication group of the server, the terminal may access the entity to acquire the second to fourth messages. In addition, the terminal may check the second to fourth messages through the output unit of the terminal. Of course, the terminal may not output only the message acquired in a situation where communication with the electronic device is disconnected, but may output the message acquired by the terminal previously from the server or the electronic device.

In addition, without being limited thereto, according to an embodiment, when communication between the electronic device and the terminal is disconnected, the entity may be deactivated, and accordingly, the terminal may not be able to acquire the message.

Figure 17:
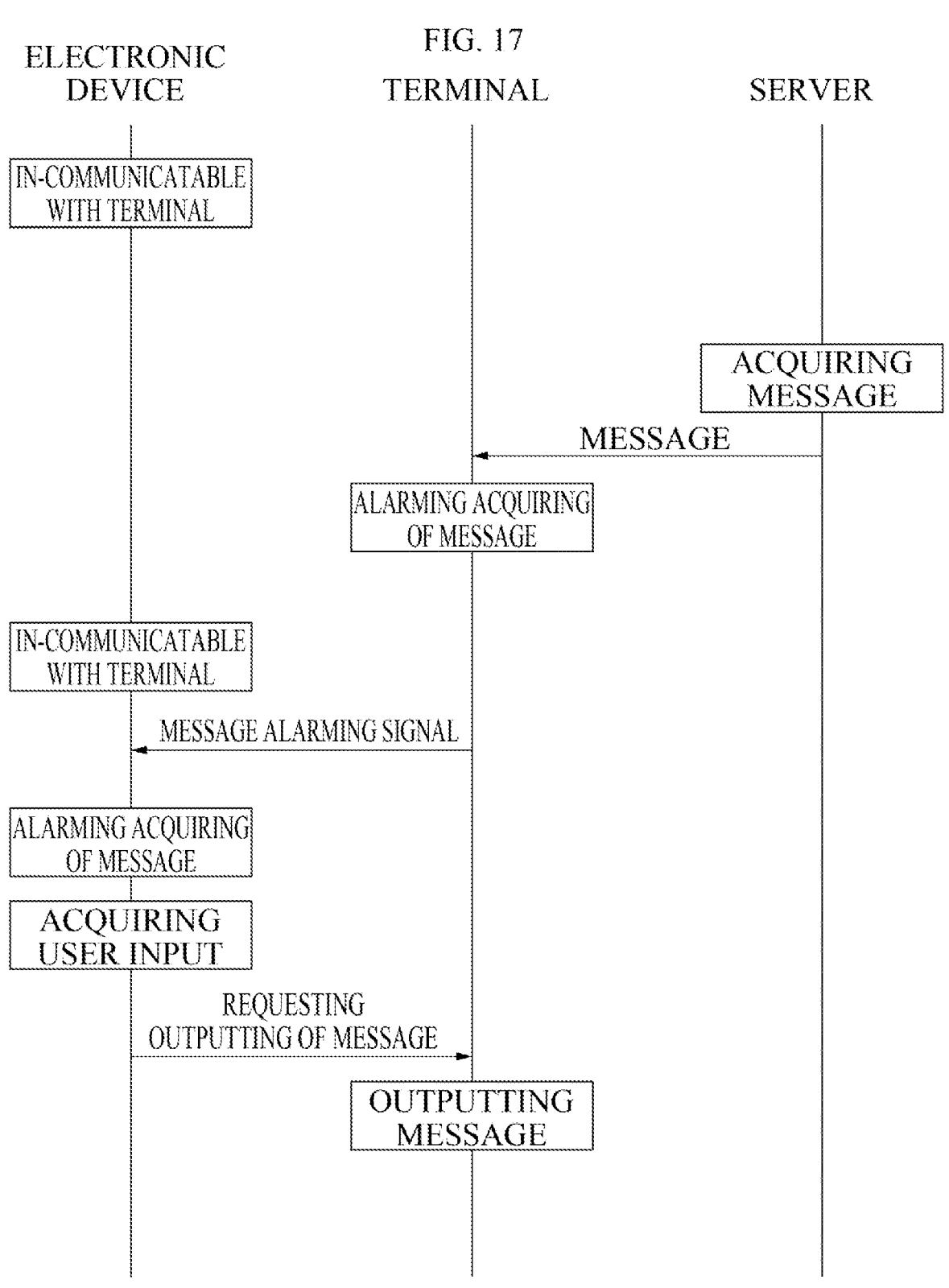
FIG. 17 is a diagram for describing a communication method in a situation where communication between an electronic device and a terminal is impossible according to another embodiment.

FIG. 17 is a diagram for describing a communication method in a situation where communication between an electronic device and a terminal is impossible according to another embodiment.

Referring to FIG. 17, even when communication between the electronic device and the terminal is disconnected, as described above, the entity in the communication group of the server may be maintained in activation. Accordingly, when a message is acquired from the communication group of the server, the terminal may access the entity to acquire the message. In this case, the terminal may perform notification that the message has been acquired. However, the terminal may not display a message in the terminal.

After that, when the electronic device and the terminal are in communication, and a kit corresponding to the entity is inserted into the electronic device, the terminal may transmit a message notification signal indicating that the message has been acquired to the electronic device, and the electronic device may display that the message has been acquired according to the message notification signal. In this case, the message obtained by the terminal may be a type that cannot be output by the terminal. The electronic device may display that the message has been acquired in the terminal through the output unit according to the message notification signal.

Thereafter, when the electronic device acquires a user input, the electronic device may transmit a message output request to the terminal. The terminal may output the message obtained from the server through the output unit in response to the message output request obtained from the electronic device.

This embodiment may also be applied in a situation where the electronic device and the terminal are capable of communication. For example, if the electronic device does not have a display (for example, if the electronic device is in the form of a keyring or keyholder and the kit is included in the electronic device), it may be difficult to check the message in the electronic device. In this case, according to the above-described embodiment, even if the electronic device does not check the message, the user may check the message through the terminal.

3.5. Message Transmission Method

Figure 18:
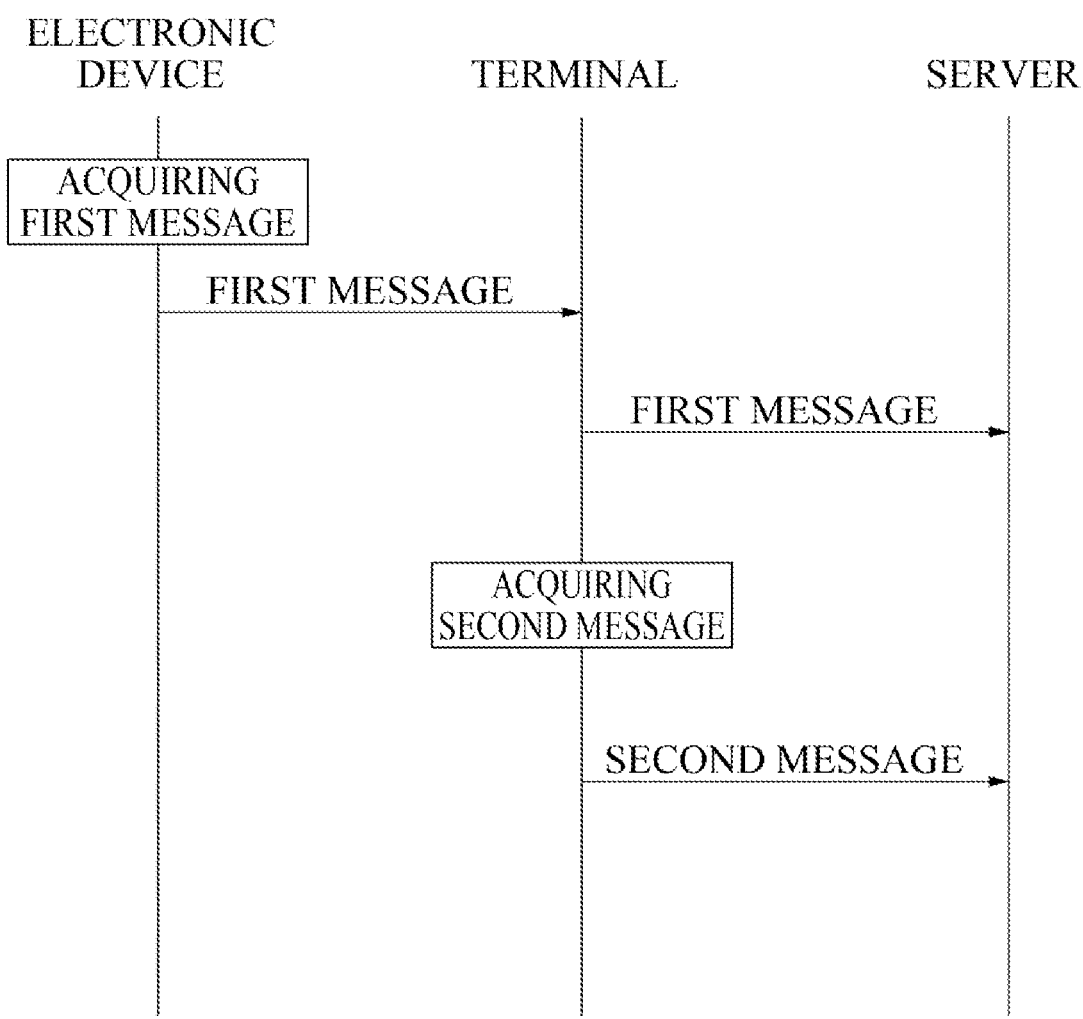
FIG. 18 is a diagram for describing a message transmission method according to an embodiment.

FIG. 18 is a diagram for describing a message transmission method according to an embodiment.

Referring to FIG. 18, the electronic device may transmit a message to the terminal. For example, the message may include at least one of the above-described device identifier information, user information, kit identification information, information about a communication group, communication authority information, time information, state information, cumulative state information, and message information. The terminal may transmit the first message obtained from the electronic device to the server. In addition to the first message obtained from the electronic device, the terminal may transmit a second message corresponding to the information input or obtained by the terminal to the server. For example, the terminal may transmit the second message corresponding to at least one of the terminal identifier information, user information, kit identification information, information about a communication group, communication authority information, time information, and message information to the server.

The server may store the obtained first message and the second message in a message storage accessible by the entity of the other communication group so that the obtained first message and the second message can be obtained by the entity of the other communication group.

In addition, if the message transmitted by the electronic device to the terminal includes the state information of the electronic device, the terminal and the server may manage the electronic device based on the state information of the electronic device. In addition, if the server obtains the message including the state information of the terminal, the server may manage the terminal based on the state information of the terminal.

3.6. Other Embodiment

Figure 19:
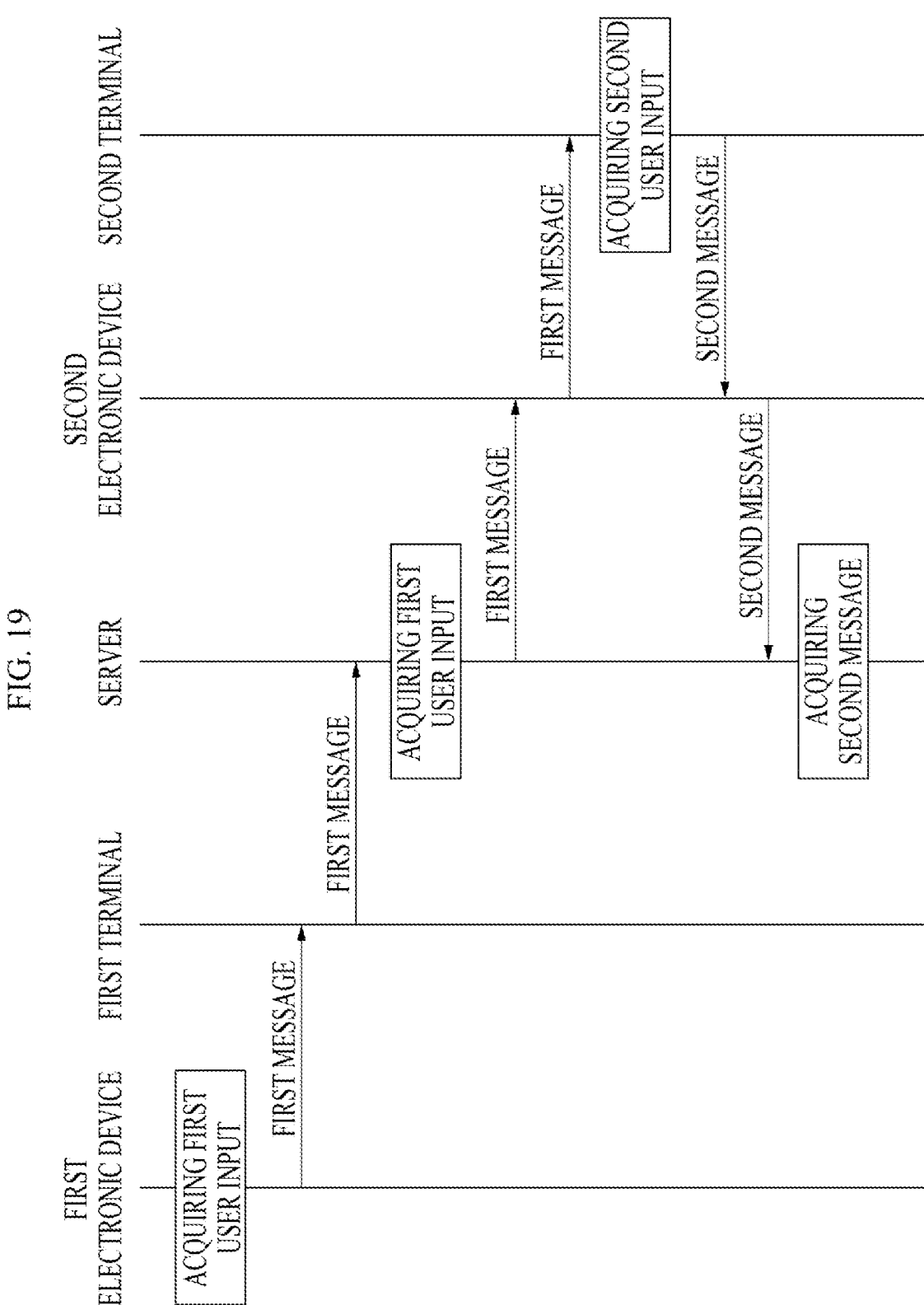
FIG. 19 is a diagram for describing generation of a common message according to an embodiment.

FIG. 19 is a diagram for describing the generation of a joint message according to an embodiment.

Referring to FIG. 19, the joint message may mean one message generated by a plurality of electronic devices or terminals. The joint message may be a form in which touch information, drawing information, voice information, and text information are combined. In addition, the joint message may be a form in which two or more touch information are combined, two or more drawing information are combined, two or more voice information are combined, or two or more text information are combined. For example, the joint message may be a form in which first drawing information and second drawing information are combined, or text information and voice information are combined. Hereinafter, the generation of the joint message combined with the first drawing information and second drawing information will be described.

In the embodiment of FIG. 19, the first entity corresponding to the first electronic device and the first terminal, and the second entity corresponding to the second electronic device and the second terminal may be included in the same communication group or different communication groups. In addition, the first entity and the second entity may have transmission and reception authority.

The first electronic device may transmit the first message including the first drawing information, as shown in 2001 of FIG. 20, to the first terminal, and the first terminal may transmit the first message to the server. The server may store the first message in a message storage accessible by the second entity. The second terminal may access the second entity to acquire the first message and transmit the first message to the second electronic device. The second electronic device may output the first drawing information included in the first message through the output unit. For example, the second electronic device may display the first drawing information on the display. In addition, the second electronic device may acquire the second drawing information as shown in 2003 of FIG. 20 from the user in a state in which the first drawing information is displayed on the display, and combine the first drawing information with the second drawing information acquired from the user to acquire the joint drawing information as shown in 2005 of FIG. 20. The second electronic device may transmit the second message including the joint drawing information to the second terminal, and the second terminal may transmit the second message to the server. The server may store the second message in a message repository accessible by the first entity or the third entity. Accordingly, the first entity or the third entity may access the message storage to obtain the second message and output the joint drawing information included in the second message.

Figure 21:
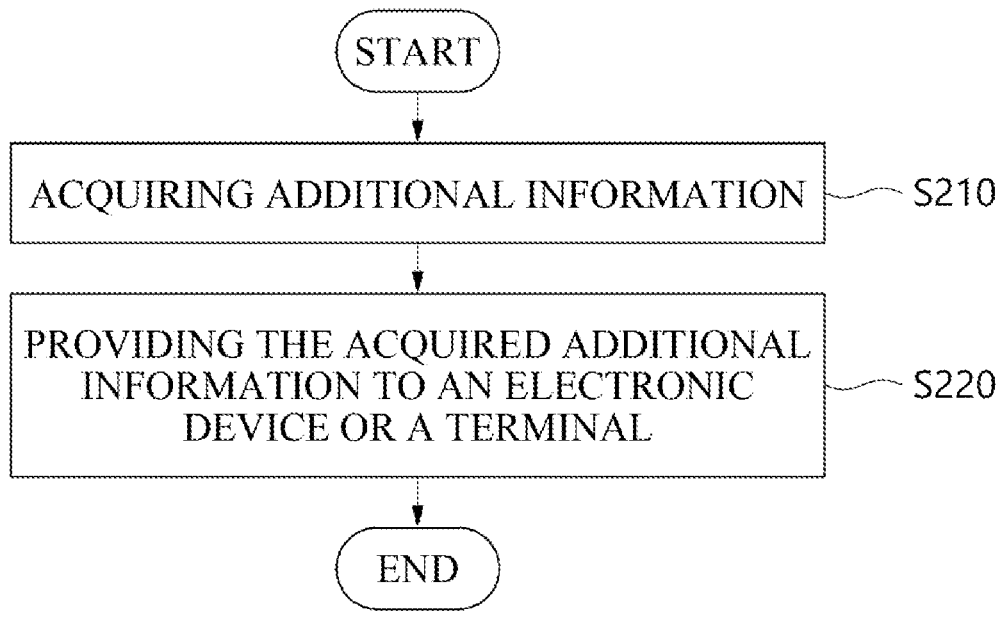
FIG. 21 is a diagram for describing a method of providing additional information of a server according to an embodiment.

FIG. 21 is a diagram for describing a method of providing additional information of a server according to an embodiment.

Referring to FIG. 21, a method of providing additional information of a server according to an embodiment may include obtaining additional information (S210) and providing the obtained additional information to an electronic device or terminal (S220).

The server can provide various additional information to the entity as well as the message acquired by the server from the entity of the communication group.

In step S210, the server may acquire additional information on the electronic device, the terminal, the communication group, the entity, or the acquired message. For example, the additional information may include information on the number of entities activated in a specific communication group for a predetermined time. As another example, the additional information may include information on the number of messages provided by entities of a specific communication group for a predetermined time.

As a specific example, when a communication system is used for communication between a star and a fan, the first communication group may include an entity corresponding to the star's kit, and the second communication group may include an entity corresponding to the fan's kit for the star. The server may calculate the number of entities activated in the second communication group for a predetermined time, and generate additional information based on the calculated number of entities (for example, additional information indicating the number of electronic devices obtained by externally touching input among electronic devices corresponding to entities activated in the second communication group for a predetermined time is more than/less than a predetermined number of entities activated in the second communication group for a predetermined time). In addition, the server may calculate the number of messages provided by entities of the second communication group for a predetermined time. For example, when touch information is acquired from the electronic devices of the fans, the server may acquire a message for touch information from entities of the second communication group and calculate the number of messages acquired for a predetermined time. The server may generate additional information based on the calculated number of messages (e.g., additional information that the messages provided from entities of the second communication group for a predetermined period of time are greater than or equal/less than to a predetermined number).

In addition, the server may acquire additional information based on various information that can be acquired by the server.

In addition, in step S220, the server may provide the acquired additional information to the electronic device or the terminal. For example, the server may store the message corresponding to the obtained additional information in a message storage accessible to an entity of a specific communication group, and the entity of the specific communication group accesses the message storage, so that the terminal or the electronic device may obtain the message.

In addition, the message corresponding to the obtained additional information may be configured in various forms. For example, in an example in which the aforementioned communication system is used for communication between a star and a fan, if the entity activated in the second communication group for a predetermined time is 0 to 1000, a command to emit a yellow light in the electronic device may be included in the message corresponding to the additional information, and if the entity activated in the second communication group for a predetermined time is 1001 to 10000, a command to emit a red light may be included in the message corresponding to the additional information.

In addition, if the number of messages provided by entities of the second communication group for a predetermined time is 0 to 100, a command to emit blue light may be included in the message corresponding to the additional information, and if the number of messages provided by entities of the second communication group for a predetermined time is 101 to 1000, a command to emit green light may be included in the message corresponding to the additional information.

The message corresponding to the additional information may be provided to the entity of the first communication group, and the message corresponding to the additional information may be obtained from the electronic device of the star. According to the command included in the message corresponding to the additional information, the light of a specific color of the electronic device of the star may be emitted, and accordingly, the star may check the number of fans currently connected to the communication system or the number of messages received from the fans.

Figure 22:
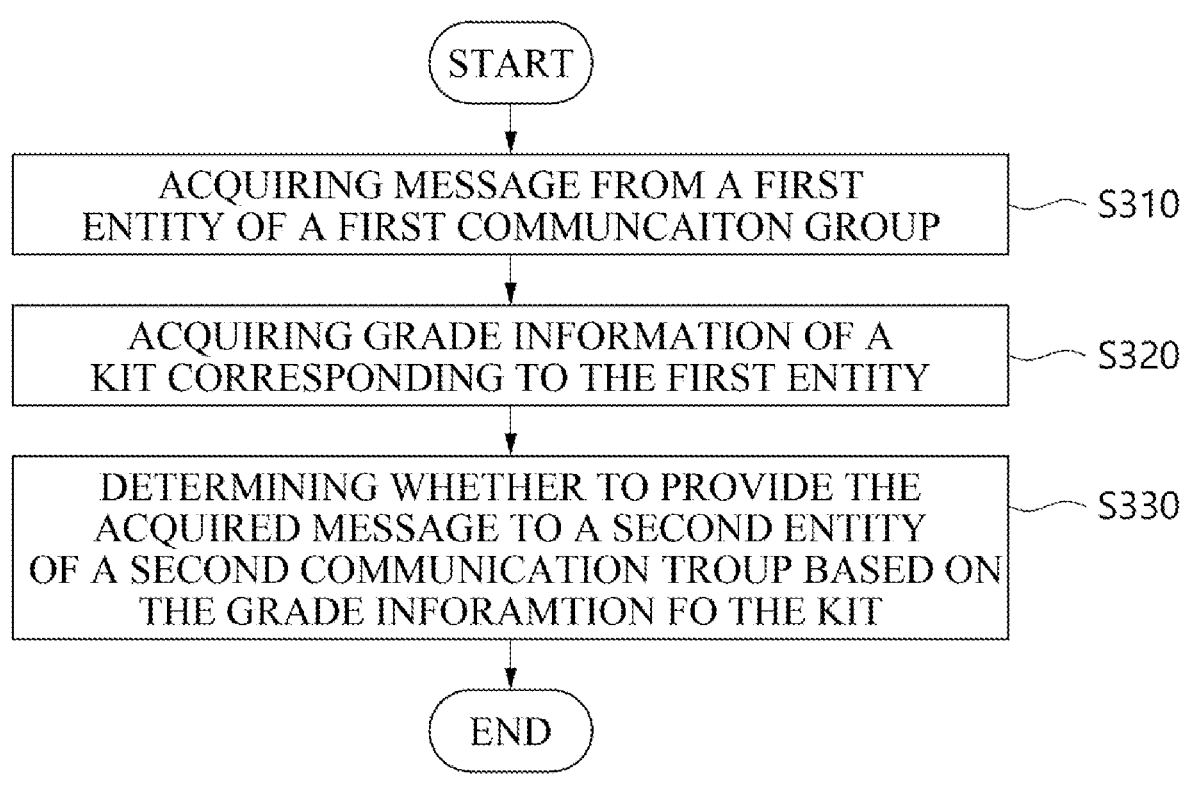
FIG. 22 is a diagram for describing a communication method of a server using a grade of a kit according to an embodiment.

FIG. 22 is a diagram for describing a communication method of a server using a grade of a kit according to an embodiment.

Referring to FIG. 22, the communication method of the server using the grade of the kit may include acquiring a message from a first entity of the first communication group (S310), acquiring grade information of the kit corresponding to the first entity (S320), and determining whether to provide the acquired message to a second entity of the second communication group based on the grade information of the kit (S330).

In step S310, the server may acquire the message from the first entity of the first communication group.

In step S320, the server may check the grade information of the kit corresponding to the first entity. In an embodiment, the kit may include the grade information of the kit. Here, the grade information of the kit may be set by the manufacturer of the kit. In addition, the grade of the kit may be divided into a predetermined number of grades.

In addition, in step S330, the server may determine whether to provide the acquired message to the second entity of the second communication group based on the grade information of the kit.

In an embodiment, the server may determine the number of messages providable to the second entity of the second communication group based on the grade information of the kit. For example, the grade of the kit may be divided into first to third grades. In this case, when the grade of the kit is the first grade, the server may provide all messages obtained from the first entity to the second entity. In addition, when the grade of the kit is the second grade, the server may provide only 10 messages from the first entity to the second entity. In addition, when the grade of the kit is the third grade, the server may not provide all the messages obtained from the first entity to the second entity.

In another embodiment, the server may determine the probability of providing the message to the second entity of the second communication group based on the grade information of the kit. For example, as described above, the grade of the kit may be divided into the first to third grades. In this case, if the grade of the kit is the first grade, the probability of providing the message to the second entity may be set to 100%, and the server may provide all the messages obtained from the first entity to the second entity. In addition, when the grade of the kit is the second grade, the probability of providing the message to the second entity may be set to 50% and the server may randomly select half of the messages obtained from the first entity and provide the selected message to the second entity. In addition, when the grade of the kit is the third grade, the probability of providing the message to the second entity may be set to 10%, and the server may randomly select 10% of the messages obtained from the first entity and provide the selected message to the second entity.

4. Communication Method Using Secret Signal 4.1. Overview

Figure 23:
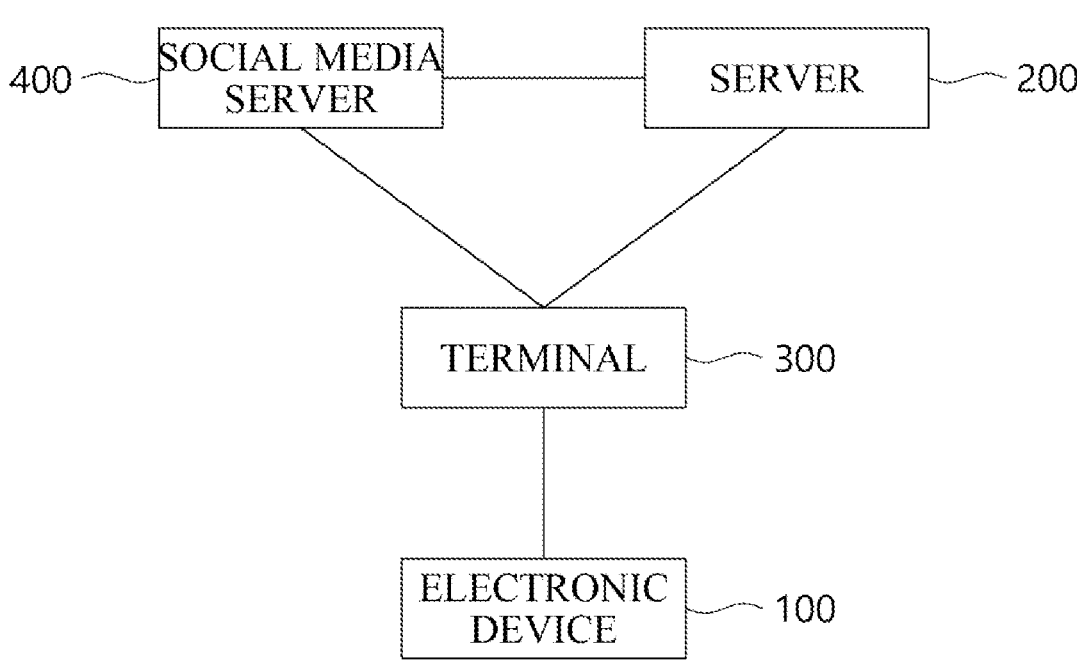
FIG. 23 is a diagram for describing a communication system to which a communication method using a secret signal is applied according to an embodiment.

FIG. 23 is a diagram for describing a communication system to which a communication method using a secret signal is applied, according to an embodiment.

Referring to FIG. 23, the social media server 400 may be further added to the communication system 2 to which the communication method using the secret signal is applied.

Here, the social media server 400 is text between users. It may mean a server that provides a platform for sharing various contents such as images, voices, and videos, and provides the contents to the terminal 300 or the control device 100. For example, the novel media server 400 may include a blog platform, a social network service (SNS) platform, a Wiki platform, a user production content (UGC, UCC) providing platform, a micro blog platform, and a real-time video sharing platform.

In addition, according to an embodiment, the server 200 may perform the role of the social media server 400. That is, the social media server 400 may be included in the server 200. Hereinafter, the social media server 400 and the server 200 are distinguished, but the present invention is not limited thereto, and the social media server 400 and the server 200 may be implemented as one server, or any one of the social media server 400 and the server 200 may be implemented to control any one server.

In general, the terminal 300 may access the social media server 400 to obtain content provided by the social media server 400, and output the obtained content from the terminal 300. The content provided by such social media may be shared by several provided content, and the number of content providers and content consumers may be 1:n (where n is a natural number greater than or equal to 1). However, in some cases, from the viewpoint of the content consumer, only certain content may be shared, or only people of a specific group may want to be shared. For example, when the communication system 1 is used for communication between stars and fans, content provided by stars may be generally shared with a plurality of fans. However, from the standpoint of the fan, only oneself may share the content provided by the star or only one belonging to the group may want to make a special interview with the star by receiving the content of the star. In order to satisfy this need, the communication system 2 may be configured to provide a secret message within or along with content provided from a content provider to the terminal 300, and to allow only a specific content consumer to acquire or confirm the secret message through the terminal 300. Here, the secret message may mean content provided only to a certain qualified user or content that can be identified only by a certain qualified content consumer. Here, the secret message may consist of content that can be output from the terminal 300 or the electronic device 100, for example, the secret message may include text, image, voice, video, light emission of a specific color, drawing, etc.

In addition, the communication system 2 may provide secret rule information to a specific content consumer. Here, the secret rule information is rule information that can identify the secret message included in the content from the terminal 300, for example, the terminal 300 may identify that at least one secret message corresponds to the content using the secret rule information and output the at least one secret message. In this case, when the terminal 300 does not acquire the secret rule information, the at least one secret message included in the content may not be identified.

Figure 24:
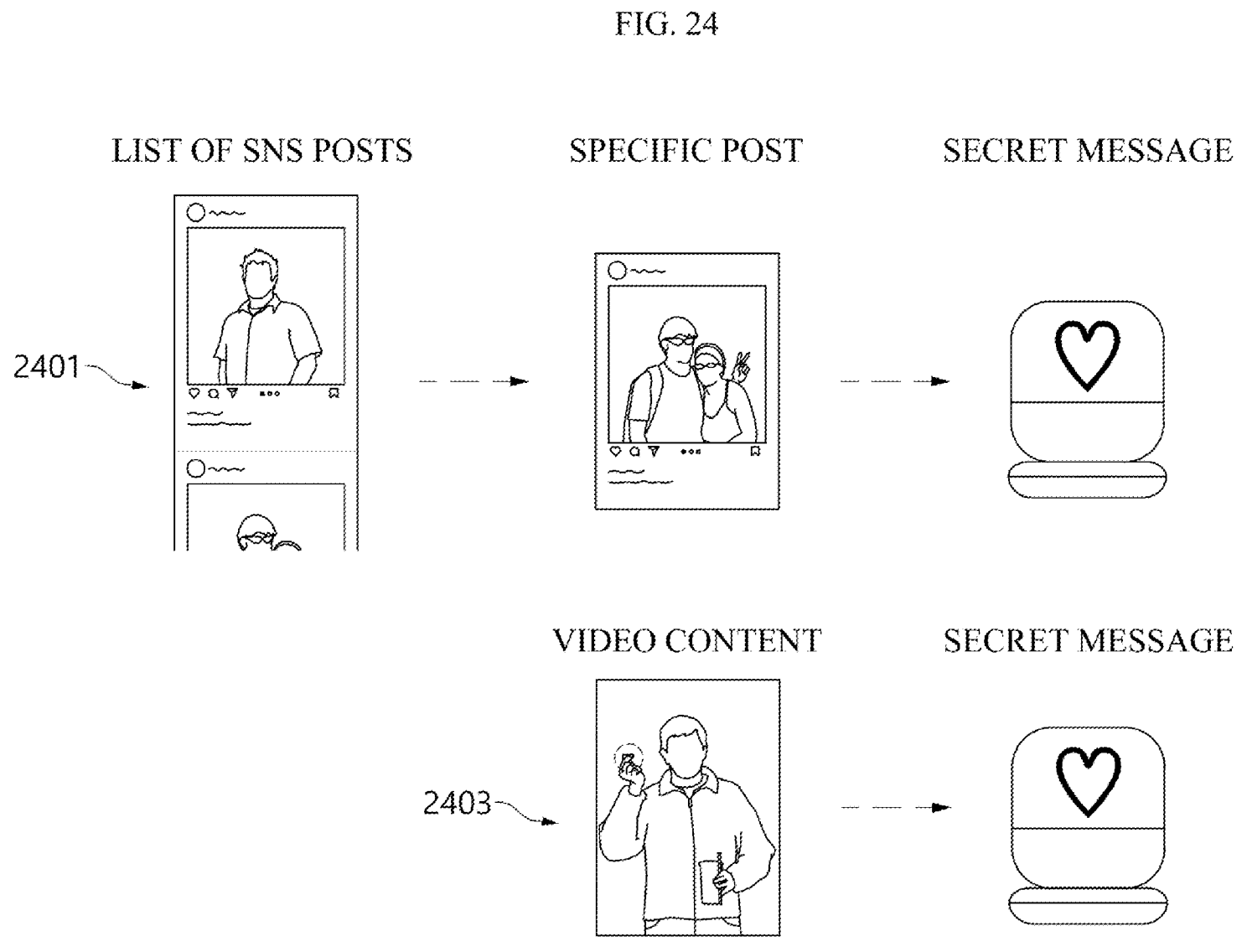

Referring to the embodiment of FIG. 24, FIG. 24 is a diagram for describing an example of a secret message according to an embodiment.

Referring to FIG. 24, as in 2401 of FIG. 24, the social media server 400 may provide a list of SNS posts obtained from the star's terminal to the fan's terminal 300. In addition, when the terminal 300 of the fan acquires a transmission request for a specific post, the social media server 400 may provide the specific post to the fan's terminal 300. In addition, when it is identified that the fan is qualified to acquire the secret message, the social media server 400 may provide the terminal 300 with the secret message corresponding to the specific post, and the terminal 300 may output the secret message to the terminal 300 or may provide the secret message to the electronic device 100 so that the secret message is output from the electronic device 100.

In addition, as in 2403 of FIG. 24, the terminal 300 may acquire video content from the social media server 400. In this case, the video content may include real-time video content streamed in real time from the star's terminal or non-real-time video content in which the entire image is stored in the social media server 400 in advance.

For example, when the terminal 300 is qualified to acquire the secret message, the social media server 400 may acquire the secret message from the video content using a certain secret rule signal and may provide the secret message to the terminal 300 or the electronic device 100. For example, when the social media server 400 provides real-time video content to the terminal, the secret rule information may include a rule that a secret message of a heart image corresponding to the heart gesture is acquired when the star performs the heart gesture. In this case, the social media server 400 may analyze the real-time video content or detailed video content included in the real-time video content based on the secret rule information, recognize whether the first detailed video content for the heart gesture is included in the real-time video content and the first detailed video content for the heart gesture is reproduced at the terminal 300 or the electronic device 100, and transmit the secret message to the terminal 300 or the electronic device 100 so that the secret message of the heart is reproduced at the terminal 300 or the peripheral time. In this case, the secret message may include a secret message playback time point, and the secret message playback time point may be within a predetermined time range from the playback time point of the first detailed video content.

As another example, when the terminal 300 is eligible to acquire the secret message, the terminal 300 may acquire secret rule information, and may acquire the secret message by analyzing the video content analyzed by the social media server 400 with the secret rule information. In the above example, the terminal 300 may acquire real-time video content from the social media server 400, analyze the real-time video content or detailed video content included in the real-time video content based on the secret rule information, and identify whether the first detailed video content for the heart gesture is included in the real-time video content and the time point at which the first detailed video content for the heart gesture is played by the terminal 300 or the electronic device 100.

The terminal 300 may generate the secret message of the heart image corresponding to the first detailed video content, and set the secret message playback time point at the terminal 300 or the electronic device 100 within a predetermined time range from the time point at which the first detailed video content is played by the terminal 300 or the electronic device 100. The terminal 300 may output the secret message at the time point at which the secret message is played, but may provide the secret message to the electronic device 100 so that the secret message is output at the time point at which the secret message is played.

The foregoing example may be provided in various other contents other than the video content.

In addition, for convenience of explanation, the secret message and the secret rule information may be expressed as a secret signal in the present specification.

In addition, in the present specification, the terminal 300 And the electronic device 100 may generate and transmit a general message (or general content) and a secret message rather than a secret message to the social media server 400 (or the server 200), or acquire the general message and the secret message from the social media server 400 (or the server 200), and output the general message and the secret message respectively at the terminal 300 And the electronic device 100.

In addition, in an embodiment, whether the content consumer is eligible to acquire or confirm the secret message may be determined by whether the electronic device of the content consumer detects the kit of the content provider providing the secret message. Accordingly, when the content provider is a star, when the electronic device detects the kit corresponding to the star, it may be determined that the fan is eligible to acquire or confirm the secret message.

In addition, whether the content consumer is eligible to acquire or confirm the secret message may be determined according to whether the content consumer performs a specific action. For example, when the content provider is a star, when a subscription message or recommendation message for the star's SNS content provided by the terminal of the fan is acquired by the social media server or the server, it may be determined that the fan is eligible to acquire or confirm the secret message.

As described above, only a specific fan eligible can confirm the secret message provided by the star, thereby improving the s satisfaction of the star, and efficiently manages high loyalty fans from the standpoint of the star.

Hereinafter, more detailed description will be given below.

4.2. Method of Providing Secret Messages or Secret Rule Information from the Content Provider's Terminal FIG. 25 is a diagram illustrating a method of generating a secret message and secret rule information according to an embodiment.

Figure 25:
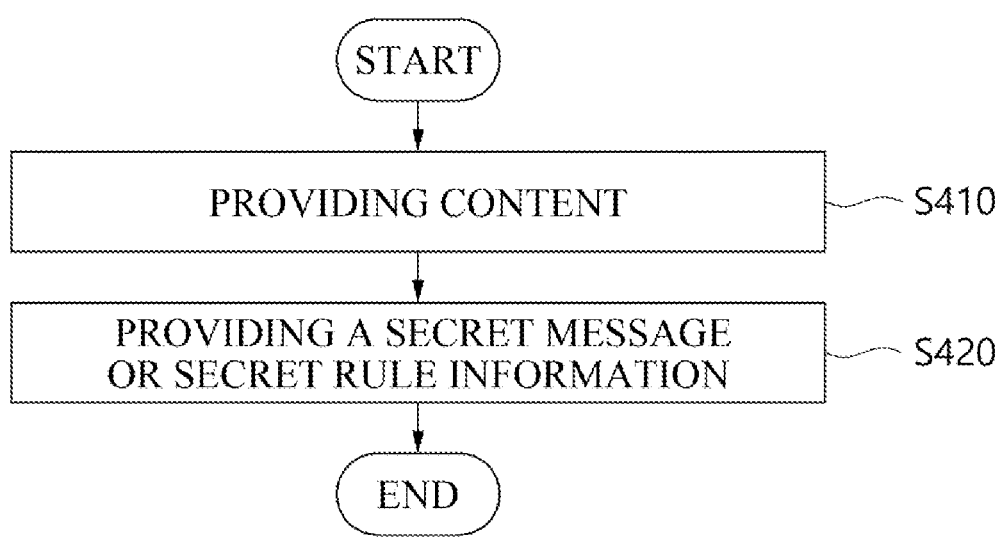
FIG. 25 is a diagram for describing a method of generating a secret message and secret rule information according to an embodiment.

Referring to FIG. 25, a method of providing a secret message and secret rule information according to an embodiment may include providing content (S410) and providing a secret message or secret rule information (S420).

In step S410, a terminal of a content provider may provide content to a social media server. Of course, a server of a content provider may also provide content to a social media server, but for convenience of explanation, FIG. 24 will be described based on a terminal.

For example, the terminal may provide various contents such as text, image, voice, and video to the social media server.

In addition, the terminal may provide the content to the social media server through an account in the social media server.

In addition, in step S420, the terminal may provide a secret message or secret rule information. In an embodiment, when the account in the social media server corresponds to the entity in the server of the communication system 1, the terminal may provide the secret message or secret rule information. For example, when the account of star A is registered in the social media server and the entity corresponding to a is present in the server, the terminal may provide the secret message or secret rule information to the social media server through the account of star A.

In addition, in another embodiment, when the entity is activated in the server of the communication system 1, the terminal may provide the secret message or secret rule information to the social media server. For example, when information indicating that the entity is activated from the server of the communication system 1 is confirmed before the terminal provides the secret message or secret rule information to the social media server, the terminal may provide the secret message or secret rule information to the social media server.

In addition, in another embodiment, when the kit is detected in the electronic device, the terminal may provide the secret message or secret rule information to the social media server. For example, in the above example, when the kit of star A is detected in the electronic device that performs communication with the terminal, the terminal may provide the secret message or secret rule information to the social media server.

In addition, in step S420, the terminal may generate the secret message or secret rule information in various ways. As a result, FIG. 26 is a diagram illustrating an example of secret message generation according to an embodiment, and FIG. 27 is a diagram illustrating an example of secret rule information generation according to an embodiment.

Referring to FIG. 26, the terminal may output a message input UI and a secret message input UI as shown in 2601 of FIG. 26. The terminal may generate a message obtained from the message input UI as a general message. In addition, the terminal may generate a message obtained from the secret message input UI as a secret message. As described above, the secret message may be text. Image, voice, video, etc. In addition, the secret message may be configured to correspond to the general message. For example, the general message and the secret message may be provided to the social media server, another terminal or electronic device as a single set. In addition, the time when the general message is output and the time when the secret message is output may be set to correspond to each other. For example, a general message and a secret message acquired from the social media server through (a) may be acquired to another terminal, and the other terminal may transmit the secret message to the electronic device. In this case, when the output time set for the general message and the secret message is the first time, the other terminal may output the general message within the predetermined time range including the first time or the first time, and the electronic device may output the secret message within the predetermined time range including the first time or the first time.

In addition, the terminal may acquire general messages and secret messages together through the integrated message input UI as shown in 2603 of FIG. 26. For example, in the secret message input UI, a specific rule indicating that it is a secret message may be set in advance. For example, a message that is written behind a specific password, such as #secret, may be set to be a secret message.

For example, when "What you have good your day," and "#secret heart icon" are input in the integrated message input UI as in 2603 of FIG. 26, the terminal or social media server may set "What you have good your day" as a general message, and "heart icon" written after #secret may be set as a confidential message. Accordingly, when a general message and a secret message acquired through 2601 of FIG. 26 from the social media server are acquired to another terminal and the other terminal transmits the secret message to the electronic device, an icon of a heart shape and a icon of a heart shape may be displayed at the same time in the other terminal.

Referring to FIG. 27, the terminal may provide secret rule information UI and acquire the secret rule information through the secret rule information UI.

In an embodiment, the terminal may provide a secret rule information input UI and a secret message input UI. The terminal may acquire the secret rule information through information acquired from the secret rule information input UI, and generate a message input through the secret message input UI as a secret message.

In addition, the terminal may generate various secret rule information and secret messages. 2701 of FIG. 27 may be a UI for describing image-based secret rule setting, 2703 of FIG. 27 may be a UI for describing sound-based secret rule setting, and 2705 of FIG. 27 may be a UI for describing time-based secret rule setting.

For example, as in 2701 of FIG. 27, the terminal may acquire first secret rule information for outputting a secret message of a star image when a specific operation (e.g., a buying operation) is included in the content through the secret rule information input UI and the secret message input UI. In this case, when another terminal or electronic device acquires the first secret rule information along with the content, it analyzes the content to check whether the detailed content including the rate operation is included in the content and the output time of the detailed content, and the other terminal or electronic device may output the detailed content while outputting a secret message of a separate image at the time when the detailed content is output.

In another example, as in 2703 of FIG. 27, the terminal may acquire second secret rule information to output a secret message of an image of "BTS" when a specific voice (e.g., "Vith's") is included in the content through the secret rule information input UI and the secret message input UI.

In another example, as shown in 2705 of FIG. 27, the terminal may acquire third secret rule information for outputting a secret message of a heart image when a specific time (e.g., 20 minute period from the start time of outputting the content) is reached in the content through the secret rule information input UI and the secret message input UI.

As such, various types of secret rule information and corresponding secret messages may be generated.

In addition, such secret rule information and secret messages may be generated not only by the content provider using the terminal or the electronic device, but also by the social media server and the server of the communication system 1. For example, the social media server and the server of the communication system 1 may preset the secret rule information and the secret message, and provide the set secret rule information and the secret message to the terminal or the electronic device.

4.3. A Method of Providing a Secret Message or Secret Rule Information of a Social Media Server FIG. 28 is a diagram for describing a method of providing a secret message or secret rule information in a social media server according to an embodiment.

Figure 28:
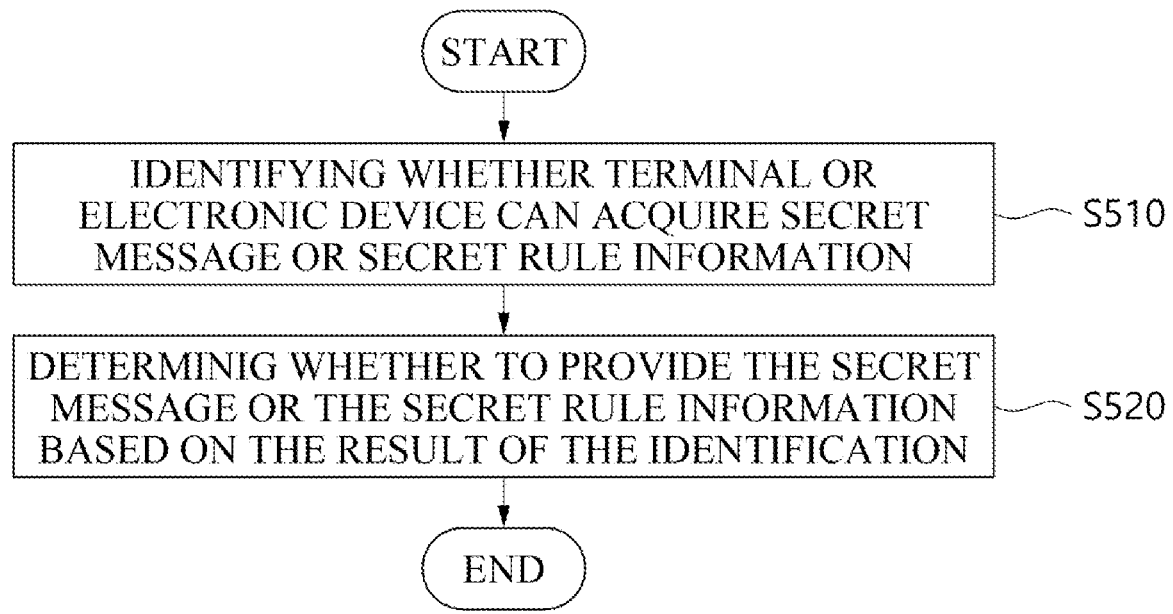
FIG. 28 is a diagram for describing a method of providing a secret message or secret rule information in a social media server according to an embodiment.

Referring to FIG. 28, a method of providing a secret message or secret rule information in a social media server according to an embodiment may include checking whether a terminal or electronic device can acquire a secret message or secret rule information (S510) and determining whether to provide a secret message or secret rule information based on the check result (S520).

In step S510, the social media server may check whether the terminal or the electronic device can acquire a secret message or secret rule information.

For example, the social media server may determine that the terminal or electronic device can acquire a secret message or secret rule information when the account of the terminal in the social media server corresponds to the entity corresponding to the terminal in the server of the communication system 1. For example, if the fan b's account is registered in the social media server, the social media server confirms whether there is information indicating that the fan b's account is a star A's fan, and the server of the communication system 1 confirms that the entity corresponding to the fan b is included in a communication group that can acquire a message from the communication group of star A, the social media server can provide a secret message or secret rule information through the fan b's account.

As another example, when the entity is activated in the server of the communication system 1, the social media server may provide a secret message or secret rule information to the terminal or electronic device. For example, in the above example, the social media server may check whether the entity of fan b is activated from the server of the communication system 1, and when the entity of fan b is activated, the social media server may provide a secret message or secret rule information through the account of fan b.

As another example, the social media server may provide a secret message or secret rule information to the terminal or electronic device after obtaining information that a specific kit has been detected in the electronic device that is communicatable with the terminal from the terminal or electronic device. For example, in the above example, when the terminal confirms that the kit used to activate the entity of fan b has been detected by the electronic device through communication with the electronic device, the terminal may transmit the confirmation information to the social media server, and the social media server may provide a confidential message or confidential rule information to the terminal or the electronic device in response to the confirmation information.

In addition, in step S520, the social media server may provide a confidential message or confidential rule information to the terminal or electronic device based on the result of the confirmation. For example, the social media server may obtain a request for providing content from the terminal and provide a secret message or secret rule information along with the content (or general message) in response to the request for providing. The terminal may provide a secret message or secret rule information to the terminal, and the terminal may provide the secret message or secret rule information to the electronic device.

In another embodiment, the server of the communication system (1, see FIG. 1) may provide a secret message or secret rule information to the terminal or electronic device. For example, the server of the communication system 1 may acquire a secret message or secret rule information in advance from a terminal of a social media server or a content provider. In addition, when the social media server obtains a request for providing content from the terminal, the server of the communication system 1 may receive a request for providing a secret message or secret rule information to the terminal or electronic device from the social media server. The server of the communication system 1 may provide a secret message or secret rule information to the terminal or electronic device through an entity corresponding to the terminal in response to the request.

In addition, in an embodiment, when a specific condition is satisfied, the social media server may provide a confidential message or confidential rule information to the terminal or the electronic device. For example, when the social media server obtains a request for providing content from the terminal, the social media server may check whether or not the terminal obtains a predetermined message (e.g., subscription message, recommendation message, and various types of response messages) for the content. When a pre-determined message for the corresponding content is acquired, the social media server may provide a secret message or secret rule information to the terminal or the electronic device.

In an embodiment, the social media server may analyze the content based on the secret rule information and provide a secret message based on the analysis result. For example, when the social media server streams real-time video content provided from the terminal of the content provider to the terminal, the social media server may analyze the real-time video content based on the secret rule information. In this case, the first secret rule information may be an operation in which star A takes up and down, the first secret message corresponding to the first secret rule information may be a circle image, the second secret rule information may be a voice of star A, which is "hate," and the second secret message corresponding to the second secret rule information may be an image x. In this case, the social media server may acquire the operation and voice of star A from real-time video content. For example, when the operation and voice of star A and the operation and voice of another person are mixed in real-time video content, the social media server may distinguish the operation and voice of star A from the operation and voice of another person in real-time video content. In addition, the social media server may acquire first detailed content corresponding to the first secret rule information and second detailed content corresponding to the second secret rule information from the operation of star A. also The social media server may provide the terminal or the electronic device with the first secret message and the reproduction time information of the first secret message so that the first secret message is reproduced at the time when the first detailed content is reproduced by the terminal or the electronic device, and provide the terminal or the electronic device with the second secret message and the reproduction time information of the second secret message so that the second secret message is reproduced at the time when the second detailed content is reproduced by the terminal or the electronic device. Of course, the reproduction time information of the first secret message and the second secret message may be omitted.

In another embodiment, the social media server may provide the terminal or the electronic device with the secret message or the secret rule information without analyzing the content. This will be described in detail with reference to FIG. 29.

4.4. A Method for Acquiring the Secret Message or the Secret Rule Information of the Terminal of the Content Consumer FIG. 29 is a diagram for describing a method for acquiring the secret message or the secret rule information of the terminal of the content consumer according to an embodiment.

Figure 29:
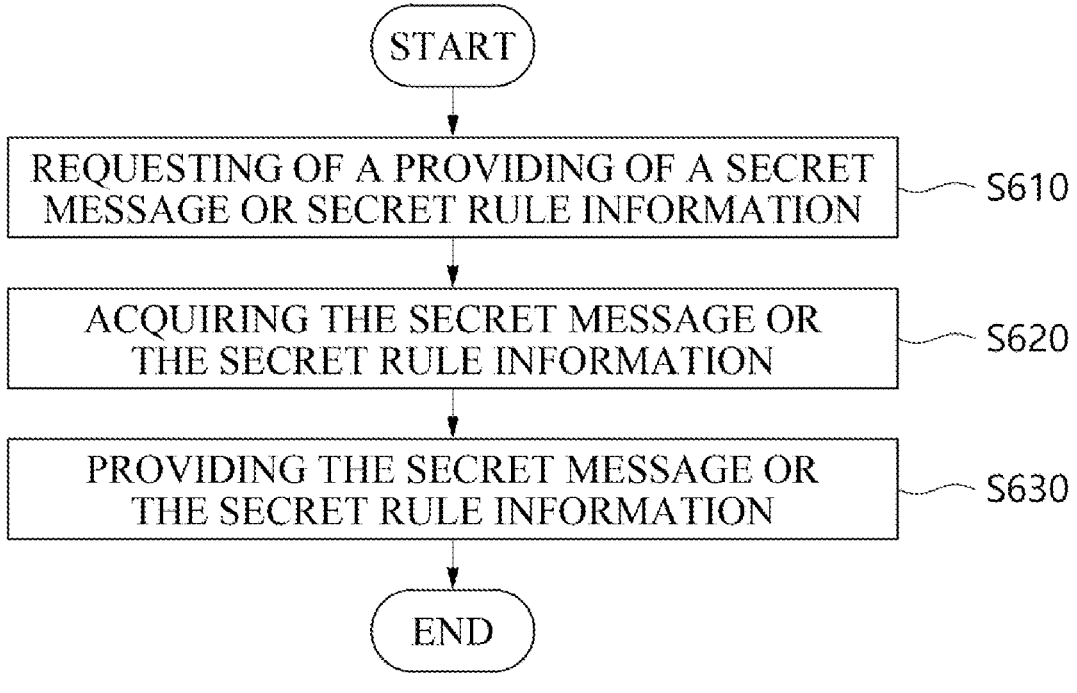
FIG. 29 is a diagram for describing a method of acquiring a secret message or secret rule information in a terminal of a content consumer.

Referring to FIG. 29, the method for acquiring the secret message or the secret rule information of the terminal according to an embodiment may acquire the step S610 of requesting the provision of the secret message or the secret rule information, the step S620 of acquiring the secret message or the secret rule information, and the step S630 of providing the secret message or the secret rule information.

Although the steps S610 to S630 may be performed in the electronic device, for convenience of description, the steps S610 to S630 are performed by the terminal.

In step S610, the terminal may request the social media server or the server of the communication system 1 (see FIG. 1) to provide the secret message or the secret rule information. For example, the terminal may request the social media server to provide the secret message or the secret rule information through an account on the social media server. In addition, the terminal may request the social media server to provide the general message (or general content) through the account, and the request of the secret message or the secret rule information may be included in the request of the general message (or general content).

In addition, in another example, the terminal may request the social media server to provide the general message (or general content) through the account, and the terminal may request the communication system 1 to provide the secret message or the secret rule information.

In addition, in step S620, the terminal may acquire the secret message or the secret signal rule from the social media server or the server of the communication system 1. In an embodiment, as described above, the social media server or the server of the communication system 1 may check whether the terminal or the electronic device can acquire the secret message or the secret rule information, and may provide the secret message or the secret rule information to the terminal or the electronic device based on the check result.

In addition, in step S630, the terminal may provide the secret message or the secret rule information. For example, the terminal may output the secret message or may output the secret message corresponding to the content acquired using the secret rule information. In addition, the terminal may provide the secret message or the secret rule information to the electronic device.

In addition, the terminal may determine whether the terminal can acquire or provide the secret message or the secret rule information by themselves. For example, when the terminal acquires the content of star A through the account of fan b of the social media server, when it is confirmed from the server of the communication system 1 that the entity corresponding to fan b is included in the communication group that can acquire the message from the communication group of star A, it can be determined that the terminal can acquire or provide the secret message or the secret rule information. In addition, when it is confirmed from the server of the communication system 1 that the entity corresponding to the fan b is activated in the server of the communication system 1, the terminal may determine that the terminal may acquire or provide a secret message or secret rule information. In addition, when the terminal confirms that the kit used to activate the entity of the fan b has been detected by the electronic device through communication with the electronic device, it can be determined that the terminal can acquire or provide a secret message or secret rule information.

In an embodiment, the terminal may analyze content based on the secret rule information and provide a secret message based on the analysis result. For example, when the social media server streams real-time video content provided from the terminal of the content provider to the terminal, the terminal may analyze the streamed real-time video content based on the secret rule information. As an example, similar to the example described in FIG. 27, the first secret rule information may be an operation in which star A takes up and down, the first secret message corresponding to the first secret rule information may be a circle image, the second secret rule information may be a voice of star A that is "hate," and the second secret message corresponding to the second secret rule information may be an x image. In this case, the terminal may acquire the operation and voice of star A from the real-time video content. For example, when a star A and another person's motion and voice are mixed in real-time video content, the terminal may distinguish the motion and voice of star A from the motion and voice of another person in real-time video content. In addition, the terminal may acquire first detailed content corresponding to the first secret rule information and second detailed content corresponding to the second secret rule information from the operation of star A. also The terminal may acquire a playback time point of the first detailed content so that the first secret message is played at the time point at which the first detailed content is played by the terminal or the electronic device, and output the first secret message within a predetermined time range including the playback time point of the first detailed content or the playback time point of the first detailed content, or provide the first secret message to the electronic device. In addition, according to an embodiment, the terminal may generate the reproduction time information of the first secret message, output the first secret message according to the reproduction time information of the first secret message, or provide the reproduction time information of the first secret message to the electronic device together with the first secret message. In addition, the same may be applied to the second detailed content and the second secret message. Of course, information on the playback time of the first secret message and the second secret message may be omitted.

In another embodiment, when content is analyzed by a social media server or a server of the communication system 1 and a secret message is obtained based on the content analysis result, the terminal may output the secret message at a predetermined time point or along with the output of predetermined detailed content according to an instruction from the social media server or the server of the communication system 1.

In addition, when the terminal provides a secret message or secret rule information to the electronic device, the terminal may process the secret message or secret rule information and transmit the processed information to the electronic device. For example, when the electronic device does not interpret the secret message or secret rule information, the terminal may process the secret message or secret rule information to be interpreted by the electronic device, and transmit the processed information to the electronic device.

5. A Method for Providing an Emergency Message Using the Electronic Device 5.1. Overview FIG. 30 is a diagram for explaining a communication system to which an emergency message providing method using the electronic device is applied according to an embodiment.

Figure 30:
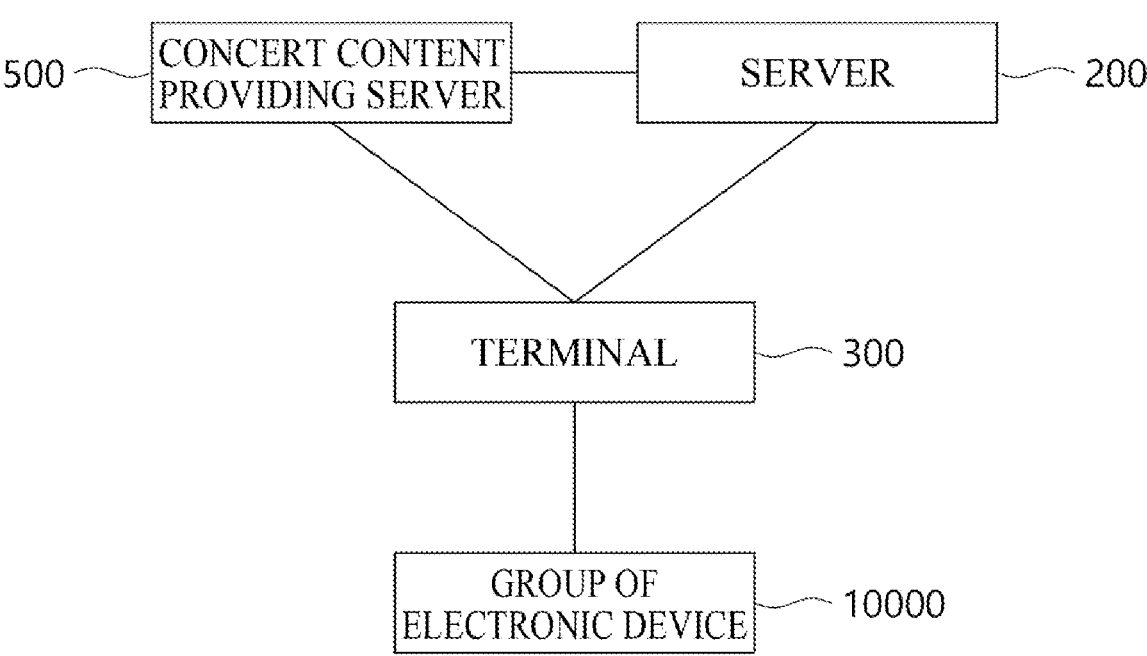
FIG. 30 is a diagram for explaining a communication system to which the method for providing an emergency message using the electronic device is applied, according to an embodiment.

Referring to FIG. 30, the communication system 3 may include the server 200, the electronic device group 10000, and the performance content providing server 500 together with the terminal 300 described above. Such a communication system 3 may be used for communication between stars and fans.

Here, the performance content providing server 500 may refer to a server that provides content (e.g., concert video content of stars, sound source content of stars, music video content of stars) for stars' performance to the terminal 300 or the electronic device group 10000.

In addition, according to an embodiment, the above-described server 200 may perform the role of the performance content providing server 500. That is, the performance content providing server 500 may be included in the server 200 in the communication system 1. Hereinafter, the performance content providing server 500 and the server 200 of the communication system 1 are represented separately, but the present invention is not limited thereto, and the performance content providing server 500 and the server 200 of the communication system 1 may be implemented as a single server, or any one of the performance content providing server 500 and the server 200 of the communication system 1 may be implemented to control any one server.

In general, when the fan views the stars' performance, a device such as an emergency rod may be utilized. For example, the emergency rod may drive or deactivate light using internal lighting or perform an operation of outputting light of various colors. In addition, when the fan carries the emergency rod in the venue in which the stars' performance is performed, the communication device disposed in the venue may provide a control message to the emergency rod to control the operation of the emergency rod to suit the situation of the performance, and accordingly, the operation of the emergency rod may be utilized for the production.

The above-described electronic device may communicate with the terminal 300, the server 200, or various devices, and may include lighting capable of outputting light of various colors therein. Furthermore, since the electronic device includes an output unit capable of outputting various messages such as text, image, drawing, voice, and vibration as well as lighting therein, various messages may be output than the existing emergency rod. In addition, since the emergency rod may communicate with only the communication device installed in the venue, it is difficult to utilize the emergency rod in non-face performances. However, the electronic device may communicate with the terminal 300, the server 200, or the performance content performance server 500 directly or indirectly, and accordingly, the electronic device may acquire an emergency messages from the terminal 300, the server 200, the performance content providing server 500, and accordingly, the electronic device may be utilized for the emergency rod in non-face performance. Moreover, in the electronic device, a kit corresponding to the star is detected, so that the star that the fan supports can be identified by the terminal 300 or the server 200 communicating with the electronic device and the electronic device. Accordingly, since the electronic device can be used for the star's performances that the fan supports, the satisfaction of the fan can be increased when the electronic device is used. In addition, when the electronic device detects a kit corresponding to another star, the electronic device may be used to respond to the performance of the other star. Accordingly, the performance of another star. Unlike the existing technology of replacing an emergency rod to facilitate emergency, if only a kit recognized by an electronic device is replaced without requiring a replacement of the electronic device, the performance of another star can be facilitated, so if the electronic device is used for emergency, the versatility can be higher than if the emergency rod is used for emergency.

Specifically, the terminal 300 may control the electronic device group 10000. Here, the electronic device group 10000 may mean a group including at least one or more of the electronic devices 100. For convenience of explanation, it is assumed that the electronic device group 10000 includes the first electronic device and the second electronic device, the terminal 300 may control the first electronic device and the second electronic device.

In an embodiment, the terminal 300 may directly control the first electronic device and the second electronic device, or may control the second electronic device through the first electronic device. For example, the terminal 300 may provide an adaptation message to each of the first electronic device and the second electronic device. As another example, the first electronic device may be set as a master device, and the second electronic device may be set as a slave device. In this case, the terminal 300 may provide the first electronic device with the first electronic device agency message and the second electronic device agency message, and the first electronic device may provide the second electronic device with the second electronic device agency message.

In another embodiment, the terminal 300 may control the second electronic device through another terminal corresponding to the second electronic device. For example, when the terminal 300 corresponds to the first electronic device and the other terminal corresponds to the second electronic device and communication is performed between the other terminal and the second electronic device, the terminal 300 may transmit an application message to the other terminal and the other terminal may transmit the application message to the second electronic device.

In addition, in an embodiment, when the first electronic device and the second electronic device are used for the performance of star A, a kit corresponding to star A may be recognized in each of the first electronic device and the second electronic device. For example, if star A is a singer group consisting of singer B and singer C, kit B corresponding to singer B may be recognized in the first electronic device, and kit C corresponding to singer C may be recognized in the second electronic device. In this case, the entity corresponding to kit B and the entity corresponding to kit C may be activated in the server 200. In this case, the entity corresponding to kit B and the entity corresponding to kit C may be included in the communication group corresponding to the singer group, and may be included in the communication group corresponding to singer b and the communication group corresponding to singer c, respectively. In addition, one entity corresponding to the terminal 300 may be activated in the server 200. In this case, when a message is acquired in a communication group corresponding to the entity, the terminal 300 may access the entity and transmit the message to each of the first electronic device and the second electronic device.

In addition, a kit A corresponding to star A may be recognized in each of the first electronic device and the second electronic device. In this case, each of the entities corresponding to the first electronic device and the entities corresponding to the second electronic device may be activated in the server 200, or one entity corresponding to the terminal 300 may be activated.

In addition, a kit A corresponding to star A is recognized in each of the first electronic device and the second electronic device, but the first electronic device communicates with the terminal 300, but the second electronic device may communicate with other terminals. In this case, the terminal 300 may be delegated by another terminal with the authority to communicate with the second electronic device. Accordingly, each of the first entity corresponding to the terminal and the second entity corresponding to the other terminal may be activated in the server 200, and the terminal 300 may access not only the first entity but also the second entity to acquire the message.

In addition, a kit A corresponding to star A may be recognized in the first electronic device, and a kit d corresponding to star d may be recognized in the second electronic device. In this case, the first entity corresponding to kit A and the second entity corresponding to kit D may be activated in the server 200. In this case, the communication group to which the first entity belongs and the communication group to which the second entity belongs may be different. The terminal 300 may provide the message obtained through the first entity to the first electronic device, but may not be provided to the second electronic device.

In addition, in an embodiment, when the star of the performance content corresponds to the star corresponding to the kit recognized by the electronic device or when the star of the performance content corresponds to the star corresponding to the entity activated by the terminal 300 or the electronic device in the server 200, the performance content providing server 500 may provide the application message corresponding to the performance content to the terminal 300. To this end, the performance contents providing server 500 may obtain information about a kit recognized by the electronic device from the terminal 300 or obtain information about an entity activated by the terminal 300 or the electronic device or a communication group to which the activated entity belongs from the server 200.

In addition, the terminal 300 may acquire the performance content from the performance content providing server 500. For example, an account corresponding to the terminal 300 may be set in the performance content providing server 500, and the terminal 300 may acquire the performance content through the account. The terminal 300 may reproduce the acquired performance content.

In addition, in an embodiment, the terminal 300 may be in various forms. For example, the terminal 300 is not limited to mobile, and can output performance content such as tv, tablet, set-top box, and home theater, and can include various devices capable of communicating with the electronic device group (10000), the server 200, and the performance content providing server 500.

In addition, the terminal 300 may acquire an adaptation message or from the performance content providing server 500. Here, the support message means a message for controlling the electronic device group (10000) in response to the playback of the performance content, and may include various forms such as lighting output/non-output of a specific color, text, image, video, and voice. In addition, the agency message may be one agency message applicable to both the first electronic device and the second electronic device included in the electronic device group (10000), or may be classified into a first agency message applicable to the first electronic device and a second agency message applicable to the second electronic device.

In addition, the terminal 300 may not acquire an adaptation message from the performance content providing server 500, and may generate an adaptation message by analyzing the performance content.

In addition, the terminal 300 may acquire an emergency message from the server 200. For example, the server 200 may acquire the employee message provided from another terminal other than the terminal 300, and the terminal 300 may acquire the employee message from the server 200 through an accessible entity.

In addition, the emergency message may be configured in various forms. For example, an emergency message may correspond to the entire performance. In this case, the response message may include a plurality of messages. For example, if the entire performance is conducted for one hour, the agency message may be composed of a plurality of detailed agency messages for controlling the electronic device group (10000) for one hour. As another example, if the entire performance section consists of five detailed performance sections and four preparation sections between the five detailed performances, the support message may include nine detailed support messages corresponding to the five detailed performance sections and the four preparation sections.

In addition, a plurality of detailed response messages may include time information. For example, the time information may include a start time of outputting the detailed assistant message, a maintenance time of the detailed assistant message, and an end time of the detailed assistant message.

In an embodiment, the support message may be acquired in advance from the performance content providing server 500 or the terminal 300Before the playback of the performance content from the terminal 300. For example, the performance content providing server 500 or the terminal 300 may generate an adaptation message corresponding to the performance content in advance. In this case, the support message may be generated in various types according to at least one of the number of electronic devices included in the electronic device group (10000) or the location of the arrangement. For example, the first help message may correspond to the case where the number of electronic devices included in the electronic device group (10000) is three and the electronic devices are arranged in a triangle shape, and the second help message may correspond to the case where the number of electronic devices included in the electronic device group (10000) is four and the electronic devices are arranged in a rectangular shape.

Before the playback of the performance contents from the terminal 300, the performance contents providing server 500 or the terminal 300 may acquire information on at least one of the number of electronic devices included in the electronic device group 10000, the identifier of the electronic device, or the arrangement location, and provide the resources corresponding to at least one of the number or location of the electronic devices included in the electronic device group 10000 to the terminal 300.

This is explained together with the example of FIG. 31, which is a diagram for explaining the output of an emergency message in an electronic device according to an embodiment.

Referring to FIG. 31, in 3101 of FIG. 31, the electronic device group (10000, see FIG. 30) includes a total of 28 electronic devices, 7 horizontally and 4 vertically, and the electronic device group (10000) may have a rectangular shape according to the arrangement position of the electronic devices. The performance contents providing server 500 (refer to FIG. 30) or the terminal 300 (refer to FIG. 30) may check the number of electronic devices included in the electronic device group 10000, the identifier of each electronic device, and the arrangement location of each electronic device, and provide the terminal 300 with a first application message corresponding to the first application message, and the terminal 300 may control the electronic device group 10000 using the first application message. For example, the first applying message may include a first detailed applying message configured such that the electronic device group 10000 displays a heart image of a first color at the first time point and a second detailed applying message configured such that the electronic device group 10000 displays a triangle image of a first color at the second time point. As a more specific example, the first detailed support message and the second detailed support message may include an identifier of electronic devices that emit light of a first color, an identifier of electronic devices that emit light of a second color, an emission time of electronic devices that emit light of a first color, and an emission time of electronic devices that emit light of a second color.

For example, the terminal 300 may acquire the first detailed authorization message and the second detailed authorization message from the performance content providing server 500 and provide the first detailed authorization message and the second detailed authorization message to electronic devices included in the electronic device group 10000. In this case, when the electronic devices cannot interpret the first detailed authorization message and the second detailed authorization message, the terminal 300 may process the first detailed authorization message and the second detailed authorization message and provide the processed message to the electronic devices so that they can interpret.

As another example, a detailed response message may be generated by the terminal 300. Specifically, the terminal 300 may acquire an adaptation message from the performance content providing server 500 or by analyzing the performance content. In this case, the application message includes the image to be displayed in the electronic device group 10000 and the reproduction time information of the image, but the information for controlling each of the electronic devices included in the electronic device group 10000 (e.g., the identifier of the electronic device that should perform a specific operation, the specific operation, and the like) may not be included. The terminal 300 may check the number of electronic devices included in the electronic device group (10000), the identifier of each electronic device, and the location of each electronic device, and generate a detailed response message based on this.

As a specific example, the terminal 300 may obtain an adaptation message including information that the t image should be output from the electronic device group 10000 at the third time point by analyzing the performance contents or from the performance contents providing server 500. The terminal 300 may check the number of electronic devices included in the electronic device group (10000), the identifier of each electronic device, and the location of each electronic device, and generate a detailed response message based on this. For example, when the terminal 300 acquires information that 5 electronic devices and 5 electronic devices are included in the electronic device group (10000) and the arrangement location and identifier of each electronic device, as shown in 3103 of FIG. 31, the terminal 300 may generate a third detailed response message including the identifier of the electronic devices that emit light of the first color, the identifier of the electronic devices that emit light of the second color, the emission time of the electronic devices that emit light of the first color (third time point) and the emission time of the electronic devices that emit light of the second color (third time point). The terminal 300 may provide third detailed support messages or processed messages to the electronic devices, and the electronic devices may emit light in the first color or the second color as shown in 3103 of FIG. 31 at the third time point based on the acquired messages.

In addition, as in 3105 of FIG. 31, when the terminal 300 acquires information that three electronic devices are included in the electronic device group (10000) and a total of nine electronic devices in the horizontal and vertical directions, and the arrangement location and identifier of each electronic device, the terminal 300 may generate a fourth detailed response message including the identifier of the electronic devices that emit light of the first color, the identifier of the electronic devices that emit light of the second color, the emission time of the electronic devices that emit light of the first color (fourth time point) and the emission time of the electronic devices that emit light of the second color (fourth time point). The terminal 300 provides the electronic devices with a fourth detailed response message or a processed message, and the electronic devices may emit light in the first color or the second color as shown in 3105 of FIG. 31 at the fourth time point based on the acquired message.

In another embodiment, the support message may be acquired from the performance content providing server 500 or the terminal 300At the same time as the playback of the performance content from the terminal 300 or within a predetermined time interval including the playback time of the performance content. For example, when the performance content is streamed in real time, the performance content providing server 500 or the terminal 300 may analyze the streamed performance content in real time and generate an adaptation message based on the analysis result. In this case, the support message may be generated in various types according to at least one of the number of electronic devices included in the electronic device group (10000) or the location of the arrangement.

5.2. Method of Providing a Response Message Using Electronic Devices.

Figure 32:
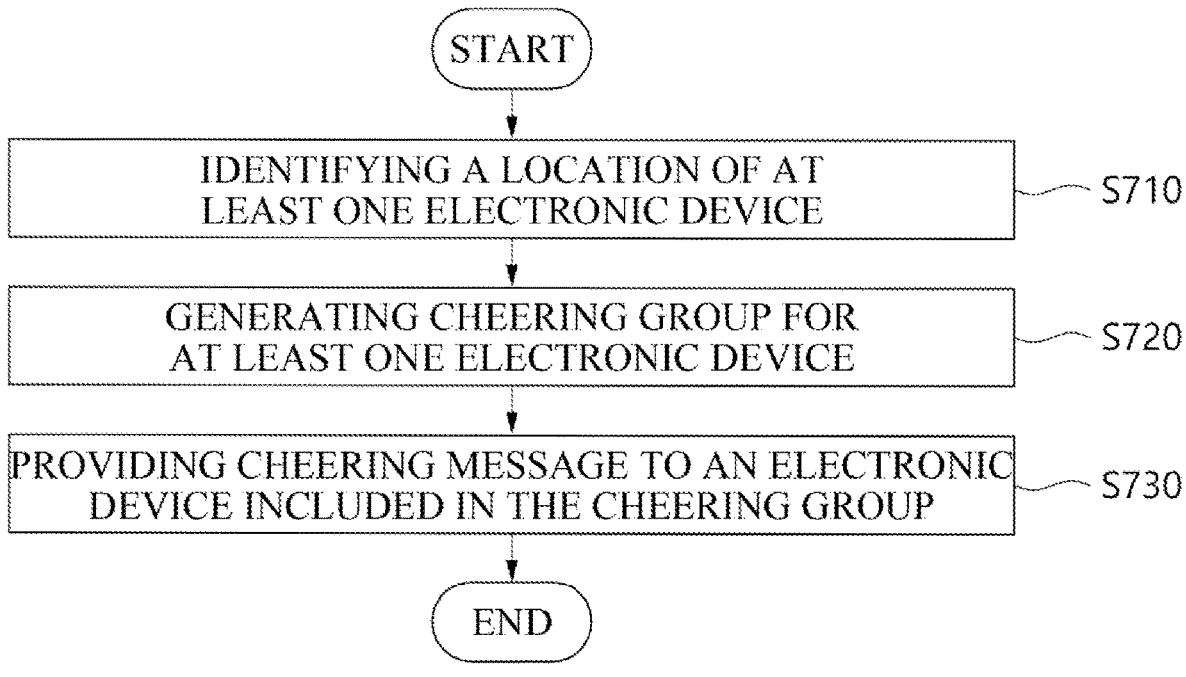
FIG. 32 is a diagram for explaining a method for providing an emergency message using the electronic device, according to an embodiment.

FIG. 32 is a diagram for describing a method of providing an emergency message using an electronic device according to an embodiment.

Referring to FIG. 32, a method of providing an agency message using an electronic device may include checking a position of at least one electronic device (S710), generating an agency group for at least one electronic device (S720), and providing an agency message to the electronic device included in the agency group (S730).

In an embodiment, the steps of FIG. 32 may be performed in a performance content providing server or terminal. For convenience of explanation, the steps of FIG. 32 will be described below based on examples performed in the terminal, but are not limited thereto, and the steps of FIG. 32 may also be performed in the performance content providing server.

At S710, the terminal may identify the location of at least one electronic device. For example, the terminal may identify the location of the at least one electronic device through communication with the at least one electronic device. For example, the terminal may acquire a signal (e.g., advertising data) from at least one electronic device, identify the received signal strength (RSSI) for the corresponding signal, and identify the location of the at least one electronic device based on the RSSI. As another example, the terminal and/or at least one electronic device may include a plurality of antennas (e.g., an antenna array) and transmit and receive signals based on the plurality of antennas. In this case, the terminal may identify the location of at least one electronic device by using the transmission angle (AOD) for the signal transmitted from the terminal or the reception angle (AOA) for the signal received from the terminal. As another example, the terminal and/or at least one electronic device may include a UWB communication module, and the terminal and/or at least one electronic device may transmit and receive a signal in a UWB communication scheme, and the terminal may identify the location of the at least one electronic device by using the transmission time and/or reception time of the signal.

As another example, the terminal may acquire location information from at least one electronic device. For example, at least one electronic device may identify the location of the corresponding electronic device using the GPS signal included in the electronic device. In this case, for example, at least one electronic device may transmit location information of the corresponding electronic device to the terminal.

As another example, the terminal may set the location of at least one electronic device. This will be described in detail in the description of FIGS. 34 and 35.

In addition, the terminal may acquire location information on the electronic device corresponding to the corresponding terminal from another terminal that communicates with at least one electronic device.

In addition, in step S710, the terminal may identify the position of the electronic device when the star of the performance content corresponds to the star corresponding to the kit recognized by the electronic device, or when the star of the performance content corresponds to the star corresponding to the entity activated by the terminal or the electronic device in the server of the communication system 1. For example, when the performance content is related to star A, the kit recognized by the first electronic device is a kit corresponding to star A, and the kit recognized by the second electronic device is a kit corresponding to star B, the terminal may obtain information about the kit recognized by the first electronic device and the second electronic device. When the terminal identifies the kit recognized by the first electronic device and the second electronic device, the terminal may identify the position of the first electronic device but may not identify the position of the second electronic device. This is because, as the kit corresponding to star B rather than star A is recognized by the second electronic device, the second electronic device is not used for the star A's performance content.

In addition, in step S720, the terminal may set an application group for at least one electronic device. Here, the application group may refer to a daily unit obtained by dividing at least one electronic device used for the application for convenience of control.

Figure 33:
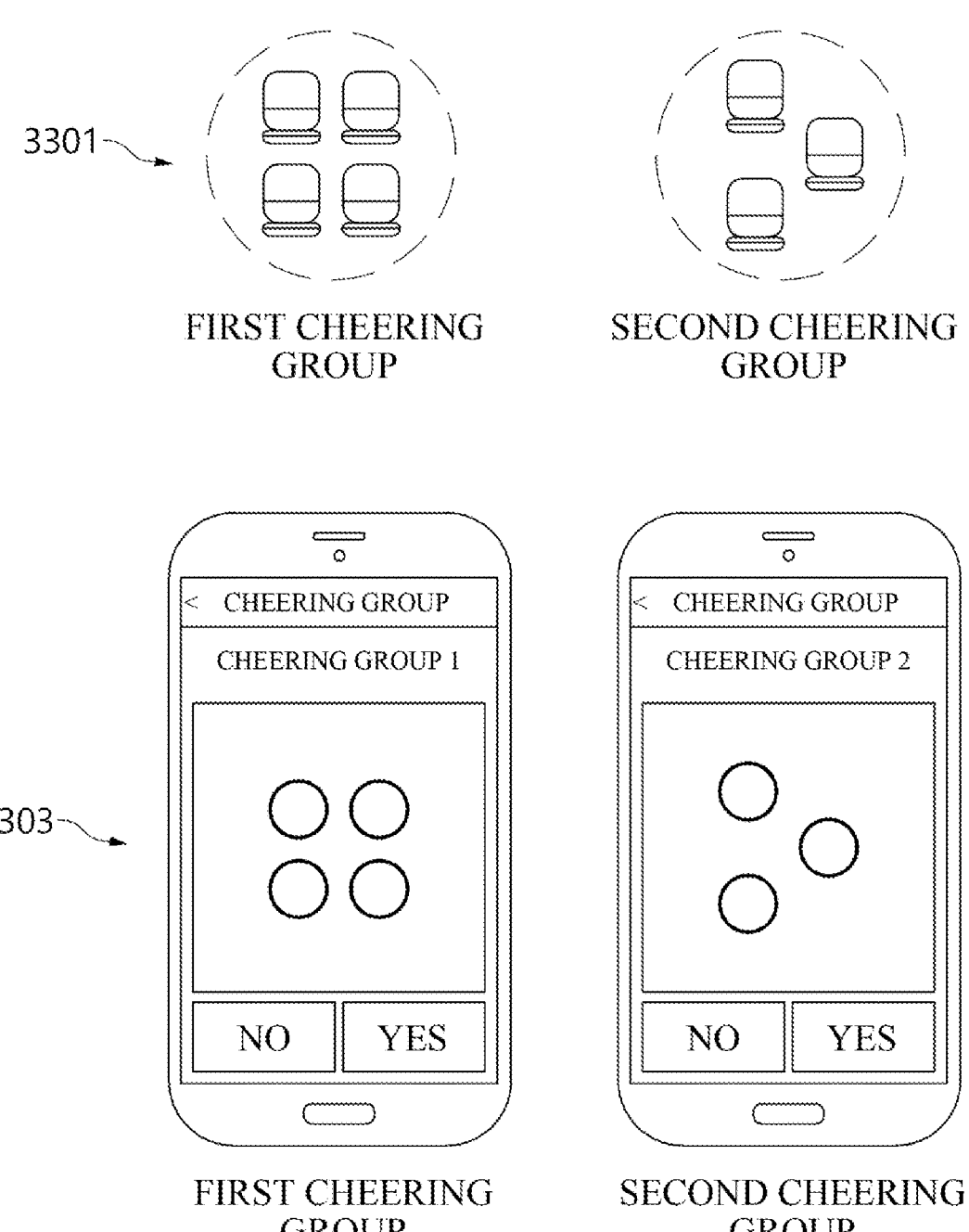
FIG. 33 is a diagram for explaining an emergency group, according to an embodiment.

In an embodiment, the terminal may set the application group based on the position of the at least one electronic device. For example, when the plurality of electronic devices is provided, the terminal may identify the distance between the electronic devices based on the identified position of the electronic devices, and set the terminals having the distance between the electronic devices within a predetermined distance as one group. This is explained together with the example of FIG. 33, and FIG. 33 is a diagram for describing an application group according to an embodiment. Referring to FIG. 33, in 3301 of FIG. 33, the distance between the electronic devices included in the first application group and the distance between the electronic devices included in the second application group may be within a predetermined distance, whereas the distance between the electronic devices included in the first application group and the electronic devices included in the second application group may be equal to or greater than the predetermined distance. Accordingly, the terminal may set the application groups as in (a) based on the distance between the electronic devices.

In addition, in an embodiment, the terminal may provide information about the application group. For example, as in 3303 of FIG. 33, the terminal may provide information about the position of the first application group and the position of the second application group.

Referring again to FIG. 32, in step S720, the terminal may set the application group based on the place where the electronic devices are disposed. For example, when the electronic devices are placed in the hall, the first electronic device and the second electronic devices are placed in the first place (e.g., a first floor seat), and the third electronic device and the fourth electronic device are placed in the second place (e.g., a second floor seat), the terminal may identify the position of the first electronic device to the fourth electronic device. For example, the first electronic device and the second electronic device may obtain information about the first place from the first beacon placed in the first place, and may provide the corresponding information to the terminal. For another example, the third electronic device and the fourth electronic device may obtain information about the second place using the internal GPS sensor included in the third place, and may provide corresponding information to the terminal. The terminal may set the first electronic device and the second electronic device as the first support group and set the third electronic device and the fourth electronic device as the second support group different from the first support group according to the place where the electronic devices are disposed.

In addition, in step S730, the terminal may provide the employee message to the electronic device included in the employee group.

In an embodiment, the terminal may generate the adaptation message or obtain the adaptation message from the performance content providing server. The contents described in FIG. 30 and FIG. 31 may be applied to this.

In an embodiment, the terminal may provide a common application message to the electronic device included in the application group. For example, the common support message may include an identifier of a plurality of electronic devices included in the corresponding support group, operation information that the electronic devices corresponding to each identifier should perform, and time information (start time, maintenance time, and end time) of the corresponding operation.

In another embodiment, the terminal may provide an individual response message to each of the electronic devices included in the response group. For example, the individual agency message is for controlling the electronic device that receives the corresponding message, and may include an identifier of the electronic device that acquires the individual agency message, operation information that the electronic device that acquires the individual agency message should perform, and time information of the corresponding operation.

In addition, the terminal may provide an emergency message to the electronic device included in the emergency group before the performance content is played, and when the performance content is streamed in real time, the emergency message may be provided at a time within a predetermined time range from the time of playing the performance content.

5.3 Positioning of the Electronic Device.

Figure 34:
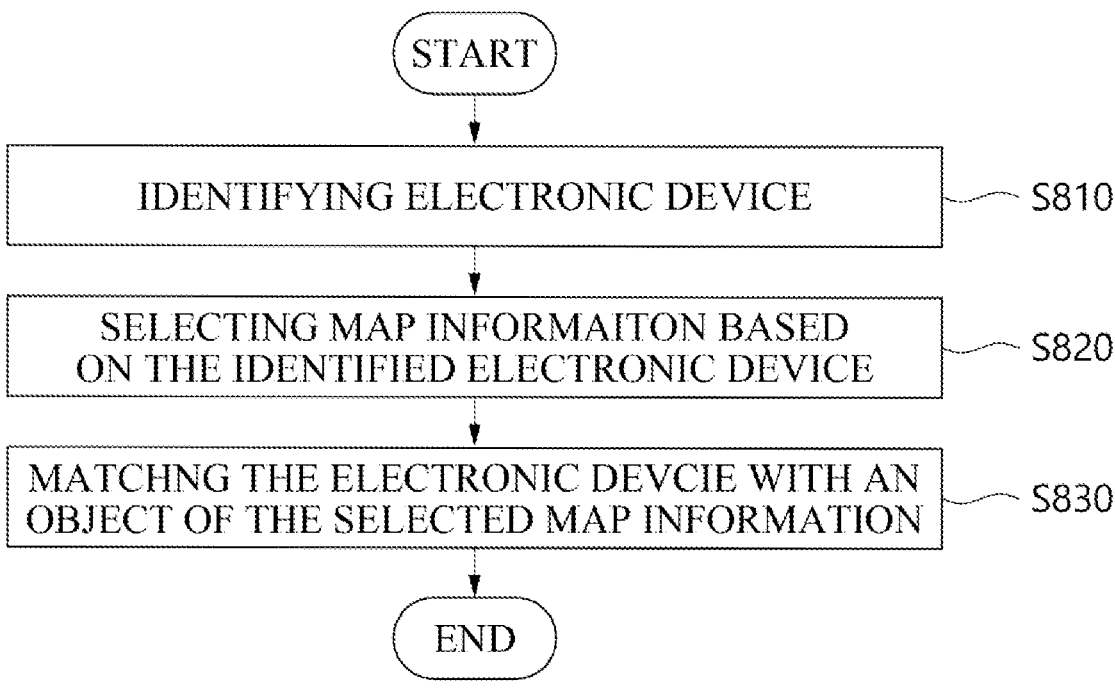
FIG. 34 is a diagram for explaining a method for setting a position of the electronic device, according to an embodiment.

FIG. 34 is a diagram for describing a method of setting a position of an electronic device according to an embodiment.

Referring to FIG. 34, the location setting method of the electronic device may include identifying the electronic device (S810), selecting map information based on the identified electronic device (S820), and matching the object of the selected map information with the electronic device (S830).

In step S810, the terminal may identify an electronic device capable of communicating with the terminal. In addition, the terminal may identify an electronic device that recognizes a kit corresponding to the star of the performance content. In this regard, the matter described in FIG. 31 may be applied, and thus detailed description is omitted.

In addition, in step S820, the terminal may select map information based on the identified electronic device. Here, the map information may refer to the arrangement type of electronic devices in which the identified electronic device is likely to be arranged. The map information may include at least one object, and the map information may provide an arrangement position of the at least one object and an arrangement direction of the at least one object. Here, the arrangement position of the at least one object may mean a position at which the electronic device can be arranged, and the arrangement direction of the at least one object may mean a direction at which the electronic device can be arranged.

Figure 35:
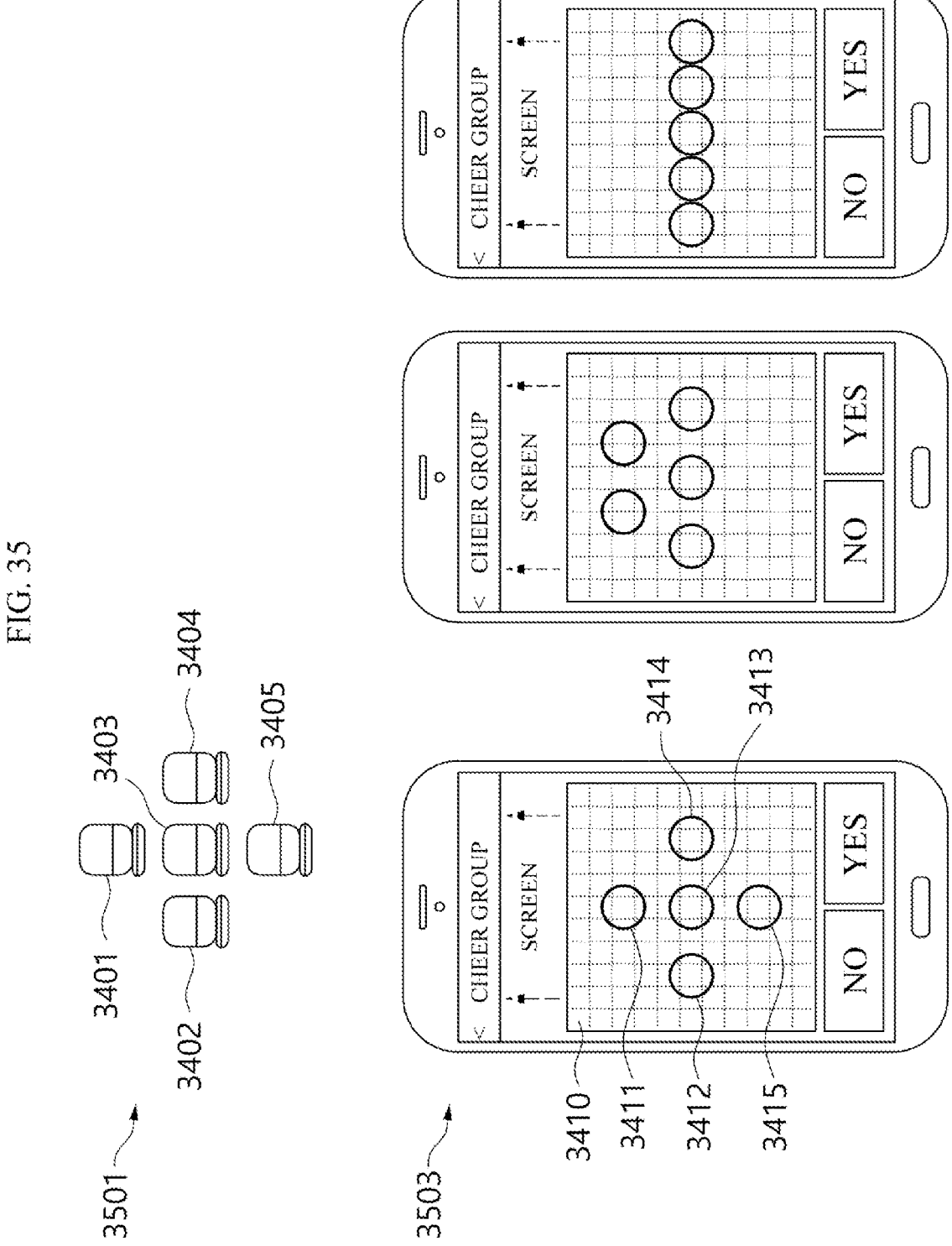
FIG. 35 is a diagram for explaining map information, according to an embodiment.

This is explained together with the example of FIG. 35, which is a diagram for describing map information according to an embodiment. Referring to FIG. 35, the terminal can check the number of identified electronic devices. For example, the electronic device may identify five electronic devices 3401 to 3405 as shown in 3501 of FIG. 35.

In addition, the terminal may provide map information by which five electronic devices can be arranged through an output unit (e.g., a display). For example, the terminal may provide three types of map information having different arrangement forms as in 3503 of FIG. 35. As an example, the terminal may identify the number of five electronic devices and provide map information corresponding to the number of electronic devices and having different arrangement forms.

Each of the three types of map information includes five objects. For example, the first map information 3410 may include five objects 3411-3415. In the first map information 3410, the arrangement positions and arrangement directions of the five objects 3411-3415 may be provided. For example, the arrangement directions of the five objects 3411-3415 may be a direction of viewing the screen. The terminal may receive any one of the three map information from the user.

In addition, in an embodiment, the terminal may identify the number and location of the electronic devices and select the map information corresponding to the identified number and location.

Referring again to FIG. 34, in S830, the terminal may correspond to the object of the selected map information and the electronic device. For example, the terminal may interwork the object of the selected map information and the identifier of the electronic device. As an example, in 3503 of FIG. 35, when the first map information 3410 is selected, the terminal may match the first object 3411 with the identifier of the first electronic device 3401 by a request from the user or the external device. As such, when the objects 3411-3415 of the first map information 3410 and the electronic devices 3401-3405 correspond to each other, the electronic devices 3401-3405 may be set as a group of resources, and the terminal may recognize the arrangement forms of the electronic devices 3401-3405 within the group of resources as the arrangement forms of the first map information 3410.

In addition, in another embodiment, the terminal may identify the location of the electronic devices and correspond to the object of the map information and the electronic devices based on the identified location. For example, when the electronic devices 3401-3405 are arranged as shown in 3501 of FIG. 35, the terminal may identify the arrangement forms of the electronic devices 3401-3405 by identifying the location information of the electronic devices 3401-3405, and select the first map information 3410 similar to the arrangement forms of the electronic devices 3401-3405 as the map information corresponding to the electronic devices 3401-3405. In addition, considering the arrangement forms of the electronic devices 3401-3405, the first object 3411 may be matched with the identifier of the first electronic device 3401 and the second object 3412 may be matched with the identifier of the second electronic device 3402.

The terminal may set the locations of the electronic devices based on the map information and provide the resources message based on the locations of the electronic devices.

5.4. Providing a Variety of Types of Resources Messages

Figure 36:
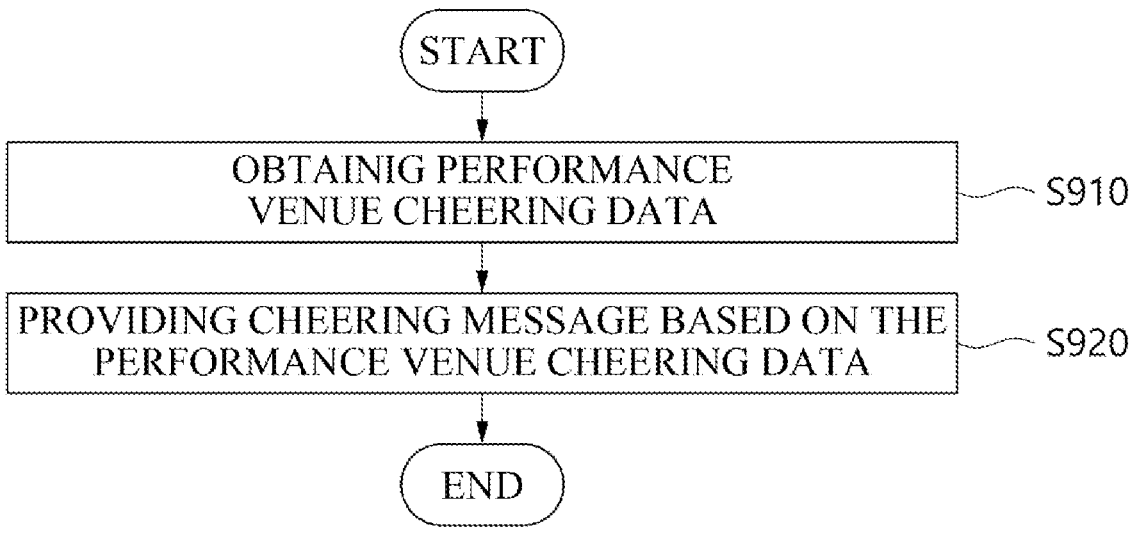
FIG. 36 is a diagram for explaining a method for providing an emergency message based on an emergency in a venue, according to an embodiment.

FIG. 36 is a diagram for describing a method of providing resources messages based on resources in a venue.

Referring to FIG. 36, a method of providing resources messages based on resources in a venue may include obtaining venue resources data (S910) and providing resources messages based on venue resources data (S920).

The steps of FIG. 36 may be performed by a performance content providing server or a terminal. For convenience, the description is given based on the example of the steps of FIG. 36 by the terminal, but is not limited thereto this and the steps of FIG. 36 may be performed by the performance contents providing server.

The terminal may generate an agency message to correspond to the venue agency data. Here, the venue agency data may mean data for controlling the agency device (e.g., agency rod) in the venue.

That is, the terminal may generate the agency message so that agency similar to the agency performed in the venue is performed through the electronic device.

In step S910, the terminal may acquire the venue agency data. The venue agency data may include information for controlling the agency device in the venue. For example, the venue agency data may include information on an operation according to the position in which the agency device is disposed. For example, in the example of FIG. 37, 3701 of FIG. 37 may represent the venue zone. According to the venue agency data, a parking agency may be performed in the agency device disposed in the venue, and accordingly, the agency device disposed in the zone 3501 may be controlled to emit light at a first time point, the agency device disposed in the zone 3502 may be controlled to emit light at a second time point after that, and finally, the agency device disposed in the zone 3503 may be controlled to emit light at a third time point.

In addition, in step S920, the terminal may generate the agency message corresponding to the venue agency data. For example, the terminal may correspond to the arrangement position of the agency device included in the venue agency data and the electronic device in the agency group. For example, in the example of FIG. 37, 3703 of FIG. 37 may represent the electronic devices corresponding to 3701 of FIG. 37. The terminal may correspond to the zone 3501 of the venue and the electronic device 3511 of the agency group, correspond to the zone 3502 and the electronic device 3512 of the agency group, and correspond to the zone 3503 and the electronic device 3513 of the agency group. In addition, the electronic device may generate the agency message corresponding to the control message for controlling the agency device of each zone included in the venue agency data. For example, the terminal may generate the agency message in which the electronic device 3511 corresponding to the zone 3501 is controlled to emit light at the first time point, the electronic device 3512 corresponding to the zone 3502 is controlled to emit light at the second time point, and the electronic device 3513 corresponding to the zone 3503 is controlled to emit light at the third time point so as to correspond to the venue agency data.

The terminal may provide the generated agency message to the electronic devices 3511 to 3513, so that the agency similar to the venue may be performed in the electronic device.

FIG. 38 is a diagram for describing various types of agency messages according to another embodiment.

Referring to FIG. 38, the terminal may determine an agency form that can be rendered in consideration of the number of the electronic devices included in the agency group and/or the arrangement type of the electronic devices, and generate the agency message based on the determined agency form.

For example, if the four electronic devices included in the first agency group are included as 3801 of FIG. 38, and if the 14 electronic devices included in the second agency group are included as 3803 of FIG. 38, may have a less a a agency form that can be rendered. Furthermore, since the number of electronic devices included in the first employment group of 3801 of FIG. 38 is small and the electronic devices are arranged in a line, whereas the number of electronic devices included in the second employment group of 3803 of FIG. 38 is large and the electronic devices are arranged in a left and right unfolded form, the employment form that can be performed in the first employment group may be smaller than the employment form that can be performed in the second employment group. For example, the employment form that can be performed in the first employment group may include a first employment form that alternately flashes lighting of the electronic devices of the first employment group, whereas the employment form that can be performed in the second employment group may include various employment forms, such as the first employment form, a second employment form that expresses a letter using lighting emissions in the electronic devices of the second employment group, and a third employment form that expresses an image using lighting emissions in the electronic devices of the second employment group.

In an embodiment, the terminal may check the number of electronic devices included in the employment group and/or the arrangement form of the electronic devices in real time, and determine the employment form that can be performed based on this. For example, the terminal may analyze the performance content being reproduced, and set the number of electronic devices and/or the arrangement form and the employment form corresponding to the performance content.

In addition, in another embodiment, the terminal may provide the user with at least one employable form corresponding to the number of electronic devices included in the employment group and/or the arrangement form of the electronic devices, and receive the employment form that can be performed by the user.

As such, the terminal may generate an employment message based on the employable form, and provide the generated employment message to the electronic devices of the first employment group and the electronic devices of the second employment group, thereby performing the employment for the performance content in various forms using the electronic devices.

6. Digital Content Providing System

Hereinafter, examples of the system 10 according to various embodiments will be described.

According to various embodiments, the system 10 may be a system implemented to provide various types of digital content to the user's electronic device (or user terminal) in order to escape from the content consumption/provision structure through the conventional standardized physical medium (or thing). For example, the system 10 may be implemented to provide a service that digitally provides content to the consumer consuming the content for the artist instead of the physical goods such as cd and bromide sold by the artist. Hereinafter, the system 10 describes an example of an operation in which content associated with the artist is provided to the user's electronic device 3901, but this is clear to those skilled in the art that various types of digital content may be provided by the user using the system 10 in addition to the example.

6.1 System Configuration

Figure 39:
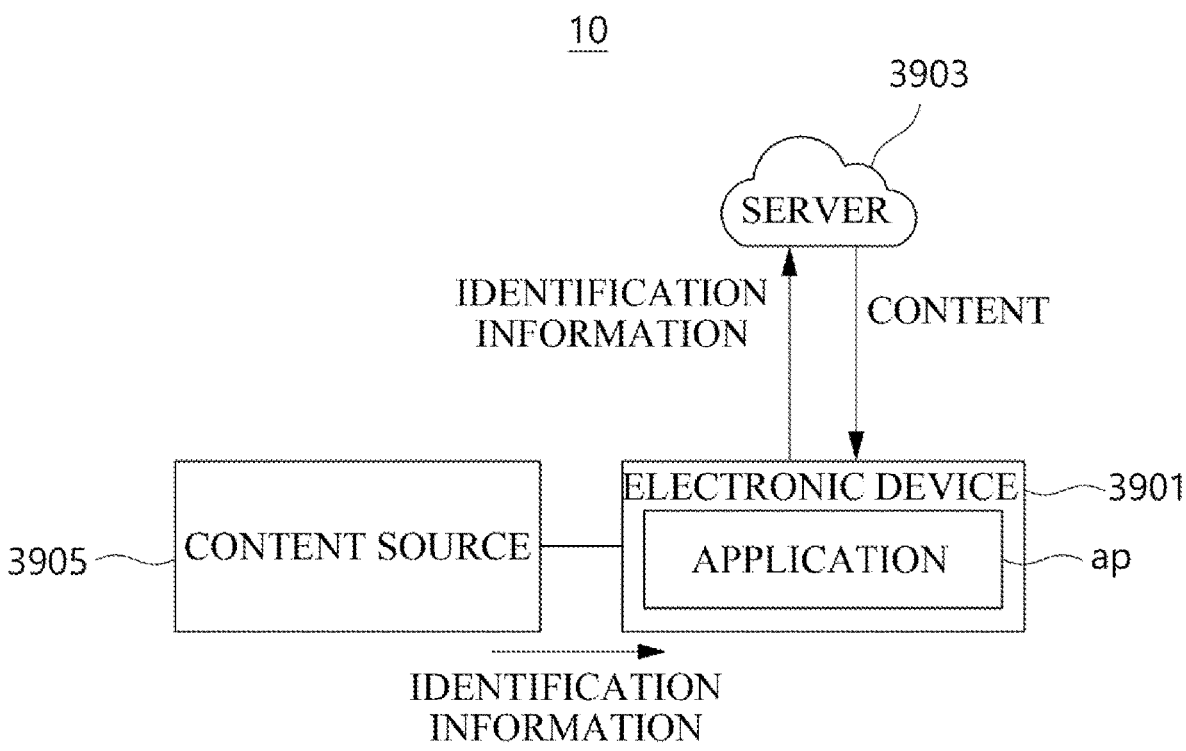
FIG. 39 is a system diagram for providing digital content, according to various embodiments.

FIG. 39 is a system diagram for providing digital content according to various embodiments.

Referring to FIG. 39, the system 10 may include the electronic device 3901, the server 3903, and the content source 3905. However, without being limited to the examples described and/or illustrated, the system 10 may be implemented to include fewer, or more configurations. Unless otherwise noted, the electronic device 3901 may correspond to the aforementioned terminal (e.g., terminal 300A and 300B), the server 3903 may correspond to the aforementioned server 200, and the content providing device 3905 among the content source 105 may correspond to the aforementioned kit 1000a and 1000b.

According to various embodiments, the electronic device 3901 may execute an application according to a user input and receive identification information (e.g., a key value) corresponding to the content source 3905 from the content source 3905. The electronic device 3901 may transmit the received identification information (e.g., key value) to the server 3903, and receive and provide content corresponding to the identification information (e.g., key value). The identification information (e.g., key value) of the content source 3905 is unique, that is, the identification information of the different content sources 3905 may be implemented to be different from each other. The electronic device 3901 may be an electronic device implemented to be usable by a user and include electronic components (or devices) for photographing (e.g., a camera and/or an image sensor). For example, the electronic device 3901 may include a smartphone, a wearable device, a head mounted display (HMD) device, and the like, but is not limited to the described example, and may include various types of electronic devices available by a user. In addition, the electronic device 3901 may be various types of electronic devices including a display that can be provided in a home such as tv and a display.

According to various embodiments, the server 3903 may store various types of content related to artists and provide them to the electronic device 3901. The various types of content include a sound source file, an image (e.g., a video, a photocard, a cover card) associated with an artist, a household, a flip book, a sleeve, and the like, and is not limited to the examples described, and may further include content corresponding to various types of media provided when purchasing a conventional artist album. The server 3903 may store at least one content related to albums, artists, and affiliates in advance. The at least one content may be classified into a content group, and the content and/or the content group may be preset to correspond to specific identification information. Accordingly, the server 3903 may receive identification information (e.g., a key value) from the electronic device 3901 and identify and provide the content corresponding to the received identification information among the contents stored in the server 3903. For example, the identification information (e.g., key value) is identification information about the content source 3905 contacted with the electronic device 3901 and may be combined with a series of characters such as numbers and english, but is not limited to the example. The server 3903 may determine content corresponding to the received identification information and transmit the determined content to the electronic device 3901. For example, the server 3903 may determine an album file (or sound source list) and/or image file corresponding to the content source 3905 and transmit the determined album file and/or image file to the electronic device 3901.

Meanwhile, the server 3903 manages information (e.g., affiliates, group names, artist names, nicknames, and the like) for classifying artists corresponding to each of the identification information (e.g., key values), and may be implemented to store digital content for each classified information, but is not limited to the examples described.

According to various embodiments, the content source 3905 may transmit identification information to the electronic device 3901. For example, when the content source 3905 and the electronic device 3901 are in contact with each other, the content source 3905 may be implemented to transmit the identification information of the content source 3905 to the electronic device 3901 through short-range wireless communication (e.g., near field communication (NFC)).

6.2 Example of Content Source

Figure 40A:
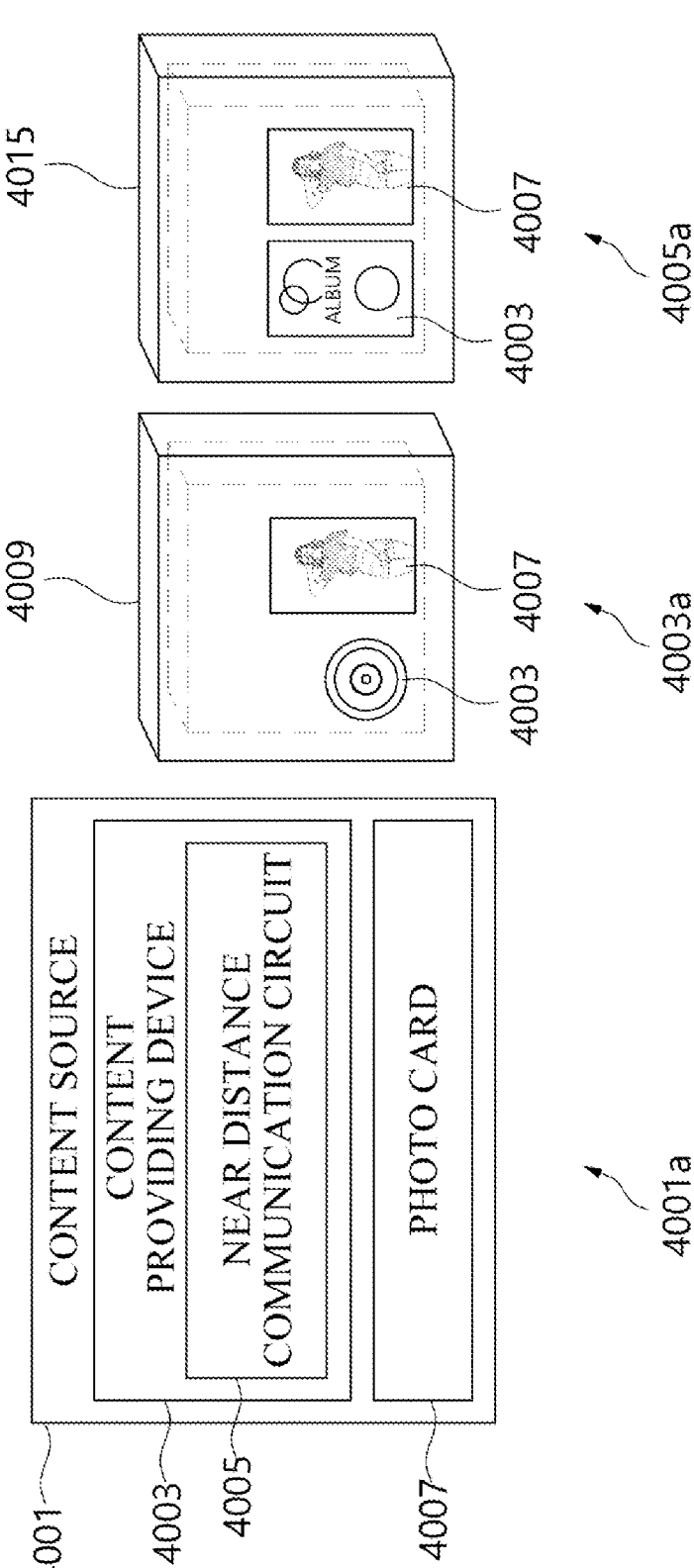
FIGS. 40A and 40B are diagrams illustrating an embodiment of a content source, according to various embodiments.
Figure 40B:
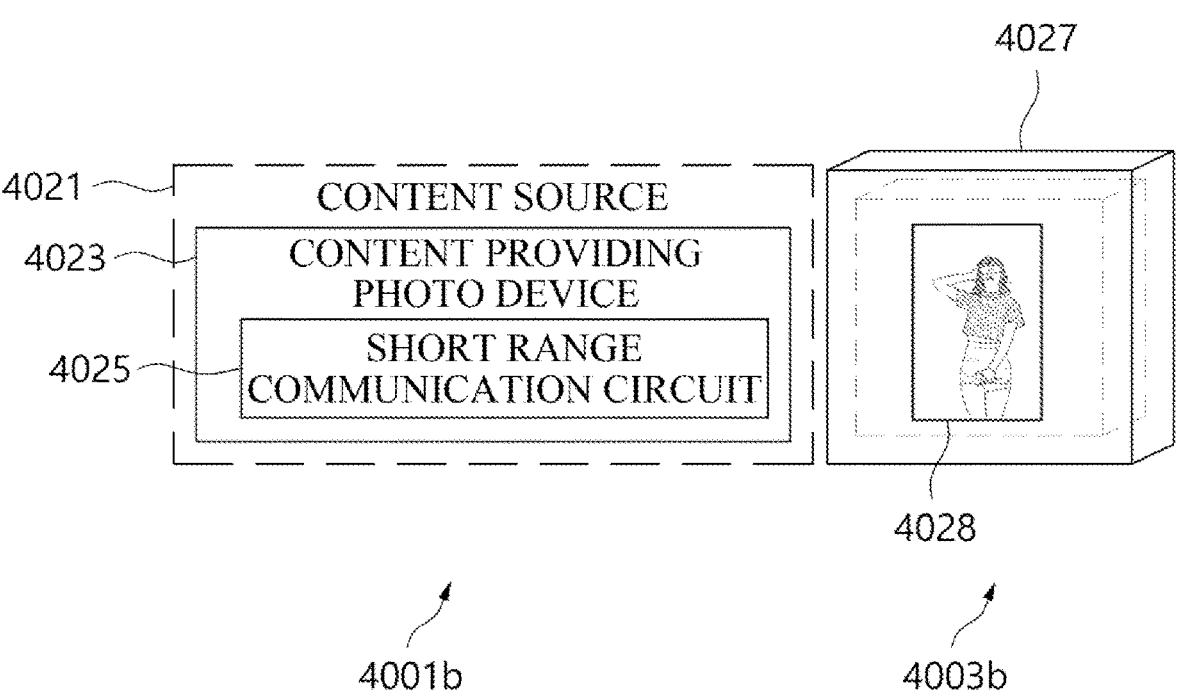

FIGS. 40A and 40B are diagrams illustrating an embodiment of the content source 4001 according to various embodiments.

According to various embodiments, the content source 4001 may be enclosed in one packaging material 4009, 4015, and 4027 to be provided, distributed, displayed, and/or sold. While the inside of the packaging material 4009, 4015, and 4027 may be implemented to include a packaging inner skin, a part, an article, and/or a material that prevents short-range wireless communication between at least a portion of the enclosed content source 4001 and another electronic device 3901, but is not limited to the above-described example. Therefore, even when the content providing device 4003 and the electronic device 3901 are in contact with each other in a state in which the packaging material 4009 is not removed, the identification information may not be transmitted to the electronic device 3901. Hereinafter, each example of the content source 4001 according to various embodiments will be described.

According to various embodiments, at least a portion of the content source 4001, the configuration included in the content source 4001 (e.g., the short-range communication circuit 4005), and/or the packaging material 4009, 4015, and 4027 may be implemented as a biodegradable eco-friendly material. For example, the biodegradable eco-friendly material may include starch, ink based on soybean oil, and the like, but is not limited to the above-described example, and may include various types of biodegradable materials (e.g., biodegradable plastic). For example, the output printed on the content source 4001 and/or the packaging material 4009, 4015, and 4027 may be implemented as a soybean oil-based ink, and the material printed on the output may be implemented as an eco-friendly material such as starch, and the like. Meanwhile, as the content providing device 4003 including the short-range communication circuit 4005 is implemented as an eco-friendly material, the strength of the content providing device 4003 may be weakened, and the short-range communication circuit 4005 may be damaged. Accordingly, according to various embodiments, the content providing device 4003 may be implemented to include a physical design structure and/or an additional member included in the short-range communication circuit 4005 to prevent the damage of the short-range communication circuit 4005, but is not limited to the above-described example.

Referring to 4001*a* of FIG. 40A, the content source 4001 may include the content providing device 4003 and the photocard 4007. According to various embodiments, the content providing device 4003 may include the short-range communication circuit 4005. At this time, although not shown, an image (e.g., an album image, an artist image) associated with the album may be further disposed on the housing. When the content providing device 4003 and the electronic device 3901 are in contact with each other, the short-range communication circuit 4005 may transmit the identification information of the content source 4001 to the electronic device 3901 through short-range wireless communication. According to various embodiments, the photocard 4007 may be implemented in a card form including an artist image associated with the album, but is not limited to include various images associated with the album. In one embodiment, as shown in 4003*a* of FIG. 40A, the content providing device 4003 may have a disk-shaped housing. In this case, the content providing device 4003 may be defined as a photo disc (or photo kit). In another embodiment, as shown in 4005*a* of FIG. 40A, the content providing device 4003 may be implemented in the form of a card. On the other hand, the content providing apparatus 4003 may be implemented in various types of shapes, without being limited to the described and/or illustrated examples.

Referring to 4001*b* of FIG. 40B, the content source 4021 may include a content providing photo device 4023. According to various embodiments, the content providing photo device 4023 may be implemented in the form of the photo card 4007 described above, and may be implemented to include the short-range communication circuit 4025. For example, when the content providing photo device 4023 and the electronic device 3901 are in contact with each other, the short-range communication circuit 4025 may transmit the identification information of the content source 4021 to the electronic device 3901 through short-range wireless communication. In other words, the content providing photo device 4023 may implement the content providing device 4003 and the photo card 4007 of 4001*b* of FIG. 40A as a single article.

6.3 Configuration of Electronic Devices and Servers.

Figure 41:
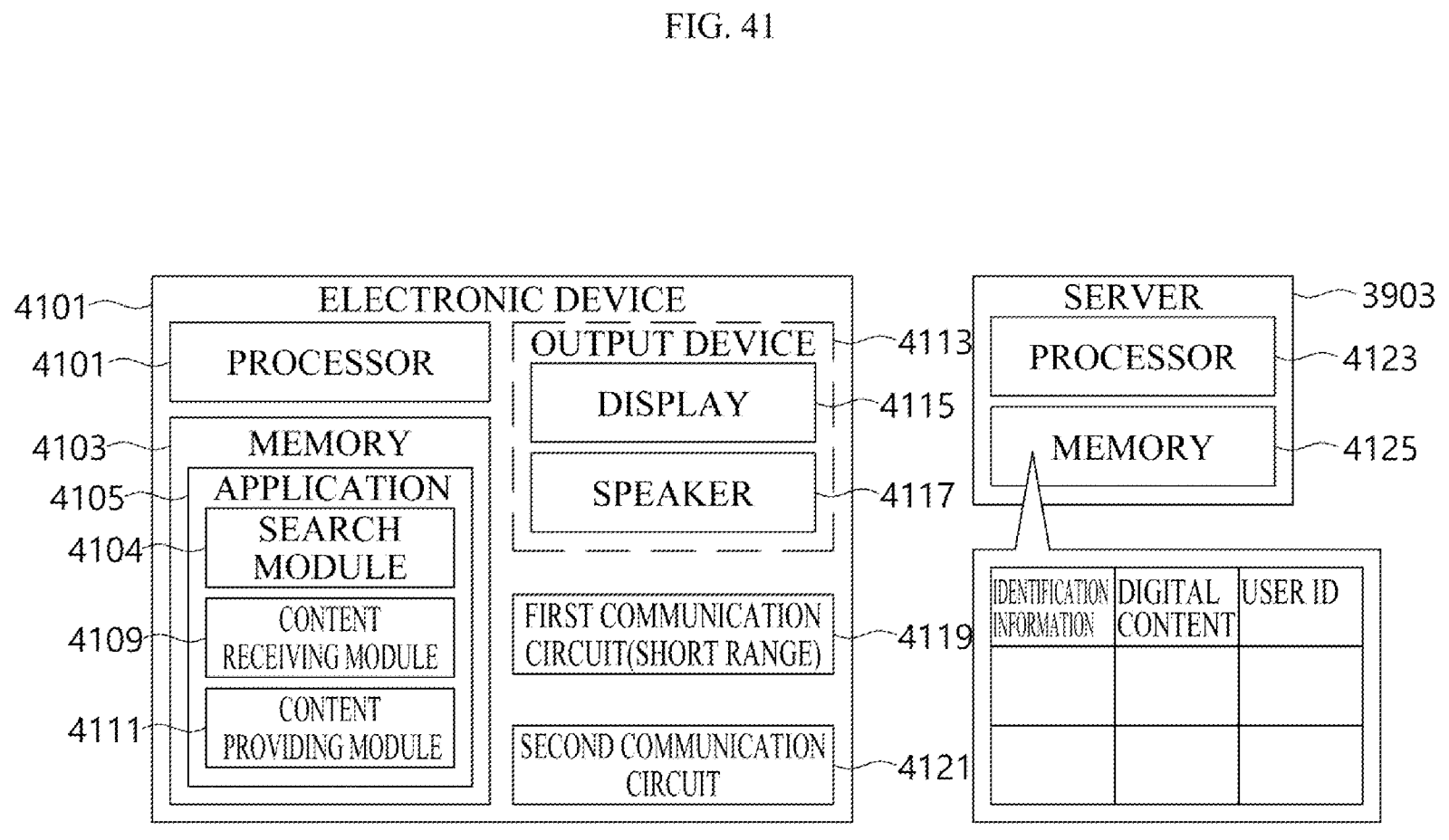

FIG. 41 is a block diagram of an electronic device and a block diagram of a server according to various embodiments.

Referring to FIG. 41, the electronic device 3901 may communicate with a content source through a short-range wireless communication network or with the server 3903 through a long-range wireless communication network. According to an embodiment, the electronic device 3901 may include a processor 4101, a memory 4103, an output device 4113, a first communication circuit 4119, and a second communication circuit 4121, and the application 4105 stored in the memory 4103 may include a search module 4107, a content receiving module 4109, and a content providing module 4111, and the output device 4113 may include a display 4115 and a speaker 4117. In some embodiments, at least one of these components may be omitted, or one or more other components may be added to the electronic device 3901. In some embodiments, some of these components may be implemented as one integrated circuit.

The processor 4101, for example, may execute software to control at least one other component (e.g., hardware or software component) of the electronic device 3901 connected to the processor 4101, and may perform various data processing or calculations. According to an embodiment, as at least a part of data processing or calculation, the processor 4101 may load a command or data received from another component (e.g., the first communication circuit 4119 or the second communication circuit 4121) in a volatile memory, process the command or data stored in the volatile memory, and store the resultant data in a non-volatile memory. According to an embodiment, the processor 4101 may include a main processor (e.g., a central processing unit or an application processor), and an auxiliary processor (e.g., a graphic processing unit, an image signal processor, a sensor hub processor, or a communication processor) that can be operated independently or together. Additionally or alternatively, the auxiliary processor may be set to use lower power than the main processor or to be specific to a specified function. The auxiliary processor may be implemented separately from, or as part of, the main processor.

The memory 4103 may store various data used by at least one component (e.g., the processor 4101) of the electronic device 3901. For example, the memory 4103 may include input data or output data for the application 4105 and commands related thereto. According to an embodiment, the application 4105 may include a search module 4107, a content receiving module 4109, and a content providing module 4111.

The output device 4113 may include a display 4115 and a speaker 4117. According to an embodiment, the display 4115 may visually provide information to the outside (e.g., the user) of the electronic device 3901. The display 4115 may include, for example, a display, a hologram device, or a projector and a control circuit for controlling the corresponding device. According to an embodiment, the display 4115 may include a touch circuit configured to sense a touch, or a sensor circuit (e.g., a pressure sensor) configured to measure the intensity of force generated by the touch. According to an embodiment, the speaker 4117 may output a sound signal to the outside of the electronic device 3901. The speaker 4117 may be used for general purposes, such as multimedia playback or recording playback.

The first communication circuit 4119 may support the establishment of a short-range wireless communication channel between the electronic device 3901 and the external electronic device (e.g., the content source) and the communication performance through the established communication channel. The first communication circuit 4119 may include one or more communication processors that operate independently from the processor 4101 and support wireless communication.

The second communication circuit 4121 may support the establishment of a wireless communication channel between the electronic device 3901 and the external electronic device (e.g., the server) and the communication performance through the established communication channel. The second communication circuit 4121 may include one or more communication processors that operate independently from the processor 4101 and support wireless communication.

Referring to FIG. 41, the server 3903 may include a processor 4123 and a memory 4125. The processor 4123 may control at least one other component (e.g., a hardware or software component) of the server 3903 connected to the processor 4123 by executing software, and may perform various data processing or calculations. The memory 4103 may store, for example, various data used by at least one component (e.g., the processor 4123) of the server 3903. For example, the memory 4103 may store identification information, digital content, and information about a user ID. For example, the identification information (e.g., a key value)

may be information for identifying a content source, and the digital content may be digital music data or an image file corresponding to the content source. In this case, when the server 3903 provides digital content corresponding to the identification information (e.g., a key value), the server 3903 may register the user ID corresponding to the identification information, thereby preventing the registered digital content from being taken off by another deodorizer. In addition, without being limited to the described example, visual content such as text, embosss, engraves, and patterns for preventing the deodorization of the content source 3905 (e.g., the content providing device 4005, and/or the photo-card 4007), may be implemented to provide digital content when the visual content is recognized as the visual content is photographed by the electronic device 3901, thereby preventing the deodorization.

6.4 Exemplary Operation of the Electronic Device and the Server

Figure 43:
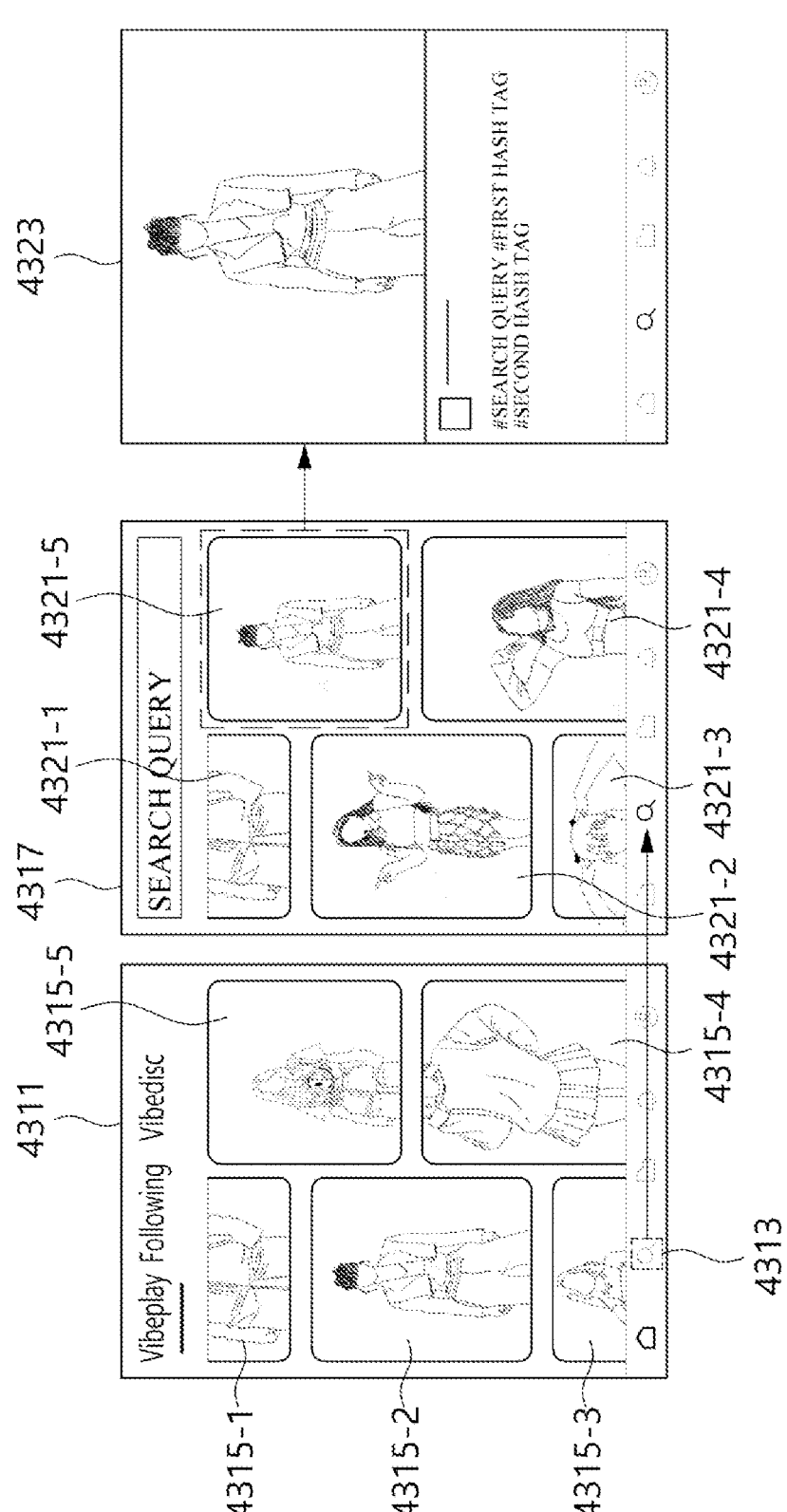
FIG. 43 is a diagram for explaining a function of searching for digital content, according to various embodiments.
Figure 44A:
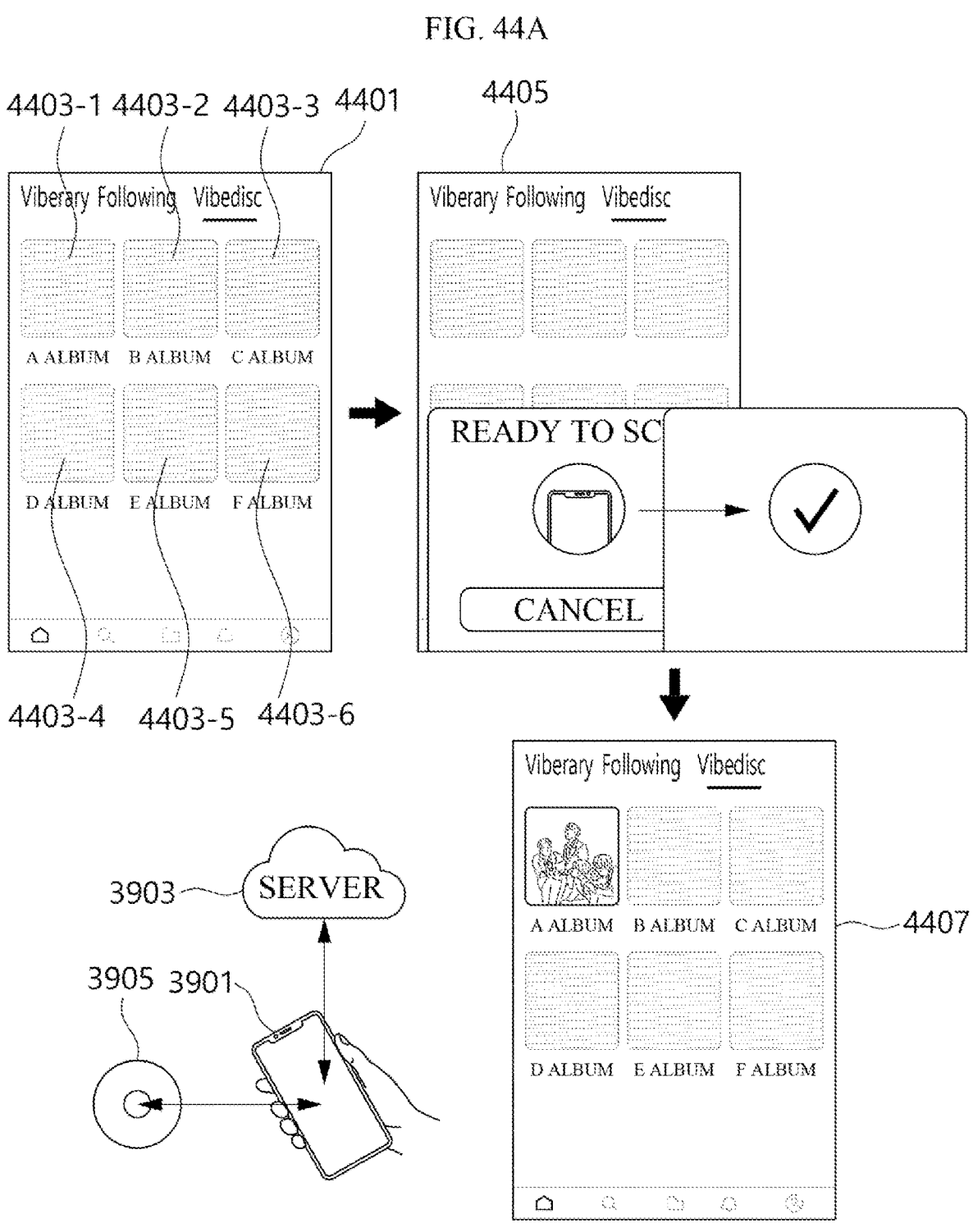
FIGS. 44A and 44B are diagrams for explaining a function of activating at least one object based on short-range wireless communication, according to various embodiments.
Figure 44B:
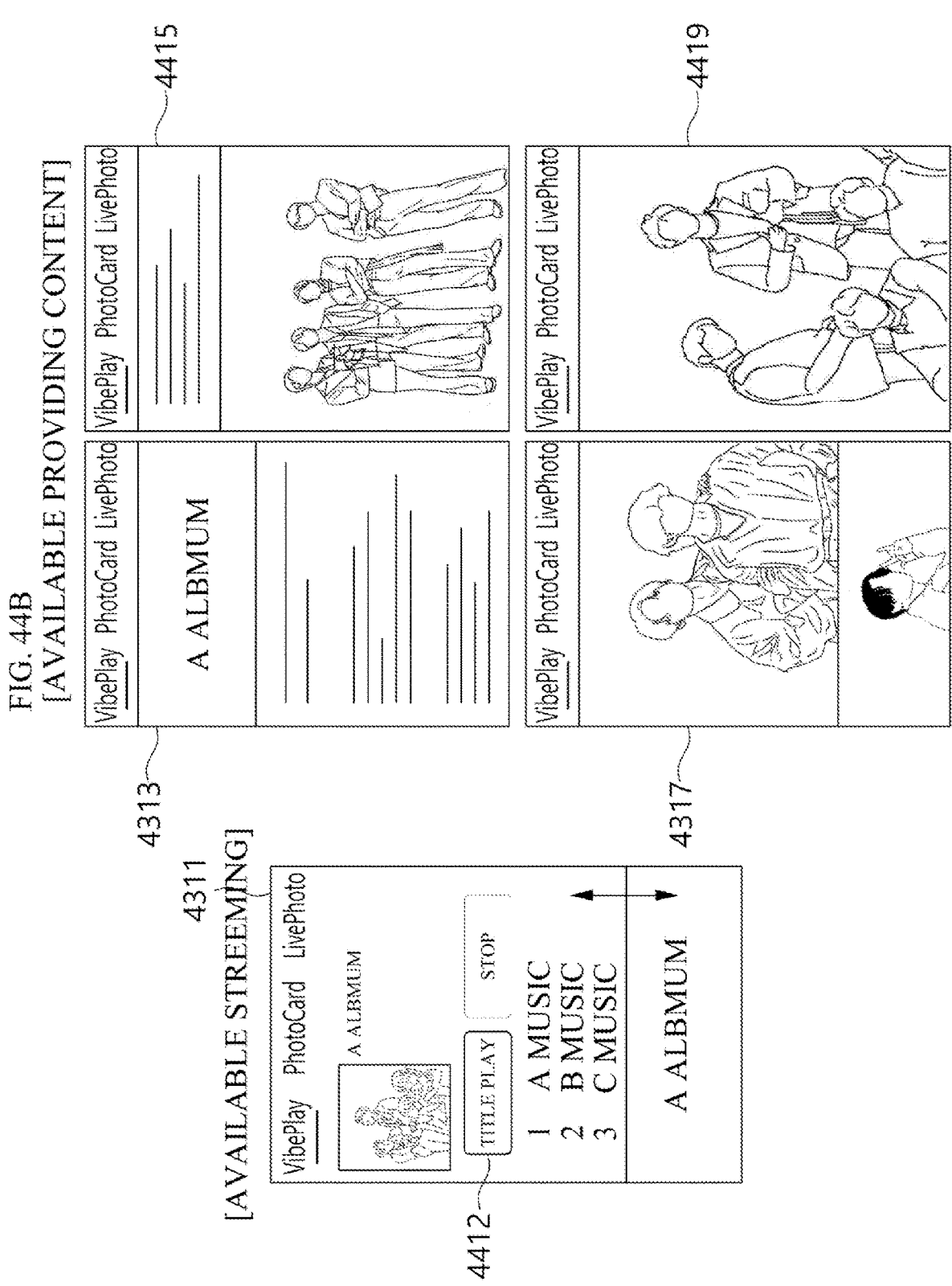

FIG. 42 is a flowchart for describing a method for providing digital content based on short-range wireless communication, according to various embodiments. FIG. 43 is a diagram for describing a function for searching for digital content by an electronic device, according to various embodiments. FIGS. 44A and 44B are diagrams for describing a function for activating at least one object based on short-range wireless communication, according to various embodiments.

Referring to FIG. 42, in operation 4201, the electronic device 3901 may execute an application implemented to provide a function for searching for at least one content. For example, the electronic device 3901 may execute an application implemented to provide a function for searching for at least one content according to a user input. When the application is executed, the electronic device 3901 may display the basic screen 4311 as shown in FIG. 43. For example, the basic screen 4311 may display a plurality of image data 4315-1, 4315-2, 4315-3, and 4315-4. The basic screen 4311 may include a search icon 4313 for content search. The electronic device 3901 may display a search screen 4317 according to a user input of selecting the search icon 4313. For example, the search screen 4317 may be implemented to include a search word input field, and may be implemented to display a plurality of image data 4321-1, 4321-2, 4321-3, 4321-4, and 4321-5 corresponding to a search word (e.g., artist name, group name, and affiliate) input in the search word input field. According to the user input of selecting one of the plurality of image data 4321-1, 4321-2, 4321-3, 4321-4, and 4321-5 corresponding to the search word 4319, the electronic device 3901 may display the image screen 4323 corresponding to the selected image data 4321-5. The image screen 4323 may include an image corresponding to the selected image data 4321-5 and a hash tag (e.g., a search term, a first hash tag, and a second hash tag) for searching for the image. When a search is performed based on the hash tag, image data corresponding to the hash tag may be searched. For example, when the hash tag is input to the search word input field of the search screen 4317 and/or the hash tag of the image screen 4323 is selected, image data corresponding to the hash tag may be searched. Meanwhile, the hash tag may be selected at least two or more and searched, but is not limited to the examples described.

According to various embodiments, in operation 4203, the electronic device 3901 may acquire first identification information related to the short-range communication circuit included in the external device. When the application is executed, the electronic device 3901 may display the first execution screen 4401 as shown in FIG. 44*a*. For example, the first execution screen 4401 may include a plurality of objects 4403-1, 4403-2, 4403-3, 4403-4, 4403-5, 4403-6, and each of the plurality of objects 4403-1, 4403-2, 4403-3, 4403-4, 4403-5, 4403-6 may correspond to different digital contents (e.g., contents of a specific album issued by a specific artist and/or a specific artist group) (or a content group). The plurality of objects 4403-1, 4403-2, 4403-3, 4403-4, 4403-5, and 4403-6 included in the first execution screen 4401 may be provided in a deactivated state initially (e.g., before contact with the content providing device 4003). On the other hand, it is not limited to the examples described and/or illustrated, and an activated object may also be provided.

According to various embodiments, when receiving a user input for a specific object (e.g., album object 4403-1), the electronic device 3901 may display a screen 4405 that induces (or guides) contact between the electronic device 3901 and the content providing device 4003. The electronic device 3901 may control the short-range communication circuit 4119 to be in a signal reception standby state while displaying the screen 4405. In this case, contact between the electronic device 3901 and the content providing device 4003 may mean that the physical distance between the electronic device 3901 and the content providing device 4003 is less than or equal to a specific distance. When the content providing device 4003 and the electronic device 3901 are contacted, the electronic device 3901 may obtain first identification information associated with the content providing device 4003 from the content providing device 4003 through short-range wireless communication. For example, the first identification information may include unique information and content identification information of the content providing device 4003. Using the unique information of the content providing device 4003, one content providing device 4003 may be prevented from being reused by another user.

According to various embodiments, in operation 4205, the electronic device 3901 may transmit the first identification information and second identification information associated with the electronic device 3901 to the server 3903 and receive information corresponding to the identification information from the server 3903. For example, the first identification information may be unique information and content identification information of the content providing device 4003 received from the content providing device 4003, and the second identification information may be unique information of the electronic device 3901 and/or account information of the user (e.g., account information registered through the application). The server 3903 may identify information on specific digital content (or specific content group) corresponding to the first identification information among a plurality of contents stored in the server 3903 and transmit information on specific digital content (or specific content group) to the electronic device 3901. The information on the specific content may include at least one of specific content or information for activating an object corresponding to the specific content (e.g., identification information indicating the specific content).

According to various embodiments, in operation 4207, the electronic device 3901 may control the state of the first object corresponding to the identification information among a plurality of objects provided in the first execution screen of the application to the activated state and control the state of the remaining second object to the inactivated state based on the received information. For example, when the object corresponding to the first identification information is the first object 4403-1, the electronic device 3901 may control the state of the first object 4403-1 to the activated state and control the state of the objects 4403-2, 4403-3, 4403-4, 4403-5, and 4403-6 except the first object to the inactivated state, as shown in the screen 4407 of FIG. 44A. The objects 4403-2, 4403-3, 4403-4, 4403-5, and 4403-6 controlled in the other inactivated state may be maintained to provide a function of controlling the short-range communication circuit 4119 to the signal reception standby state together with the guide screen described above, but the object 4403-1 controlled in the activated state may be updated to provide the digital content and/or the functions below when the user input is received. While confirming the activated album state, the user may experience collecting an album associated with a specific artist.

According to various embodiments, in operation 4209, the electronic device 3901 may provide at least one content associated with the first object and/or perform at least one function associated with the first object. For example, the electronic device 3901 may display an execution screen of the first object according to the user input of the activated state. For example, as shown in FIG. 44b, the execution screen of the first object may include a first screen 4411, a second screen 4413, a third screen 4415, a fourth screen 4417, and a fifth screen 4419. The first screen 4411, the second screen 4413, the third screen 4415, the fourth screen 4417, and the fifth screen 4419 sequentially represent screens that scroll up the execution screen of the first object. The execution screen of the first object may include an icon for downloading or streaming digital music data associated with the first object in real time. Therefore, the electronic device 3901 may download or stream digital music data associated with the first object in real time according to a user input. In addition, the execution screen of the first object may include screens 4413, 4415, 4417, and 4419 that show content (e.g., album introduction, information, and album jacket pictures) associated with the first object.

Figure 45B:
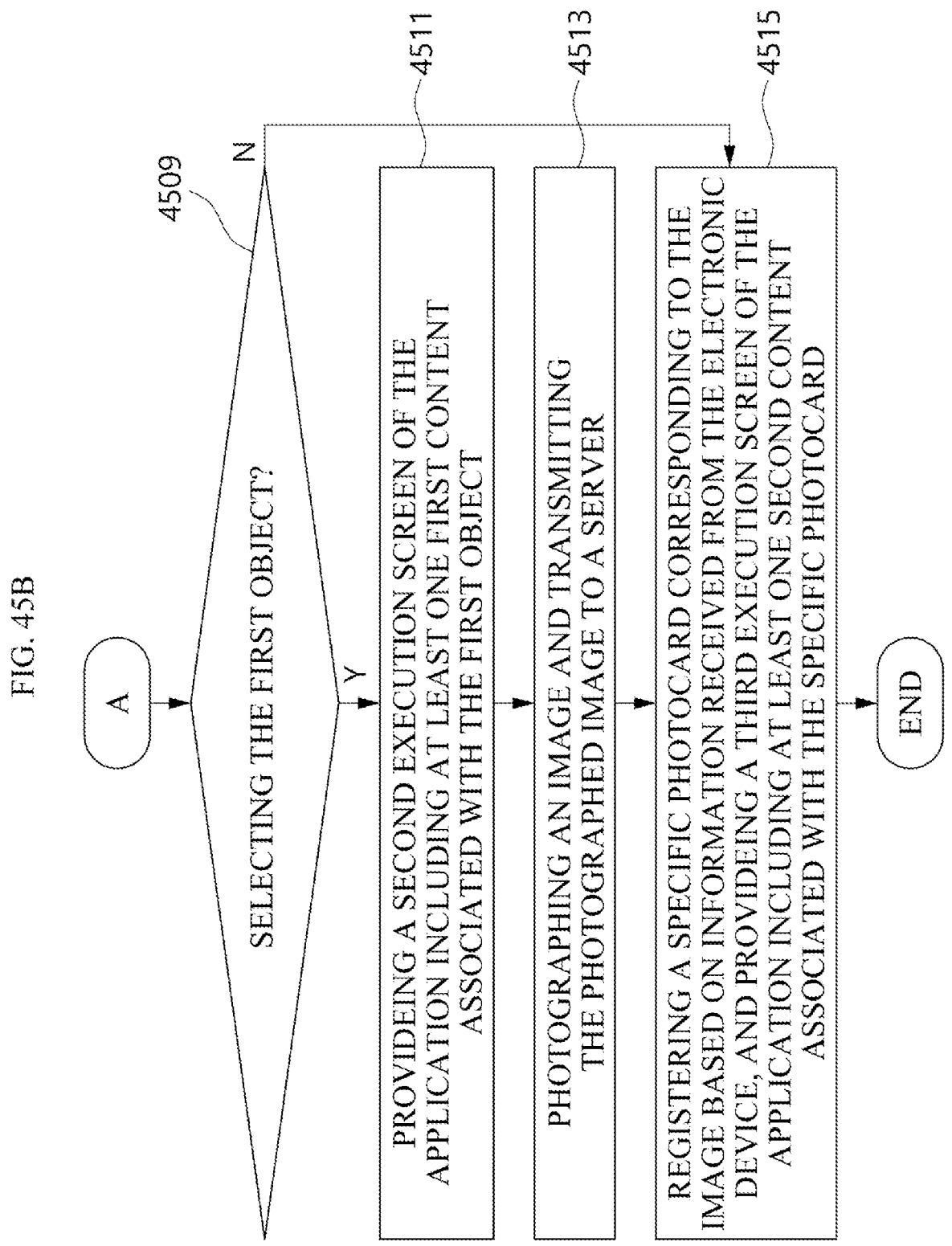
Figure 46A:
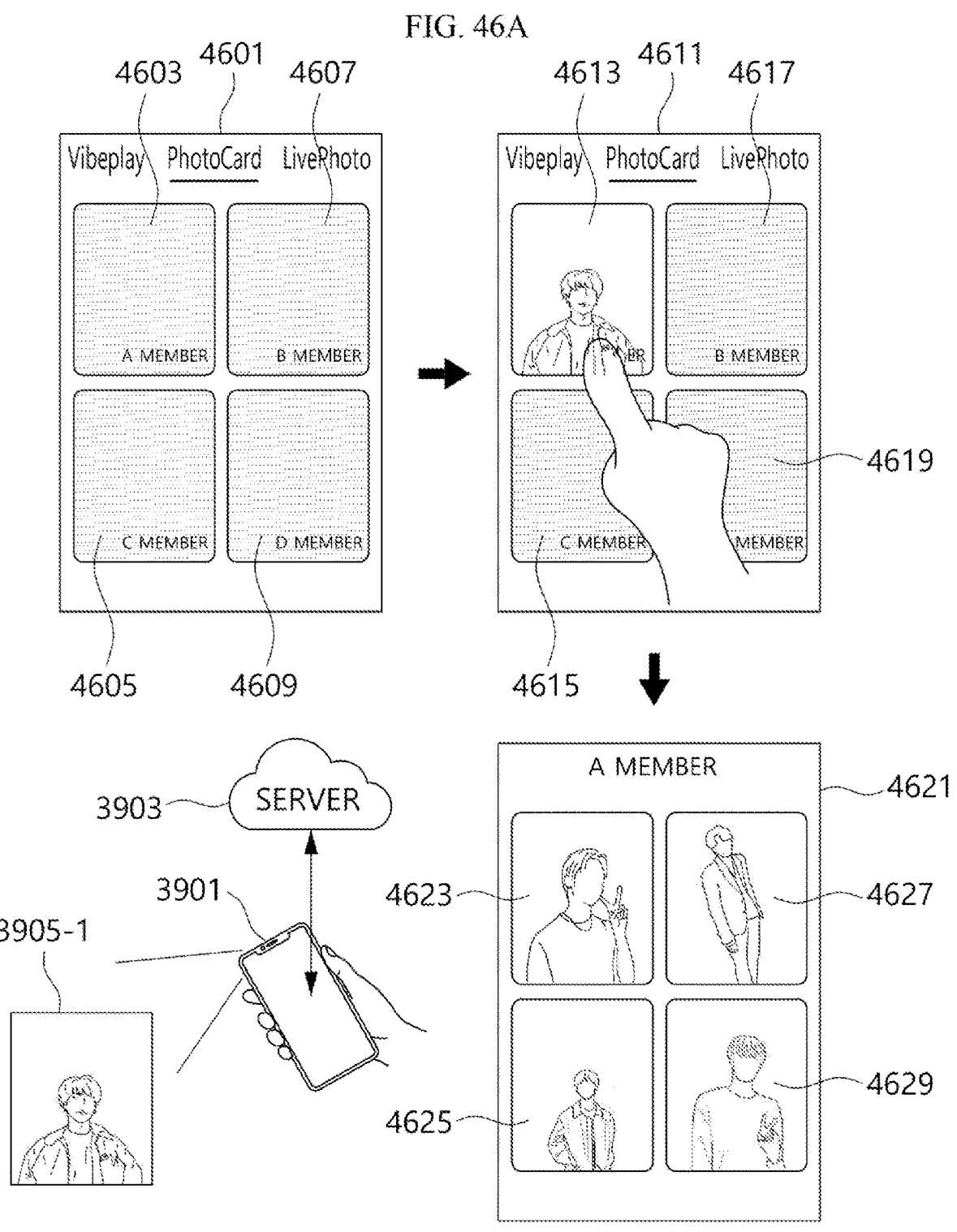
FIGS. 46A and 46B are diagrams for explaining a function of providing digital content based on user input, according to various embodiments.
Figure 46B:
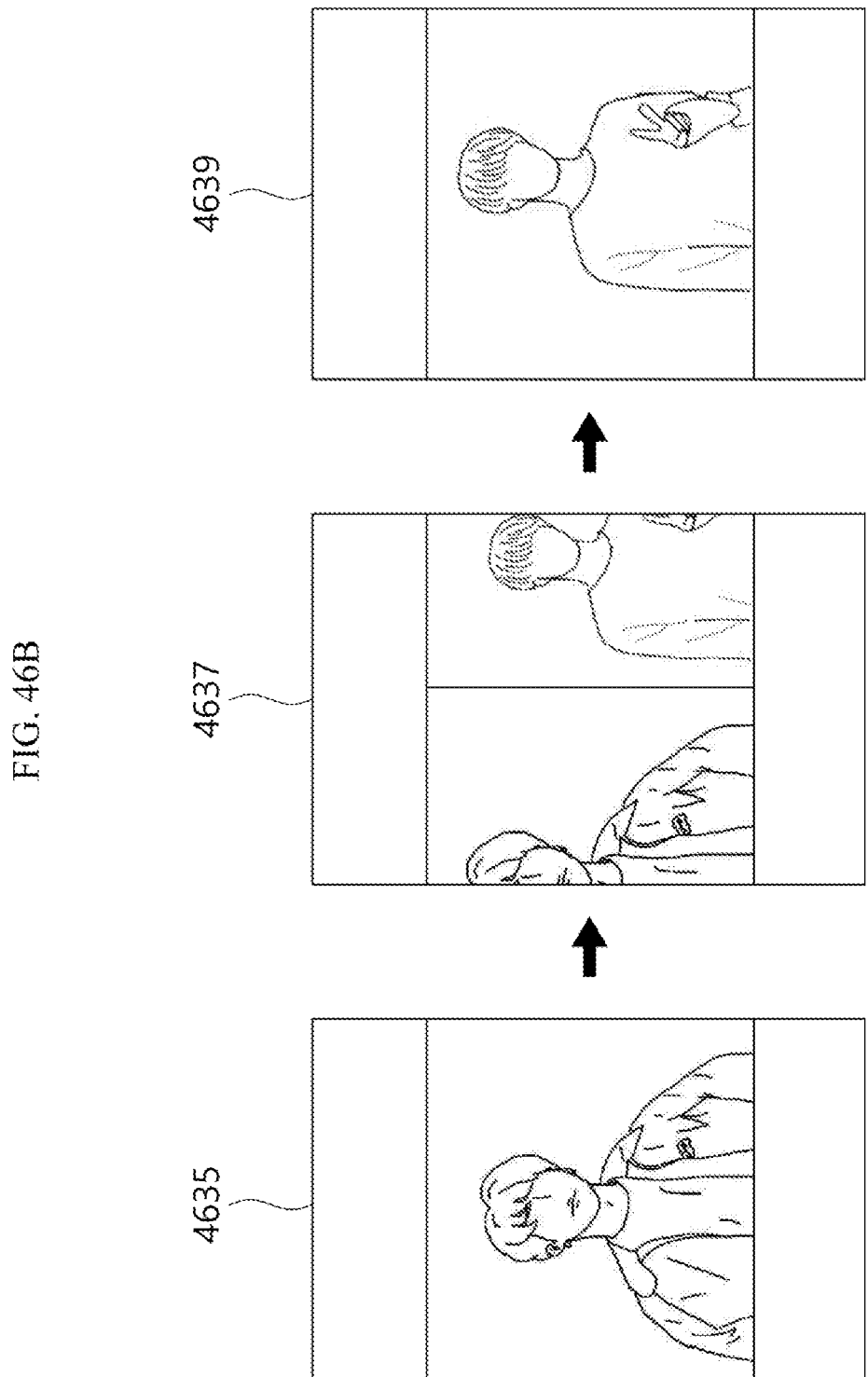

FIGS. 45A and 45B are flowcharts illustrating a method of providing digital content based on short-range wireless communication by an electronic device according to various embodiments. FIGS. 46A and 46B are diagrams illustrating a function of providing digital content based on a user input by an electronic device according to various embodiments.

Referring to FIGS. 45A to 45A, in operation 4501, the electronic device 3901 may execute an application implemented to provide a function for searching for at least one content. For example, the electronic device 3901 may execute an application implemented to provide a function for searching for at least one content according to a user input.

According to various embodiments, in operation 4503, the electronic device 3901 may acquire first identification information associated with a short-range communication circuit included in an external device. When the content source contacts the electronic device 3901, the electronic device 3901 may acquire first identification information associated with the content source from the content source through short-range wireless communication. For example, the first identification information may include unique information of the content providing device 4003 and content identification information. In this case, the contact between the electronic device 3901 and the content source may mean that the physical distance between the electronic device 3901 and the content source is less than or equal to a specific distance.

According to various embodiments, in operation 4505, the electronic device 3901 may transmit the first identifica-tion information and second identification information associated with the electronic device 3901 to the server and receive information corresponding to the identification information from the server. For example, the first identification information may be unique information of the content source received from the content source and content identification information, and the second identification information may be unique information of the electronic device 3901.

According to various embodiments, in operation 4507, the electronic device 3901 may control the state of the first object corresponding to the identification information among the plurality of objects provided in the first execution screen of the application to the activated state and control the state of the remaining second object to the inactivated state based on the received information. For example, the plurality of objects provided in the first execution screen may be objects corresponding to each of the plurality of albums of a specific singer. The content identification information may be information corresponding to one of the plurality of albums of the specific s of the specific s of the sugar. Therefore, one of the plur of the specific sugar may be activated according to the content source contacted with the electronic device 3901.

According to 4509, the electronic device 3901 may receive a user input for selecting the first object. For example, after the first object corresponding to the content source is activated, the electronic device 3901 may receive a user input.

According to various embodiments, when a user input for selecting a first object is received (4509—YES), in operation 4511, the electronic device 3901 may provide a second execution screen of the application including at least one first content associated with the first object. As shown in FIG. 46A, the second execution screen 4601 may include a plurality of menus. The plurality of menus may include a menu (first menu) implemented to provide a streaming function of a sound source file and/or provide content associated with the activated album, a menu (second menu) for registering and managing a photocard of at least one artist issued with the album, and a menu (third menu) for providing content associated with the album that is updated in the server 3903. When the above-described second menu is selected, the electronic device 3901 may include a plurality of objects 4603, 4605, 4607, and 4609 corresponding to a photocard of at least one artist corresponding to the activated album, but the number of objects may be variously implemented without being limited to the examples described. Here, the state in which the object is closed may mean a state in which digital content corresponding to the corresponding object is not provided, and the state in which the object is open may mean providing digital content corresponding to the object according to a user input for selecting the corresponding object.

According to various embodiments, in operation 4513, the electronic device 3901 may photograph an image and transmit the photographed image to a server. As shown in FIG. 46a, the electronic device 3901 may photograph the photocard 4007 and transmit the photographed image to the server 3903. In this case, the electronic device 3901 may activate the camera while providing a photographing screen for photographing the photocard 4007 in response to the selection of the object 4603 corresponding to the photocard corresponding to the specific singer (e.g., a member), but the electronic device 3901 is not limited to the examples described.

According to various embodiments, in operation 4515, the electronic device 3901 may register a specific photocard corresponding to the image based on information received from the server 3903, and provide a third execution screen of the application including at least one second content associated with the specific photocard. The server 3903 may identify the a member based on the analysis of the image, and provide information for activating the object 4603 corresponding to the photocard of the identified a member to the electronic device 3901. In an embodiment, the server 3903 may identify the a member based on the comparison of a face and a face for each of a plurality of artists stored in the server 3903. In another embodiment, the server 3903 may identify the a member based on the comparison of a feature point of the image and a feature point of the image for each of a plurality of artists stored in the server 3903. In another embodiment, the server 3903 may identify the a member based on the text identified from the image. The text may be implemented as visible text, but may be implemented on the photocard 4007 so that is not visible in the visible area. The electronic device 3901 may register a specific photocard based on information received from the server 3903. Here, the registration of the photocard may meant control the object corresponding to the photocard to be open. For example, among the plurality of objects 4613, 4615, 4617, and 4619 included in the execution screen 4611 of the electronic device 3901, the object 4613 corresponding to the photo card of a specific artist (e.g., a member) may be controlled to be opened. In addition, the electronic device 3901 may provide an execution screen 4621 including a plurality of contents 4623, 4625, 4627, and 4629 associated with a photocard corresponding to the object 4613 according to a user input for selecting the object 4613. The plurality of contents 4623, 4625, 4627, and 4629 are not physically distributed contents and can be unique digital contents that can be provided only through the system 10. The electronic device 3901 may provide additional functions for providing content according to a user input for selecting content related to the registered photo card. For example, according to a user input of selecting a specific content from among a plurality of contents 4623, 4625, 4627, and 4629 associated with Mark, the expanded screen 4635 by expanding the selected specific content may be provided. In addition, when a swipe input is received on the enlarged screen 4635, the electronic device 3901 may provide a function of passing to the next order content 4633 of the selected specific content 4631 like the screen 4637. In addition, when a zoom-in input is received, the electronic device 3901 may provide enlarged content such as the screen 4639.

Figure 48:
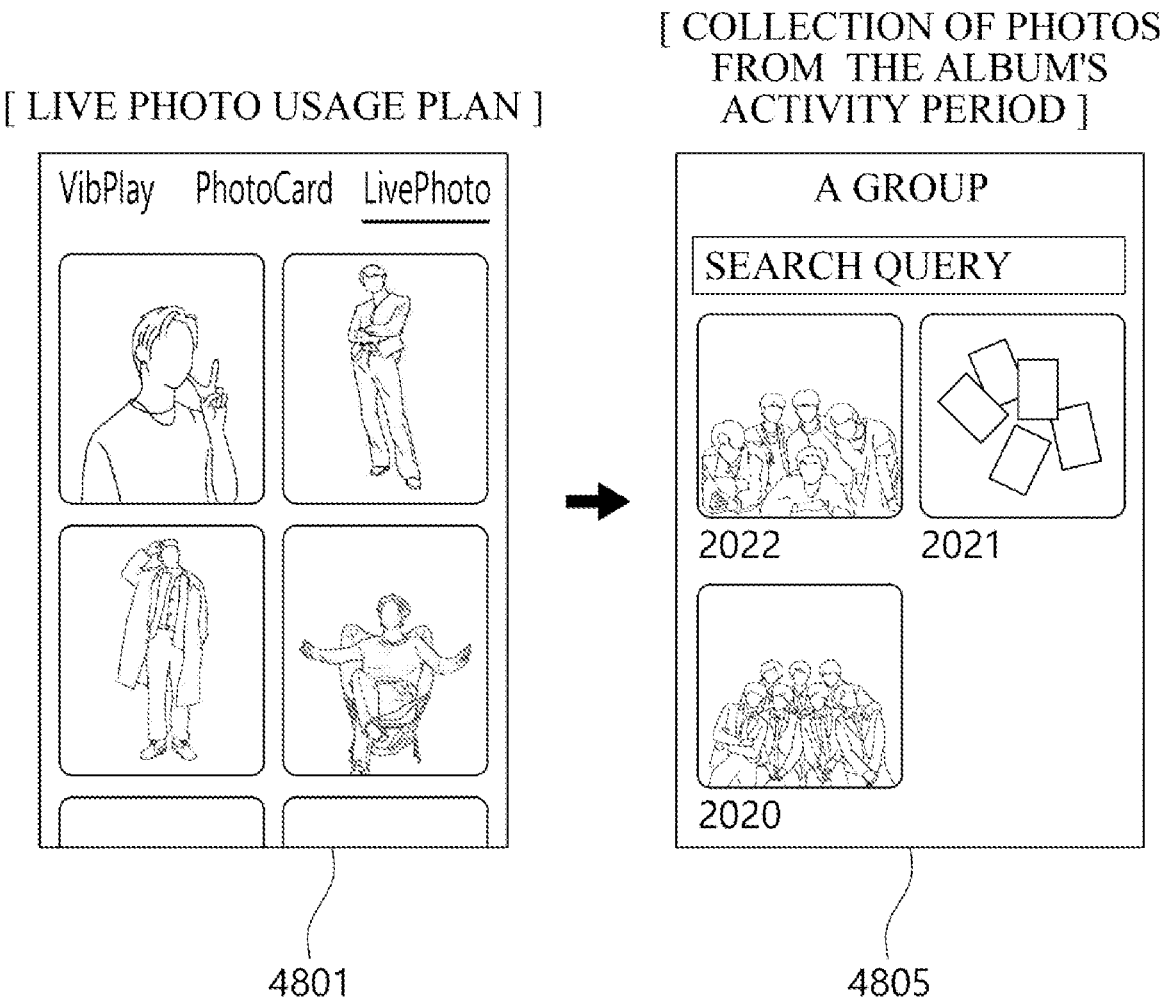
FIG. 48 is a diagram for explaining a function of providing updated digital content, according to various embodiments.

FIG. 47 is a flowchart illustrating a method of providing digital content based on short-range wireless communication by an electronic device according to various embodiments. FIG. 48 is a diagram illustrating a function of providing updated digital content by an electronic device according to various embodiments.

Referring to FIG. 47, in operation 4701, the electronic device 3901 may execute an application implemented to provide a function for searching for at least one content, and in operation 4703, the electronic device 3901 may obtain first identification information (e.g., a key value) associated with a short-range communication circuit included in an external device, and in operation 4705, the electronic device 3901 may transmit the first identification information and second identification information (e.g., identification information and account information of the electronic device 3901) associated with the electronic device 3901 to a server, and may receive information corresponding to the identification information from the server 130. Operations 4701 to 4705 of the electronic device 3901 may be performed as in operations 4201 to 4205 described above, and thus redundant descriptions are omitted.

According to various embodiments, in operation 4707, the electronic device 3901 may control the state of the first object (e.g., an object corresponding to a specific album) corresponding to the identification information among the plurality of objects provided on the first execution screen of the application to be an activated state, and control the state of the remaining second object (e.g., an object corresponding to the remaining album) to be an inactivated state, based on the received information. Operation 4707 of the electronic device 3901 may be performed as in operation 4207 described above, and thus repetitive descriptions will be omitted. Accordingly, when the first object is selected, an execution screen including the aforementioned first menu to third menu may be provided.

According to various embodiments, in operation 4709, the electronic device 3901 may receive content related to the first object updated to the server from the server and provide the received content. Upon receiving the content associated with the updated first object, the electronic device 3901 may update the digital content corresponding to the first object. As shown in FIG. 48, the electronic device 3901 may receive the live photos associated with the first object updated to the server and update and provide the live contents as shown in screens 4801 to 4805. The live contents are updated contents related to the album, and may include images acquired during the album activity period, contents for each year of album activity, and unique contents provided by the affiliates of the artist.

Figure 50:
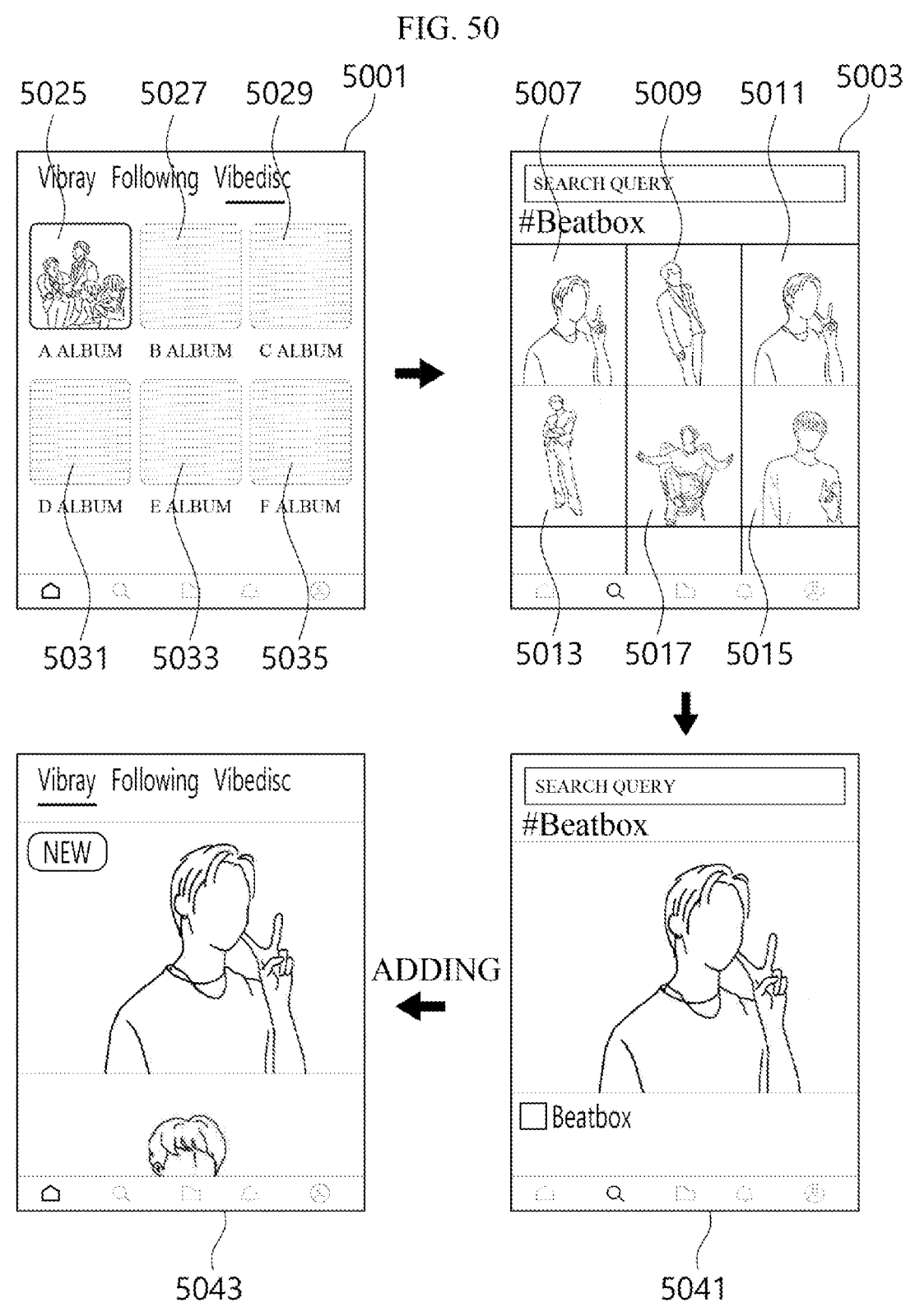

FIG. 49 is a flowchart illustrating a method of providing digital content based on short-range wireless communication by an electronic device according to various embodiments. FIG. 50 is a diagram for describing a function of registering digital content by an electronic device according to various embodiments.

Referring to FIG. 49, in operation 4901, the electronic device 3901 may execute an application implemented to provide a function for searching for at least one content. For example, the electronic device 3901 may execute an application implemented to provide a function for searching for at least one content according to a user input. As shown in FIG. 50, the electronic device 3901 may provide a plurality of contents 5007, 5009, 5011, 5013, and 5015 corresponding to the search term "beatbox". For example, a plurality of contents 5007, 5009, 5011, 5013, and 5015 may be contents having a hash tag of the search term "beatbox".

According to various embodiments, in operation 4903, the electronic device 3901 may obtain first identification information related to the short-range communication circuit included in the external device. When the content source contacts the electronic device 3901, the electronic device 3901 may acquire first identification information associated with the content source from the content source through short-range wireless communication. For example, the first identification information may include unique information of the content source and content identification information. In this case, the contact between the electronic device 3901 and the content source may mean that the physical distance between the electronic device 3901 and the content source is less than or equal to a specific distance.

According to various embodiments, in operation 4905, the electronic device 3901 may transmit the first identification information and the second identification information associated with the electronic device 3901 to the server and receive information corresponding to the identification information from the server. For example, the first identification information may be unique information and content identification information of the content source received from the content source, and the second identification information may be unique information of the electronic device 3901.

According to various embodiments, in operation 4907, the electronic device 3901 may control the state of the first object corresponding to the identification information among the plurality of objects provided on the first execution screen of the application to an activated state and control the state of the remaining second object to an inactivated state based on the received information. For example, the plurality of objects provided on the first execution screen may be objects corresponding one-to-one with each of the plurality of albums of a specific singer. The content identification information may be information corresponding to one of a plurality of albums of the specific singer. Therefore, one of a plurality of albums of a specific singer may be activated depending on the content source contacted to the electronic device 3901. As shown in FIG. 50, the state of the beatbox object 5025 corresponding to the content identification information among the plurality of objects 5025, 5027, 5029, 5031, 5033, and 5035 provided to the first execution screen 4001 may be controlled to an activated state, and the state of the remaining objects 5027, 5029, 5031, 5033, and 5035 may be controlled to an inactivated state.

According to various embodiments, in operation 4909, the electronic device 3901 may register the content associated with the first object searched using the application in the execution screen associated with the activated first object. In other words, the user may register and manage the searched content in the digital space corresponding to the activated album. Accordingly, the user may compose the activated album as a mean album. According to the user input of selecting the first content 5011 among the content associated with the searched first object, the electronic device 3901 may provide the screen 5041 of enlarging the first content 5011. In addition, according to the user input of registering the first content 5011, the electronic device 3901 may register the first content 5011 in the execution screen associated with the first object, such as the screen 5043. Therefore, when the user input of selecting the first object is received, the electronic device 3901 may provide a plurality of contents including the registered first content 5011.

According to various embodiments, the mean album in which the new content is updated may be provided to an electronic device of another user through the server 130 so that the other user can view, and at this time, a predetermined amount and/or point may be provided to the user who generated the mean album by claiming a predetermined cost to the other user.

Figure 51:
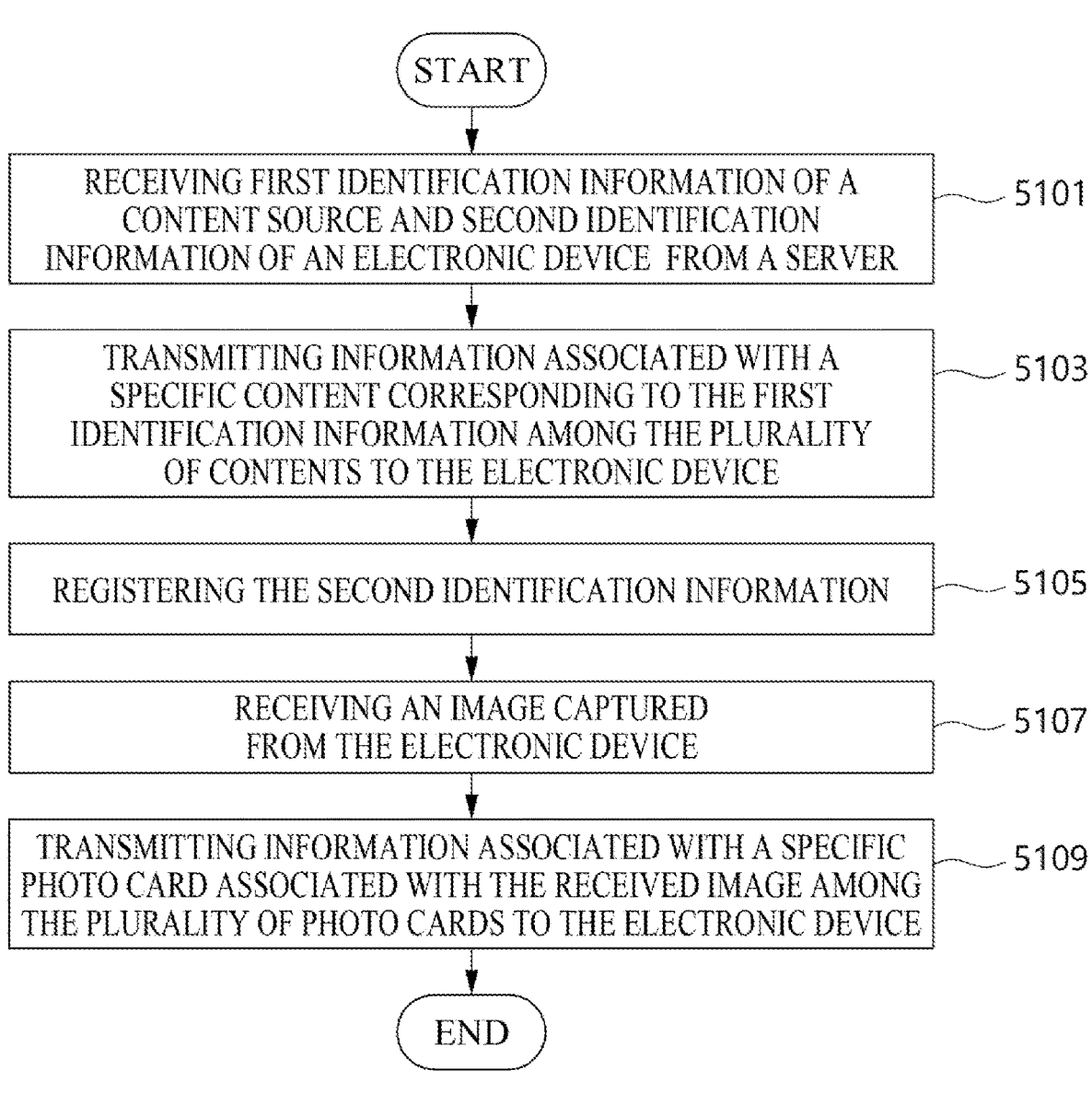
FIG. 51 is a flowchart for explaining a method for providing digital content by a server, according to various embodiments.
Figure 52:
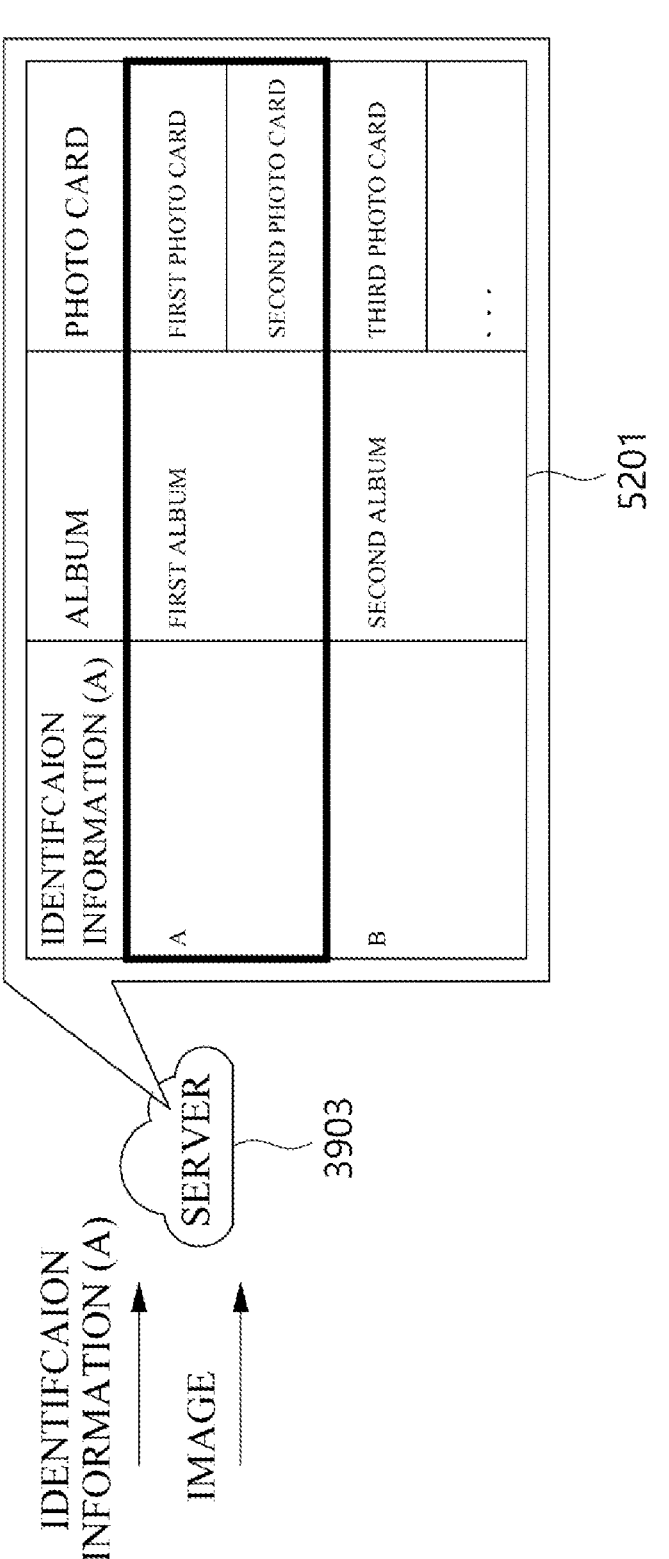
FIG. 52 is a diagram for explaining a method for providing digital content by a server, according to various embodiments.

FIG. 51 is a flowchart illustrating a method of providing digital content by a server according to various embodiments. FIG. 52 is a diagram illustrating a method of providing digital content by a server according to various embodiments.

Referring to FIG. 51, in operation 5101, the server 3903 may receive first identification information (e.g., key value) of a content source and second identification information of the electronic device 3901 from the electronic device 3901.

According to various embodiments, in operation 5103, the server 3903 may transmit information associated with a specific content corresponding to the first identification information among the plurality of contents to the electronic device, and in operation 5105, the server 3903 may register the second identification information.

According to various embodiments, in operation 5107, the server 3903 may receive an image captured from the electronic device, and in operation 5109, the server 3903 may transmit information associated with a specific photo card associated with the received image among the plurality of photo cards to the electronic device.

According to various embodiments, as shown in FIG. 52, the server 3903 may store information (e.g., table 5201) for a specific at least one photo card to identify the type of photo card corresponding to each first identification information (e.g., key value), and may acquire information associated with a specific photo card associated with the image based on the stored information 5201. When comparing the image received from the electronic device 3901 among the myriad number of photo cards stored in the server 3903 is performed, the burden of the server 3903 may be aggravated, and accuracy may be degraded. At this time, the types of photo cards issued for each specific album (e.g., a specific affiliated company, a specific artist group) are limited, but may be randomly enclosed in the aforementioned packing materials 4009 and 4015. Therefore, the server 3903 may store information 5201 on the type of photo card (e.g., first to third photo cards) for each identification information and/or specific album (e.g., specific affiliated company, specific artist group). In this case, the server 3903 may acquire the image of the photo card and the identification information (a) (e.g., a key value), and may perform an operation of identifying a specific photo card based on comparing information about a plurality of photo cards (e.g., first to second photo cards) corresponding to the identification information (a) with information analyzed based on the image analysis result.

Various embodiments of the present specification may be implemented in software including instructions stored in machine-readable storage media. The machine is a device that can invoke the instructions stored from the storage medium and operate according to the invoked instructions, and may include an electronic device (e.g., the electronic device 100) according to the disclosed embodiments. When the instructions are executed by the processor, the processor may perform a function corresponding to the instructions directly or using other components under the control of the processor. The instructions may include code generated or executed by a compiler or interpreter. The machine-readable storage medium may be provided in the form of a non-transitory storage medium. Here, the 'non-transitory storage medium' does not include a signal and means a tangible, but does not distinguish that data is semi-permanently or temporarily stored in the storage medium. For example, the 'non-transitory storage medium' may include a buffer in which data is temporarily stored.

According to an embodiment, a method according to various embodiments disclosed in the present specification may be included and provided in a computer program product. The computer program product may be traded between a seller and a buyer as a product. The computer program product may be distributed online in the form of a machine-readable storage medium (e.g., compact disc read only memory (CD-ROM)) or through an application store (e.g., Play Store™). In the case of online distribution, at least a portion of the computer program product (e.g., downloadable app) may be temporarily generated or at least temporarily stored in a storage medium such as a server of a manufacturer, a server of an application store, or a memory of a relay server.

Although the embodiments have been described above with reference to the limited embodiments and the drawings, various modifications and variations may be made from the above descriptions by those skilled in the art. For example, appropriate results may be achieved even if the described techniques are performed in a different order from the described method and/or if the components such as the described system, structure, apparatus, circuit, etc. are combined or substituted by other components or equivalents from the described method.

Therefore, other implementations, other embodiments, and equivalents with the claims fall within the scope of the appended claims.

What is claimed is:

1. An operation method of an electronic device, the method comprising:

executing an application implemented to provide a function for searching for at least one content associated with at least one artist;

acquiring a data set associated with a short-range communication circuit included in an external device, wherein the data set includes identification information associated with the external device;

controlling a state of a first album object corresponding to the identification information to an activated state among at least one album object corresponding to at least one album of a particular artist provided on a first execution screen of the application; and controlling a state of a remaining second album object to an inactivated state;

when the first album object is selected:

providing a second execution screen of the application including at least one first content associated with the first album object; and registering a particular photo card based on photographing a photo card associated with the external device, and providing a third execution screen of the application including at least one second content associated with the particular photo card.

2. The operation method of claim 1, wherein the registering the particular photo card, and providing the third execution screen of the application including at least one second content associated with the particular photo card comprises:

photographing an image of the photo card through a camera; and receiving information about at least one second content associated with the particular photo card based on transmitting the photographed image to a server.

3. The operation method of claim 1, wherein the at least one album object in the inactivated state is set to provide a function of guiding contact of the external device to the electronic device when selected.

4. The operation method of claim 3, wherein the first album object controlled to the activated state is set to provide a function of providing the second execution screen and the third execution screen, and the remaining second album object is set to maintain a function of guiding contact of the external device to the electronic device when selected.

5. The operation method of claim 1, wherein the providing the second execution screen of the application including at least one first content associated with the first album object comprises:

updating at least one first content associated with the first album object and updating the second execution screen to include the updated at least one first content.

6. The operation method of claim 1, further comprising:

adding at least one content found through the application implemented to provide a function for searching for at least one content associated with the at least one artist to the second execution screen.

7. An operation method of an electronic device, comprising:

executing an application implemented to provide a function for searching for at least one content;

acquiring a data set associated with a short-range communication circuit included in an external device, wherein the data set includes identification information associated with the external device;

controlling a state of a first content group corresponding to the identification information of a particular content group among a plurality of content groups provided on a first execution screen of the application and controlling a state of a remaining second content group to an inactivated state;

providing at least one digital content associated with the first content group;

photographing an image corresponding to the particular content group; and providing at least one digital content corresponding to the photographed image.

8. The method of claim 7, wherein the providing of at least one digital content associated with the first content group comprises:

adding at least one content found through the application implemented to provide a function for searching for the at least one content in at least one digital content associated with the first content group.

9. The method of claim 7, wherein the providing of at least one digital content associated with the first content group comprises:

updating at least one digital content associated with the first content group; and providing the updated at least one digital content.

* * * * *